US009253372B2

(12) United States Patent
Kim et al.

(10) Patent No.: US 9,253,372 B2
(45) Date of Patent: *Feb. 2, 2016

(54) VIDEO DISPLAY DEVICE AND CONTROL METHOD THEREOF

(71) Applicant: LG ELECTRONICS INC., Seoul (KR)

(72) Inventors: Sanghyun Kim, Seoul (KR); Jongyeul Suh, Seoul (KR); Kawansuk Kim, Seoul (KR); Joonhui Lee, Seoul (KR); Jaehee Chung, Seoul (KR); Hyeonjae Lee, Seoul (KR); Jinpil Kim, Seoul (KR); Dongwan Seo, Seoul (KR); Kyoungsoo Moon, Seoul (KR); Aettie Ji, Seoul (KR); Youngjae Seo, Seoul (KR); Kyungho Kim, Seoul (KR); Sungok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,687

(22) Filed: Jul. 9, 2014

(65) Prior Publication Data

US 2015/0002741 A1 Jan. 1, 2015

Related U.S. Application Data

(63) Continuation of application No. 13/883,600, filed as application No. PCT/KR2011/009044 on Nov. 24, 2011, now Pat. No. 8,848,108.

(60) Provisional application No. 61/549,238, filed on Oct.
(Continued)

(51) Int. Cl.
*H04N 9/74* (2006.01)
*H04N 9/475* (2006.01)
(Continued)

(52) U.S. Cl.
CPC .............. *H04N 5/04* (2013.01); *H04L 12/1813* (2013.01); *H04N 21/2362* (2013.01); *H04N 21/4316* (2013.01); *H04N 21/44209* (2013.01); *H04N 21/462* (2013.01); *H04N 21/4622* (2013.01)

(58) Field of Classification Search
CPC . H04N 5/04; H04N 21/4316; H04N 21/4622; H04N 21/2362; H04N 21/462; H04N 21/44209; H04L 12/1813
See application file for complete search history.

(56) References Cited

U.S. PATENT DOCUMENTS 7,434,154 B2 * 10/2008 Konetski ........................ 715/203
2002/0124182 A1 * 9/2002 Bacso et al. ................... 713/200
(Continued)

FOREIGN PATENT DOCUMENTS

KR 10-2007-0035327 A 3/2007
KR 10-2009-0006689 A 1/2009
(Continued)

*Primary Examiner* — Jefferey Harold
*Assistant Examiner* — Sean Haiem
(74) *Attorney, Agent, or Firm* — Dentons US LLP

(57) ABSTRACT

Provided are a video display device and a method of controlling the same. The method includes: obtaining an uncompressed audio-visual (AV) content; playing the uncompressed AV content through the display unit; obtaining content information of the uncompressed AV content on the basis of a content section of the uncompressed AV content; obtaining content change time information and enhanced service information on the basis of the content information; and determining a delay time for obtaining the next content information on the basis of the content change time information.

8 Claims, 57 Drawing Sheets

Related U.S. Application Data 20, 2011, provisional application No. 61/549,237, filed on Oct. 20, 2011, provisional application No. 61/526,685, filed on Aug. 24, 2011, provisional application No. 61/490,067, filed on May 26, 2011, provisional application No. 61/417,196, filed on Nov. 24, 2010.

(51) Int. Cl.

| | | |
|---|---|---|
| *G06F 3/00* | (2006.01) | |
| *G06F 13/00* | (2006.01) | |
| *H04N 5/445* | (2011.01) | |
| *H04N 7/167* | (2011.01) | |
| *G06F 7/04* | (2006.01) | |
| *H04N 5/04* | (2006.01) | |
| *H04N 21/431* | (2011.01) | |
| *H04N 21/462* | (2011.01) | |
| *H04N 21/2362* | (2011.01) | |
| *H04N 21/442* | (2011.01) | |
| *H04L 12/18* | (2006.01) | |

(56) References Cited

U.S. PATENT DOCUMENTS

2010/0325656 A1* 12/2010 Hardacker et al. .............. 725/31
2010/0325667 A1* 12/2010 Lee et al. ........................ 725/51

FOREIGN PATENT DOCUMENTS

| KR | 10-2009-0091892 A | 8/2009 |
|---|---|---|
| KR | 10-2010-0053300 A | 5/2010 |
| WO | 2007011889 A2 | 1/2007 |

\* cited by examiner

FIG.22
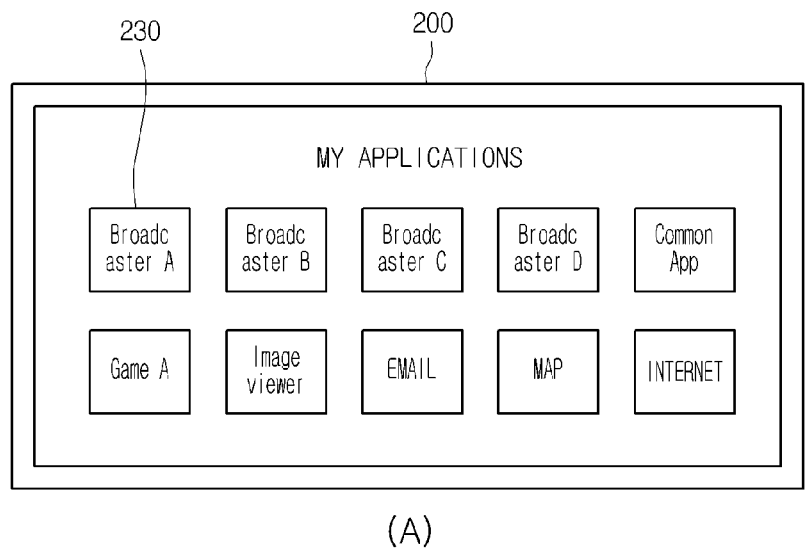
(A)
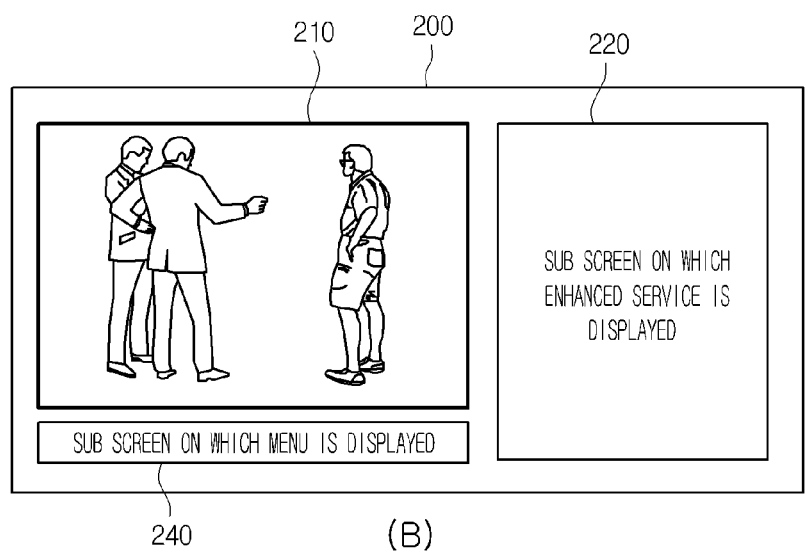
(B)

FIG.62

The case t(p) & t(m) is less than t(a)
- t(a) = 10 secs. t(app) = 15 secs, t(pre) = 5, t(m) = 5

How frequently will query happen?
recommend: query frequency = t(a)

Server: preroll | | postroll t(m) 5 secs — singer app metadata
t(pre) 5 secs
t(app)

Client:

Query timing 1 (success): ACR query cycle start, t(a) 10 secs — TV finds the singer app and shows it to users — SINGER APP — The singer app can be found but couldn'd launch the app the start time vecause t(p) is less than t(a)

Query timing 2 (fail): ACR query cycle start, 10 secs — The singer app can not be found vecause t(m) is less than t(a)

Query timing 3 (fail): ACR query cycle start, 10 secs — The singer app can not be found vecause t(m) is less than t(a)

FIG.67
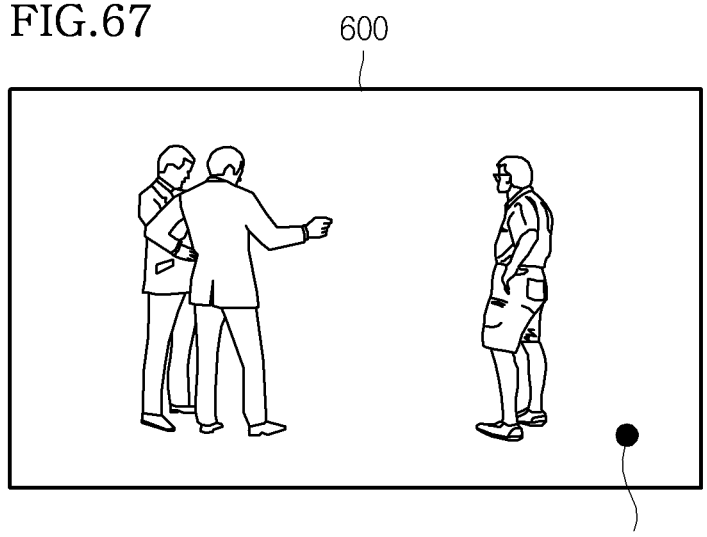
SELECT RED BUTTON OF REMOTE CONTROLLER
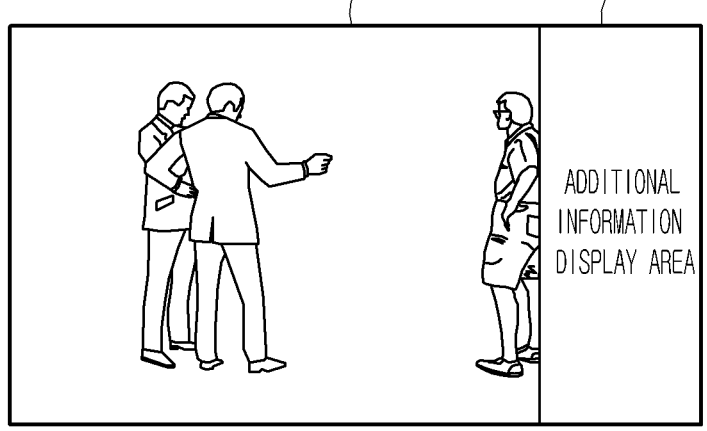

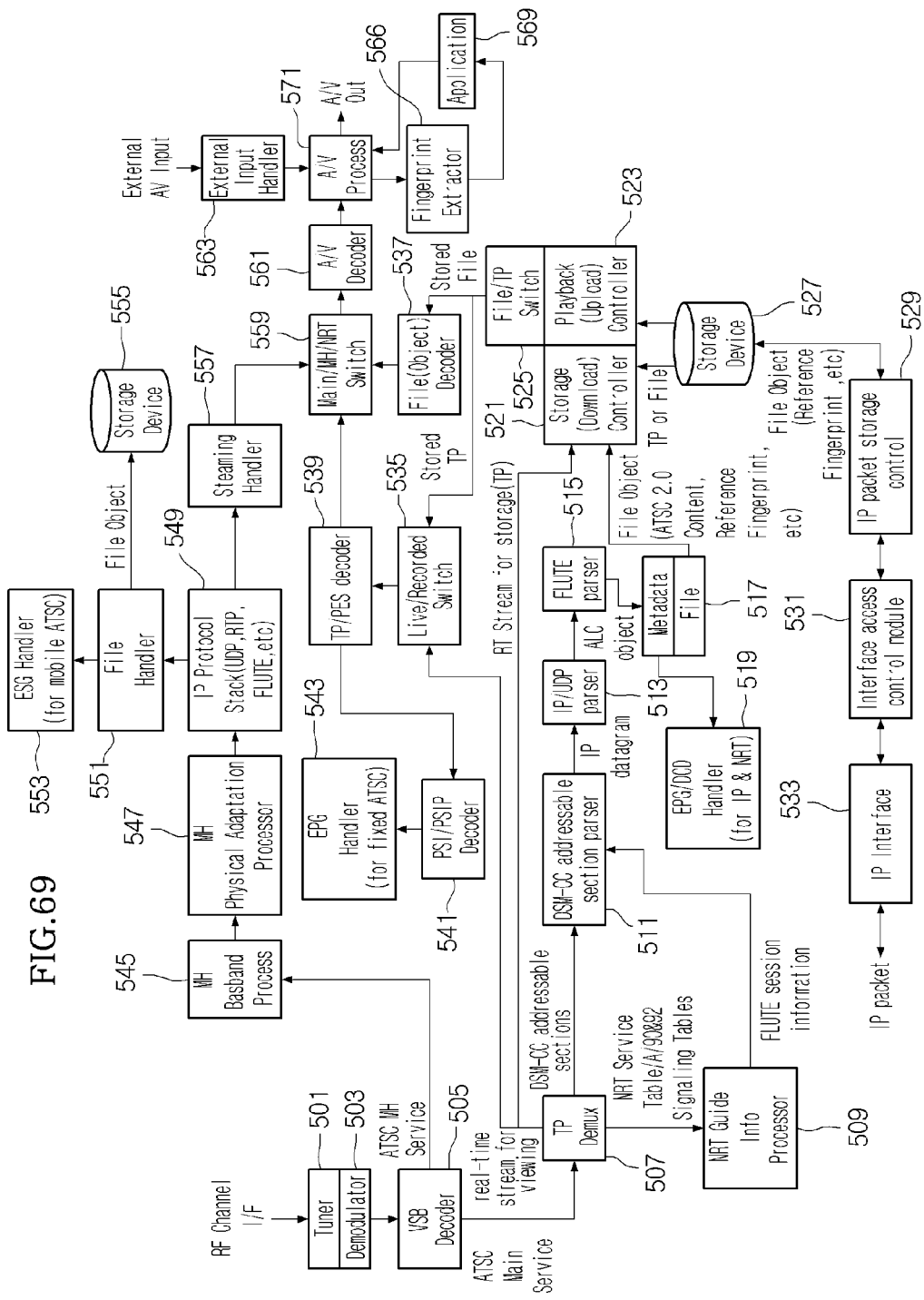

VIDEO DISPLAY DEVICE AND CONTROL METHOD THEREOF

CROSS-REFERENCE TO RELATED APPLICATIONS

This application is continuation application of U.S. patent application Ser. No. 13/883,600, filed on May 6, 2013, which is a national stage application of PCT/KR2011/009044, filed Nov. 24, 2011, which claims priority to U.S. Provisional Application No. 61/417,196 (filed on 2010 Nov. 24), U.S. Provisional Application No. 61/549,238 (filed on 2011 Oct. 20), U.S. Provisional Application No. 61/549,237 (filed on 2011 Oct. 20), U.S. Provisional Application No. 61/490,067 (filed on 2011 May 26), and U.S. Provisional Application No. 61/526,685 (filed Aug. 24, 2011) which are hereby incorporated by reference as if fully set forth herein.

BACKGROUND

The present disclosure relates to a video display device and a method of controlling the same.

As digital broadcasting is paving the way for its extensive spread, a broadcasting station transmits both main audio-visual (AV) contents and enhanced service data, which may be linked to the main AV contents to provide information and services or may be separately provided for other purposes.

However, a video display device in each home may unlikely receive broadcast signals directly through air under a current broadcasting environment. Rather, most of cases, a video display device in each home is connected to a broadcast receiving device to display uncompressed audio-visual contents that the broadcast receiving device provides.

Additionally, the broadcast receiving device receives contents from a server (called a Multichannel Video Programming Distributor (MVPD)). The MVPD receives a broadcast signal from a broadcasting station, extracts contents from the received broadcast signal, converts the extracted content into signals having a proper format for transmission, and provides the converted signals to a broadcast receiving device. During these processes, the MVPD may exclude extracted enhanced service data or may add another enhanced service data, so that the broadcasting station may serve to provide AV contents but may not provide enhanced services led by the broadcasting station.

Since the broadcast receiving device extracts main AV data from signal received from the MVPD and provides only uncompressed audio-visual data to a video display device, only enhanced services provided from the broadcast receiving device not the video display device are available. Furthermore, the broadcasting station may not provide enhanced services led by itself.

Additionally, even when the broadcasting station provides enhanced services through wireless channels, the enhanced services may not be provided enough due to bandwidth limitation.

SUMMARY

Embodiments provide a video display device for available enhanced services led by a broadcasting station, and a method of controlling the same.

In one embodiment, a method of controlling a video display device includes: obtaining an uncompressed audio-visual (AV) content; playing the uncompressed AV content through the display unit; obtaining content information of the uncompressed AV content on the basis of a content section of the uncompressed AV content; obtaining content change time information and enhanced service information on the basis of the content information; and determining a delay time for obtaining the next content information on the basis of the content change time information.

In another embodiment, a method of controlling a video display device including a display unit includes: obtaining an uncompressed AV content; playing the uncompressed AV content through the display unit; extracting a content section of the uncompressed AV content; obtaining content information including an identifier of the uncompressed AV content and a start time of the extracted content section on the basis of the extracted content section; obtaining enhanced service information including a first delay time on the basis of the extracted content section or the content information; determining a second delay time on the basis of the first delay time; and starting an enhanced service corresponding to the enhanced service information when the second delay time elapses.

In further another embodiment, a video display device includes: a display unit; a receiving unit obtaining an uncompressed AV content; an enhanced service management unit obtaining content information of the uncompressed AV content on the basis of a content section of the uncompressed AV content, obtaining content change time information and enhanced service information on the basis of the content information, and determining a delay time for obtaining the next content information on the basis of the content change time information; and a play controlling unit playing the uncompressed AV content through the display unit.

In still further another embodiment, a video display device includes: a display unit; a receiving unit obtaining an uncompressed AV content; an enhanced service management unit obtaining content information including an identifier of the uncompressed AV content and a start time of the extracted content section on the basis of a content section extracted from the uncompressed AV content, obtaining enhanced service information including a first delay time on the basis of the extracted content section or the content information, determining a second delay time on the basis of the first delay time, and starting an enhanced service corresponding to the enhanced service information when the second delay time elapses; and a play controlling unit playing the uncompressed AV content through the display unit.

In still further another embodiment, a video display device includes: a display unit; a receiving unit obtaining an uncompressed AV content; a content recognizing unit obtaining content information of the uncompressed AV content on the basis of a content section of the uncompressed AV content; a life cycle management unit managing an enhanced service according to enhanced service information obtained on the basis of the content information; and a play controlling unit playing the uncompressed AV content and the enhanced service on the display unit.

The details of one or more embodiments are set forth in the accompanying drawings and the description below. Other features will be apparent from the description and drawings, and from the claims.

BRIEF DESCRIPTION OF THE DRAWINGS

FIG. 22 is a screen when a content provider application is executed according to an embodiment.

FIG. 62 is a timing diagram of an enhanced service according to another embodiment.

FIG. 67 is a screen controlled by a life cycle management application according to an embodiment.

FIG. 69 is a block diagram illustrating a structure of a watermark based video display device according to another embodiment.

DETAILED DESCRIPTION OF THE EMBODIMENTS

Hereinafter, a mobile terminal relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 1 to 9 according to an embodiment.

Figure 1:
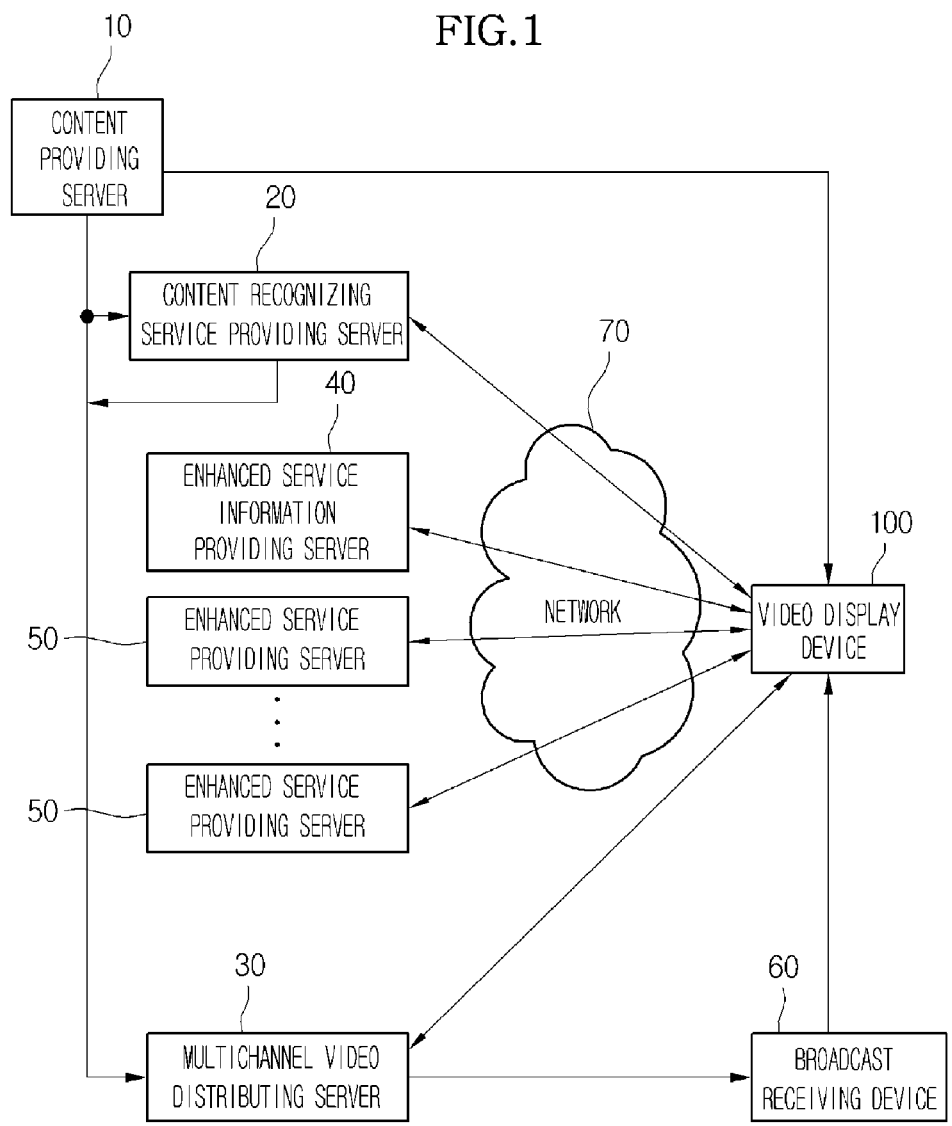
FIG. 1 is a block diagram illustrating the network topology according to the embodiment.

FIG. 1 is a block diagram illustrating the network topology according to the embodiment.

As shown in FIG. 1, the network topology includes a content providing server 10, a content recognizing service providing server 20, a multi channel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts feature information from some frames or audio samples of the main audio-visual content and stores it. This feature information is called signature.

The multi channel video distributing server 30 receives and multiplexes broadcast signals from a plurality of broadcasting stations and provides the multiplexed broadcast signals to the broadcast receiving device 60. Especially, the multi channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 100 through its external input port.

The enhanced service information providing server 40 provides enhanced service information on at least one available enhanced service relating to a main AV content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server.

The video display device 100 may be a television, a notebook computer, a hand phone, and a smart phone, each including a display unit. The video display device 100 may receive an uncompressed main AV content from the broadcast receiving device 60 or a broadcast signal including an encoded main AV content from the contents providing server 10 or the multi channel video distributing server 30. The video display device 100 may receive a content recognizing service from the content recognizing service providing server 20 through the network 70, an address of at least one available enhanced service relating to a main AV content from the enhanced service information providing server 40 through the network 70, and at least one available enhanced service relating to a main AV content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

Figure 2:
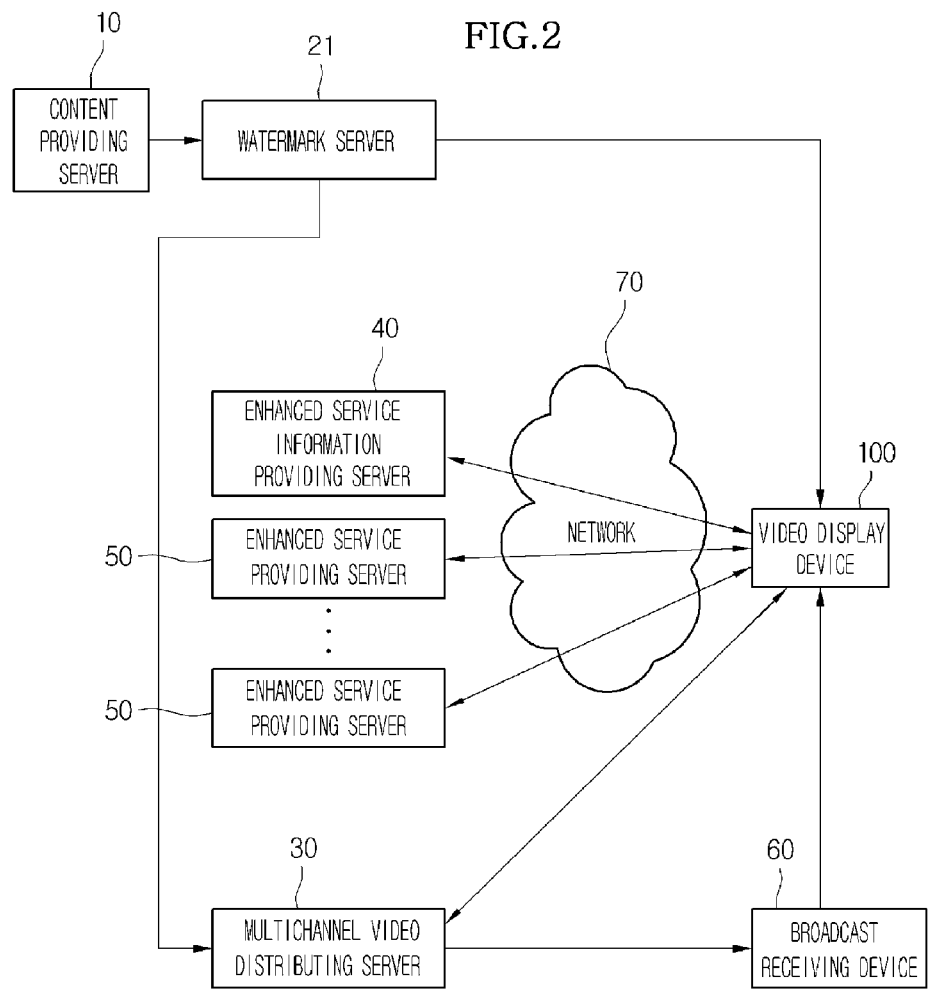
FIG. 2 is a block diagram illustrating a watermark based network topology according to an embodiment.

FIG. 2 is a block diagram illustrating a watermark based network topology according to an embodiment.

As shown in FIG. 2, the watermark based network topology may further include a watermark server 21.

As shown in FIG. 2, the watermark server 21 edits a main AV content to insert content information into it. The multi channel video distributing server 30 may receive and distribute a broadcast signal including the modified main AV content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 3:
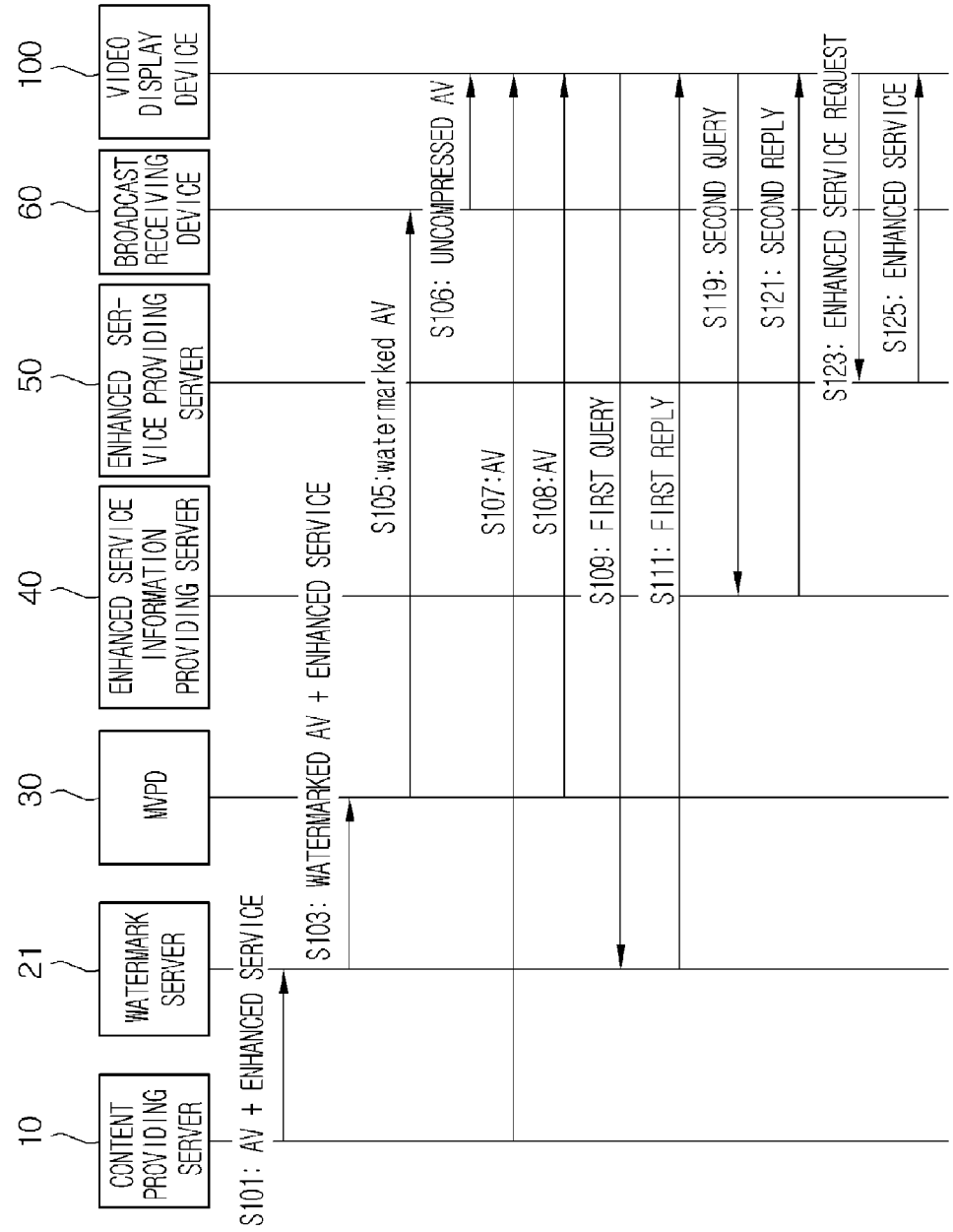
FIG. 3 is a ladder diagram illustrating a data flow in a watermark based network topology according to an embodiment.

FIG. 3 is a ladder diagram illustrating a data flow in a watermark based network topology according to an embodiment.

First, the content providing server 10 transmits a broadcast signal including a main AV content and an enhanced service in operation S101.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where feature information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 100 acquires watching information of the main AV content and reports the acquired watching information to the main AV content watching information reporting address in the main AV content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee-Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main AV content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S106.

Moreover, the content providing server 10 also broadcasts a broadcast signal including a main AV content through a wireless channel in operation S107.

Additionally, the MVPD 30 may directly transmit a broadcast signal including a main AV content to the video display device 100 without going through the broadcast receiving device 60 in operation S108.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from some frames or a section of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S109.

The watermark server 21 provides a first reply to the first query in operation S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

Figure 4:
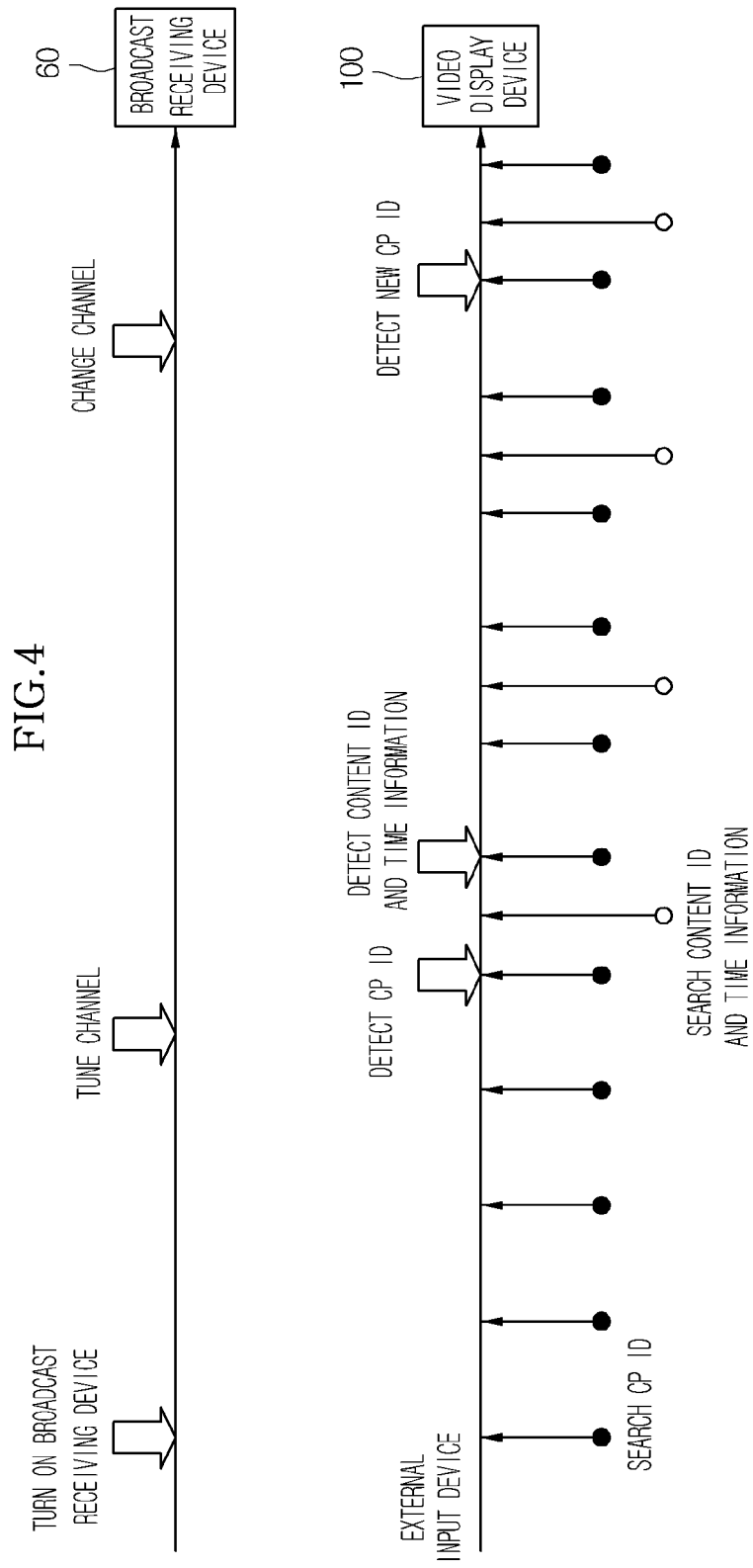
FIG. 4 is view illustrating a watermark based content recognition timing according to an embodiment.

FIG. 4 is a view illustrating a watermark based content recognition timing according to an embodiment.

As shown in FIG. 4, when the broadcast receiving device 60 is turned on and tunes a channel, and also, the video display device 100 receives a main AV content of the turned channel from the broadcast receiving device 60 through an external input port 111, the video display device 100 may sense a content provider identifier (or a broadcasting station identifier) from the watermark of the main AV content. Then, the video display device 100 may sense content information from the watermark of the main AV content on the basis of the sensed content provider identifier.

At this point, as shown in FIG. 4, the detection available period of the content provider identifier may be different from that of the content information. Especially, the detection available period of the content provider identifier may be shorter than that of the content information. Through this, the video display device 100 may have an efficient configuration for detecting only necessary information.

Figure 5:
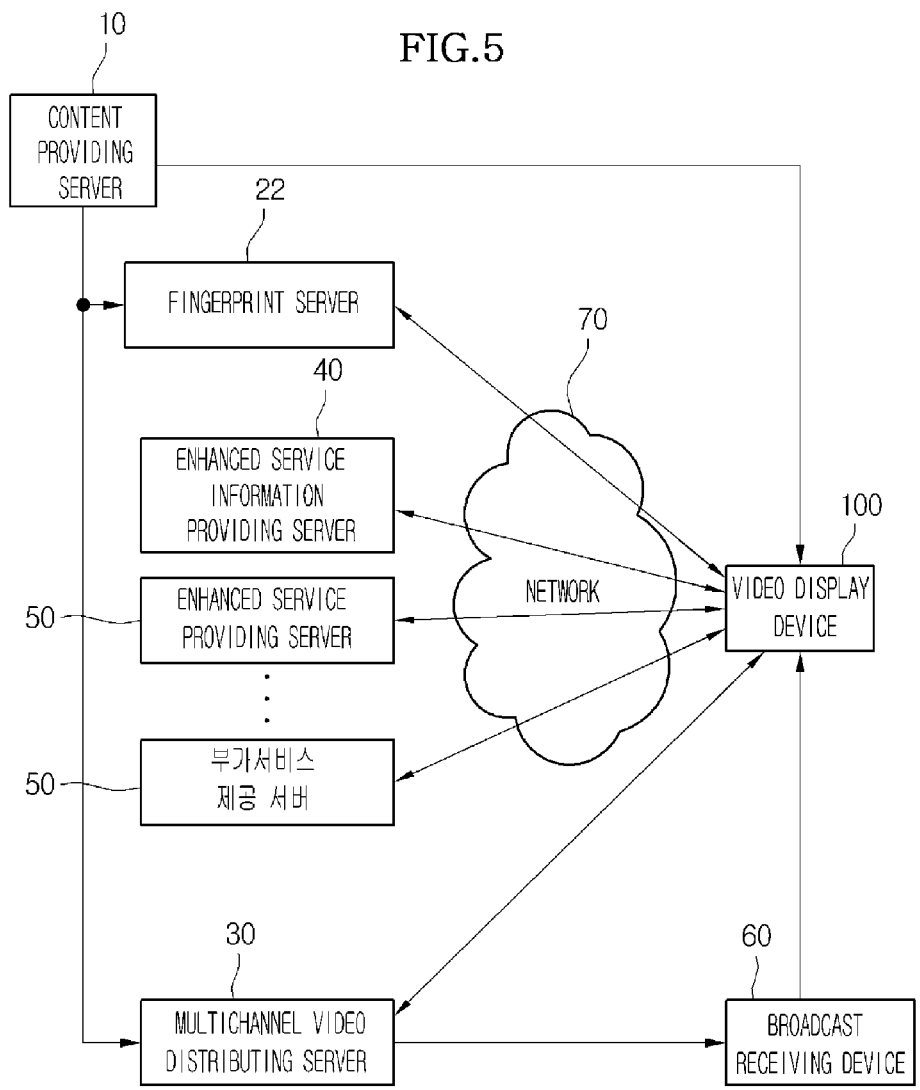
FIG. 5 is a block diagram illustrating a fingerprint based network topology according to an embodiment.

FIG. 5 is a block diagram illustrating a fingerprint based network topology according to an embodiment.

As shown in FIG. 5, the network topology may further include a fingerprint server 22.

As shown in FIG. 5, the fingerprint server 22 does not edit a main AV content, but extracts feature information from some frames or a section of audio samples of the main AV content and stores the extracted feature information. Then, when receiving the feature information from the video display device 100, the fingerprint server 22 provides an identifier and time information of an AV content corresponding to the received feature information.

Figure 6:
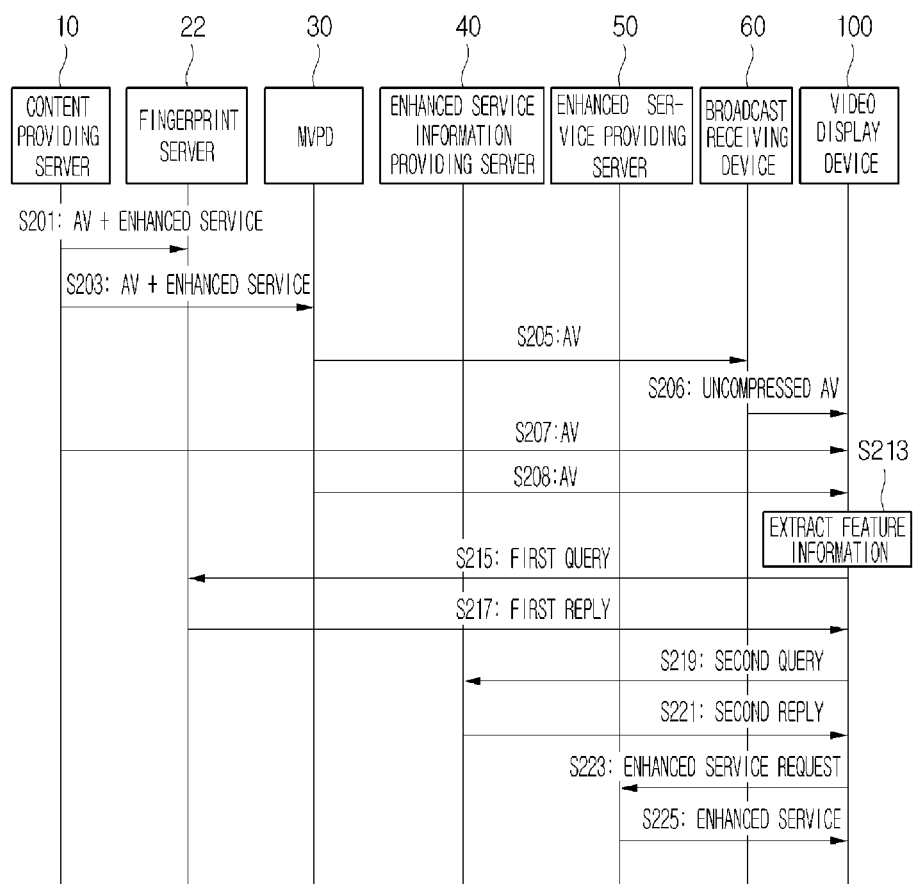
FIG. 6 is a ladder diagram illustrating a data flow in a fingerprint based network topology according to an embodiment.

FIG. 6 is a ladder diagram illustrating a data flow in a fingerprint based network topology according to an embodiment.

First, the content providing server 10 transmits a broadcast signal including a main AV content and an enhanced service in operation S201.

The fingerprint server 22 receives a broadcast signal that the content providing server 10, extracts a plurality of pieces of feature information from a plurality of frame sections or a plurality of audio sections of the main AV content, and establishes a database for a plurality of query results corresponding to the plurality of feature information in operation S203. The query result may include at least one of content information, enhanced service information, and an available enhanced service.

The MVPD 30 receives broadcast signals including a main AV content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S206.

Moreover, the content providing server 10 also broadcasts a broadcast signal including a main AV content through a wireless channel in operation S207.

Additionally, the MVPD 30 may directly transmit a broadcast signal including a main AV content to the video display device 100 without going through the broadcast receiving device 60.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts feature information from some frames or a section of audio samples of the obtained main AV content in operation S213.

The video display device 100 accesses the fingerprint server 22 corresponding to the predetermined fingerprint server address to transmit a first query including the extracted feature information in operation S215.

The fingerprint server 22 provides a query result as a first reply to the first query in operation S217. If the first reply corresponds to fail, the video display device 100 accesses the fingerprint server 22 corresponding to another fingerprint server address to transmit a first query including the extracted feature information.

The fingerprint server 22 may provide Extensible Markup Language (XML) document as a query result. Examples of the XML document containing a query result will be described with reference to FIG. 7 and Table 1.

Figure 7:
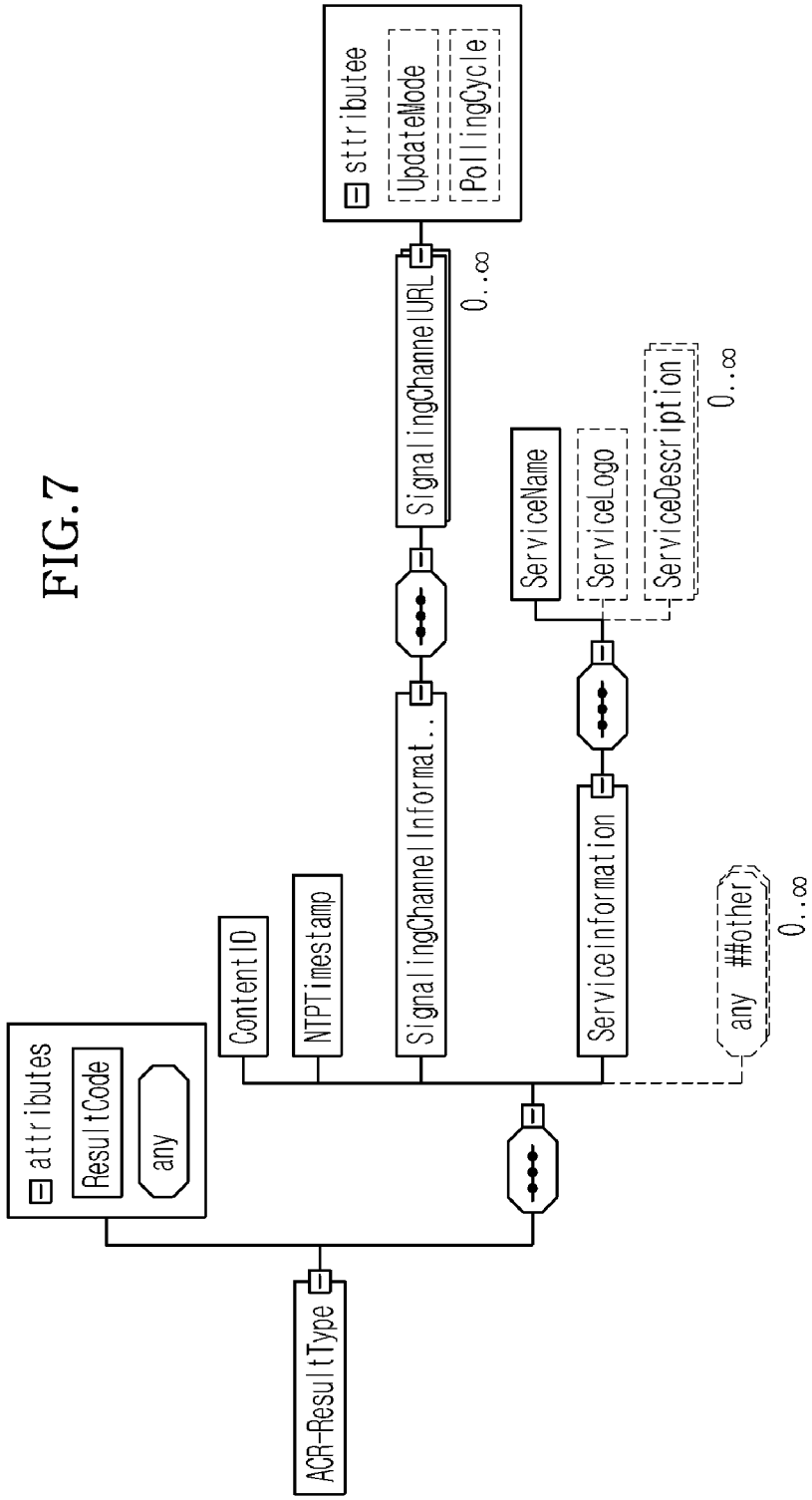
FIG. 7 is a view illustrating an XML schema diagram of ACR-Resulttype containing a query result according to an embodiment.

FIG. 7 is a view illustrating an XML schema diagram of ACR-Resulttype containing a query result according to an embodiment.

As shown in FIG. 7, ACR-Resulttype containing a query result includes ResultCode attributes and ContentID, NTP-Timestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 1 illustrates an XML schema of ACR-ResultType containing the query result.

TABLE 1

```
<xs:complexType name="ACR-ResultType">
    <xs:sequence>
        <xs:element name="Content ID" type="xs:anyURI"/>
        <xs:element name="NTPTimestamp" type="xs:unsignedLong"/>
        <xs:element name="SignalingChannel Information">
            <xs:complexType>
                <xs:sequence>
                    <xs:element name="SignalingChannelURL" maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle" type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="xs:anyURI" minOccurs="0"/>
                    <xs:element name="ServiceDescription" type="xs:string" minOccurs="0" maxOccurs="unbounded"/>
                </xs:sequence>
            </xs:complexType>
        </xs:element>
        <xs:any namespace="##other" processContents="skip" minOccurs="0" maxOccurs="unbounded"/>
    </xs:sequence>
    <xs:attribute name="ResultCode" type="xs:string" use="required"/>
    <xs:anyAttribute processContents="skip"/>
</xs:complexType>
```

As the ContentID element, an ATSC content identifier may be used as shown in Table 2.

TABLE 2

| Syntax | The Number of bits | format |
|---|---|---|
| ATSC_content_identifier( ) { | | |
|   TSID | 16 | uimsbf |
|   reserved | 2 | bslbf |
|   end_of_day | 5 | uimsbf |
|   unique_for | 9 | uimsbf |
|   content_id | var | |
| } | | |

As shown in Table 2, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content_identifier. The video display device 100 reduces unique_by 1 in a corresponding time to end_of_day daily and presumes that content_id is unique if unique_is not 0.

Moreover, as the ContentID element, a global service identifier for ATSC-M/H service may be used as described below.

The global service identifier has the following form.
urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major>69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1
urn:oma:bcast:iauth:atsc:service:us:0:100.200

Moreover, as the ContentID element, an ATSC content identifier may be used as described below.

The ATSC content identifier has the following form.
urn:oma:bcast:iauth:atsc:content:<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by "."<serviceid>. <xsid> for (regional service) (major>69) is <serviceid>. <content_id> is a base64 sign of a content_id field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S221.

If the video display device 100 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Figure 8:
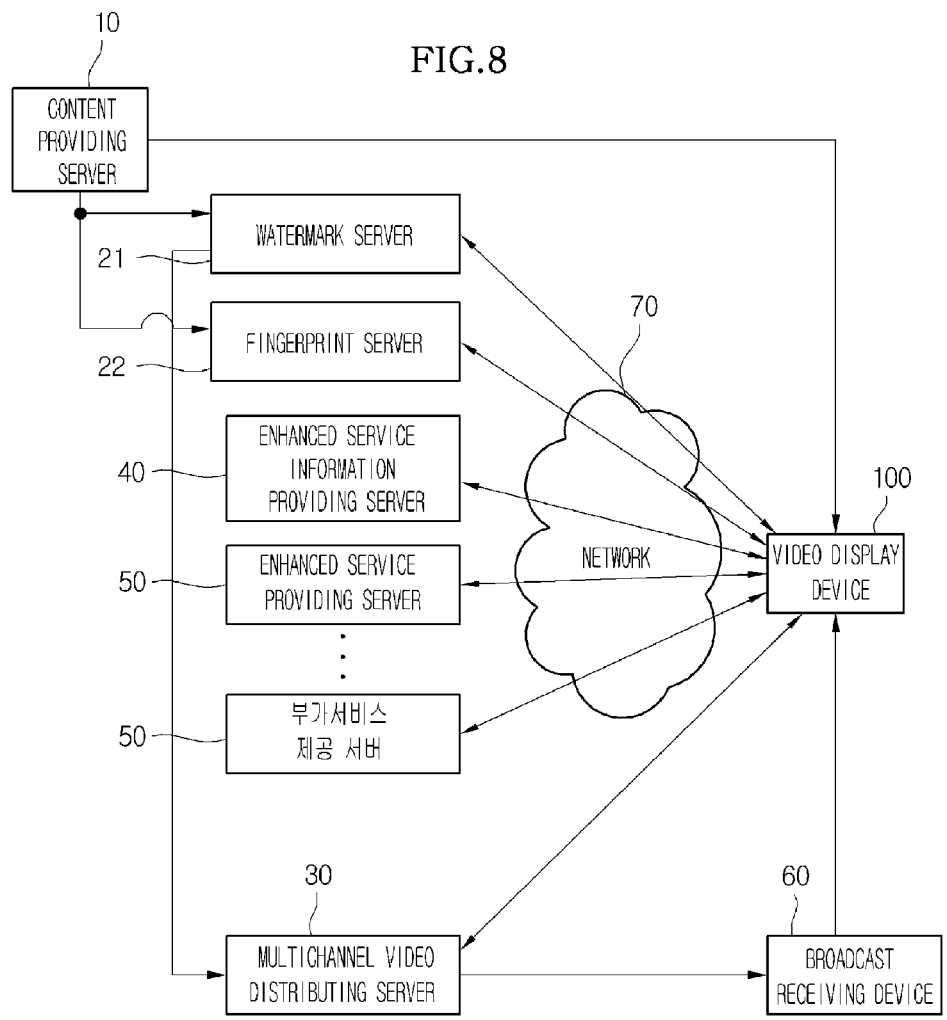
FIG. 8 is a block diagram illustrating a watermark and fingerprint based network topology according to an embodiment.

FIG. 8 is a block diagram illustrating a watermark and fingerprint based network topology according to an embodiment.

As shown in FIG. 8, the watermark and fingerprint based network topology may further include a watermark server 21 and a fingerprint server 22.

As shown in FIG. 8, the watermark server 21 inserts content provider identifying information into a main AV content. The watermark server 21 may insert content provider identifying information as a visible watermark such as a logo or an invisible watermark into a main AV content.

The fingerprint server 22 does not edit a main AV content, but extracts feature information from some frames or a certain section of audio samples of the main AV content and stores the extracted feature information. Then, when receiving the feature information from the video display device 100, the fingerprint server 22 provides an identifier and time information of an AV content corresponding to the received feature information.

Figure 9:
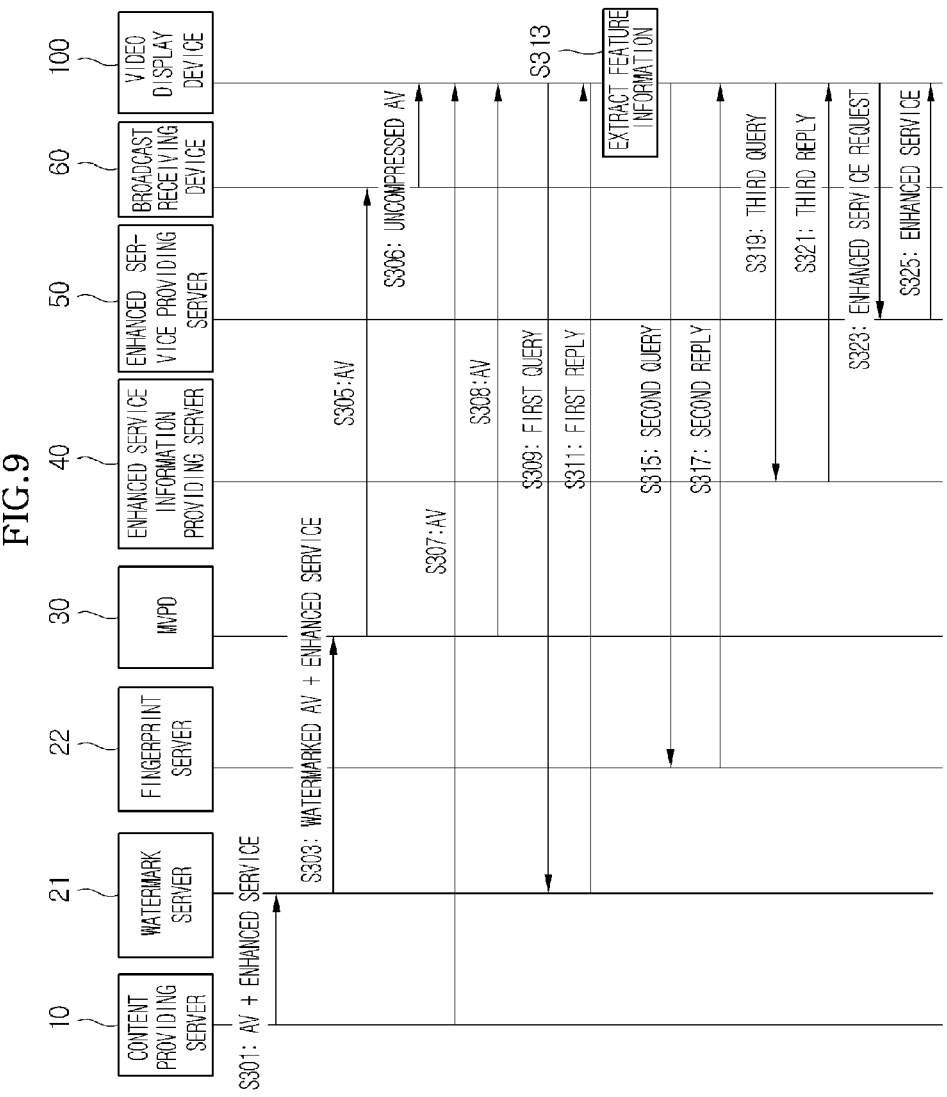
FIG. 9 is a ladder diagram illustrating a data flow in a watermark and fingerprint based network topology according to an embodiment.

FIG. 9 is a ladder diagram illustrating a data flow in a watermark and fingerprint based network topology according to an embodiment.

First, the content providing server 10 transmits a broadcast signal including a main AV content and an enhanced service in operation S301.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S306.

Moreover, the content providing server 10 also broadcasts a broadcast signal including a main AV content through a wireless channel in operation S307.

Additionally, the MVPD 30 may directly transmit a broadcast signal including a main AV content to the video display device 100 without going through the broadcast receiving device 60 in operation S308.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from audio samples in some frames or periods of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 100 extracts feature information from some frames or a certain section of audio samples of the main AV content in operation S313.

The video display device 100 accesses the fingerprint server 22 corresponding to the fingerprint server address in the first reply to transmit a second query including the extracted feature information in operation S315.

The fingerprint server 22 provides a query result as a second reply to the second query in operation S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 100 enhanced service information for at least one available enhanced service as a third reply to the third query in operation S321.

If the video display device 100 obtains at least one available enhanced service address through the first reply, the second reply, or the third reply, it accesses the at least one available enhanced service address to request enhanced service in operation S323, and then, obtains the enhanced service in operation S325.

Then, referring to FIGS. 10 and 18, the video display device 100 will be described according to an embodiment.

Figure 10:
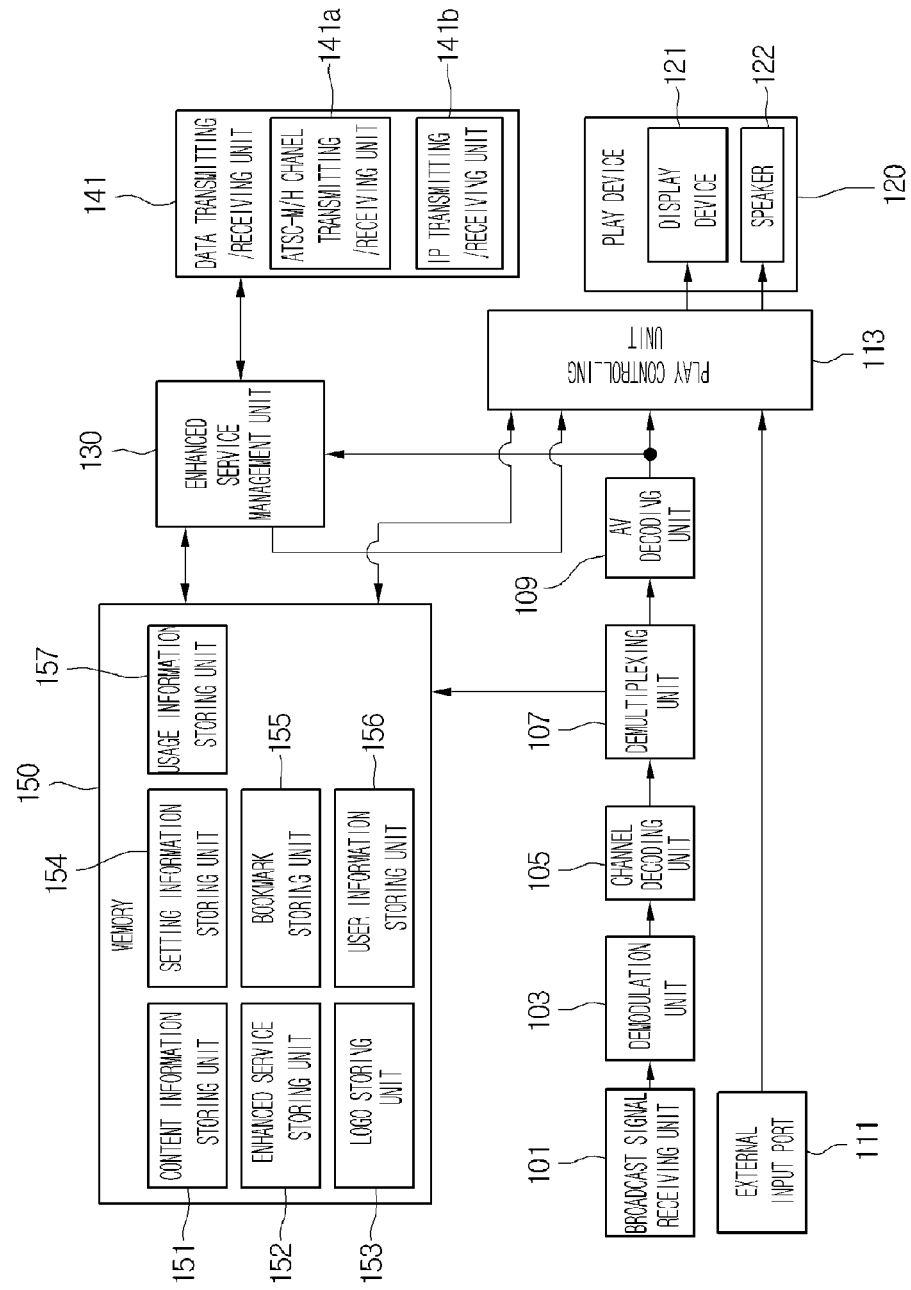
FIG. 10 is a block diagram illustrating the video display device according to the embodiment.

FIG. 10 is a block diagram illustrating the video display device according to the embodiment.

As shown in FIG. 10, the video display device 100 includes a broadcast signal receiving unit 101, a demodulation unit 103, a channel decoding unit 105, a demultiplexing unit 107, an AV decoding unit 109, an external input port 111, a play controlling unit 113, a play device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main AV content and enhanced service from the channel-decoded data. The separated enhanced service is stored in an enhanced service storage unit 152.

The AV decoding unit 109 performs AV decoding on the separated main AV content to generate an uncompressed main AV content.

Moreover, the external input port 111 receives an uncompressed main AV content from the broadcast receiving device 60, a digital versatile disk (DVD) player, a Blu-ray disk player, and so on. The external input port 111 may include at least one of a DSUB port, a High Definition Multimedia Interface (HDMI) port, a Digital Visual Interface (DVI) port, a composite port, a component port, and an S-Video port.

The play controlling unit 113 controls the play device 120 to play at least one of an uncompressed main AV content that the AV decoding unit 109 generates and an uncompressed main AV content received from the external input port 111 according to a user's selection.

The play device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main AV content and obtains available enhanced service on the basis of the obtained content information. Especially, as described above, the enhanced service management unit 130 may obtain the identification information of the main AV content on the basis of some frames or a certain section of audio samples the uncompressed main AV content. This is called automatic contents recognition (ACR) in this specification.

The data transmitting/receiving unit 141 may include an Advanced Television Systems Committee—Mobile/Handheld (ATSC-M/H) channel transmitting/receiving unit 141*a* and an IP transmitting/receiving unit 141*b*.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of feature information.

The enhanced service storage unit 152 may store a plurality of enhanced services corresponding to a plurality of feature information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main AV content watching information and enhanced service usage information within the set range. The usage information range may be set in each virtual channel. Additionally, the usage information measurement allowable range may be set over an entire physical channel.

The usage information providing unit 157 stores the main AV content watching information and the enhanced service usage information, which are collected by the video display device 100. Additionally, the video display device 100 analyzes a service usage pattern on the basis of the collected main AV content watching information and enhanced service usage information, and stores the analyzed service usage pattern in the usage information storage unit 157.

The enhanced service management unit 130 may obtain the content information of the main AV content from the fingerprint server 22 or the content information storage unit 151. If there is no content information or sufficient content information, which corresponds to the extracted feature information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main AV content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main AV content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Hereinafter, referring to FIGS. 11 and 18, the enhanced service management unit 130 will be described according to various embodiments.

Figure 11:
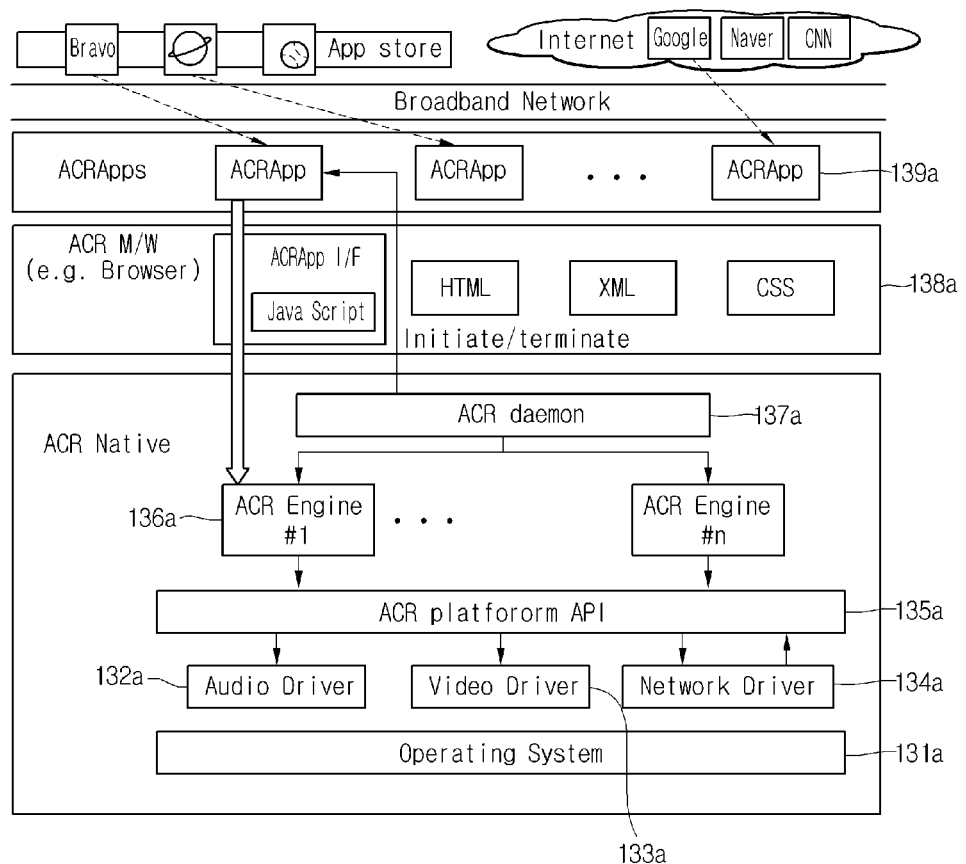
FIG. 11 is a hierarchy diagram of an enhanced service management unit according to an embodiment.

FIG. 11 is a hierarchy diagram of an enhanced service management unit according to an embodiment.

As shown in FIG. 11, the enhanced service management unit 130 may include an operating system 131a, an audio driver 132a, a video driver 133a, a network driver 134a, an ACR platform application program interface (API) 135a, at least one ACR engine 136a, an ACR daemon 137a, an ACR middleware 138a, and at least one ACR application 139a.

When the enhanced service management unit 130 is used as shown in FIG. 11, a user doesn't need to necessarily recognize a channel or content and an ACR operation may be performed always.

The enhanced service management unit 130 may access an application store through the data transmitting/receiving unit 141 to download application.

The audio driver 132a may access an audio buffer used for audio fingerprint or audio watermark.

The video driver 133a may access a video buffer used for video fingerprint or video watermark.

The network driver 134a allows the ACR engine 136a to access the data transmitting/receiving unit 141.

The platform API 135a provides API to allow the ACR engine 136a to access the audio driver 132a, the video driver 133a, and the network driver 134a.

Since a plurality of broadcasting stations or content providers use respectively different content recognizing services, the video display device 100 may include a plurality of ACR engines 136a. That is, the video display device 100 may include an ACR engine for at least one of a plurality of video watermark extraction algorithms, a plurality of audio watermark extraction algorithms, a plurality of video signature extraction algorithms, and a plurality of audio signature extraction algorithms. The watermark based ACR engine 136a may extract watermark information, and then, may obtain at least one of a watermark purpose, content information, enhanced service information, and an available enhanced service from the extracted watermark information. The fingerprint based ACR engine 136a may extract feature information of a certain section of a main AV content, and then, may obtain at least one of content information, enhanced service information, and an available enhanced service on the basis of the extracted feature information.

The ACR daemon 137a manages at least one ACR engine 136a. The daemon is executed continuously to process a periodic service request. The daemon appropriately delivers the collected requests to allow another program to process them. The ACR daemon 137a may manage the execution and termination of the ACR engine 136a. The ACR daemon 137a searches an ACR engine matching to a current main AV content among a plurality of ACR engines 136a. Especially, if a system resource is consumed greatly because several ACR engines are executed, the ACR daemon 137a sequentially executes the plurality of ACR engines 136a one by one according to a specific rule or priority to confirm whether content recognition is successful. Additionally, if one of the plurality of ACR engines 136a is successful in content recognition, the ACR daemon 137a obtains and executes an ACR application 139a corresponding to an enhanced service for the recognized content. While the ACR engine 136a performs the content recognition successfully, if contents are not recognized any more due to a channel change, the ACR daemon 137a may terminate the ACR application 139a.

The ACR middleware 138a serves as a browser for at least one ACR application 139a.

The ACR application 139a may provide user experience enhanced by ACR to a user. The ACR application 139a may be an application downloaded from an application store or the Internet or may be a simple Uniform Resource Locator (URL). The ACR application 139a may provide content target advertisement, a content provider portal service, a program specific service such as electronic program guide (EPG), or a content provider specific service. While the ACR application 139a interact with the ACR engine 136a through the ACR application, it receives content information or signature from the ACR engine 136a and additionally obtains an enhanced service corresponding to the content information or signature to play them in the play device 120. For this, an ACR application interface that the ACR application 139a uses is shown in Table 3 below.

TABLE 3

| | Name | description |
|---|---|---|
| Method | String getContentID( ) | Return recognized content id, or undefined if content has not been recognized. |
| | Date getTiming( ) | Return time stamp, or undefined if content has not been recognized or time stamp is unavailable. |
| | String getSignature( ) | Return the signature captured, or undefined if capturing of the signature has failed. |

Figure 12:
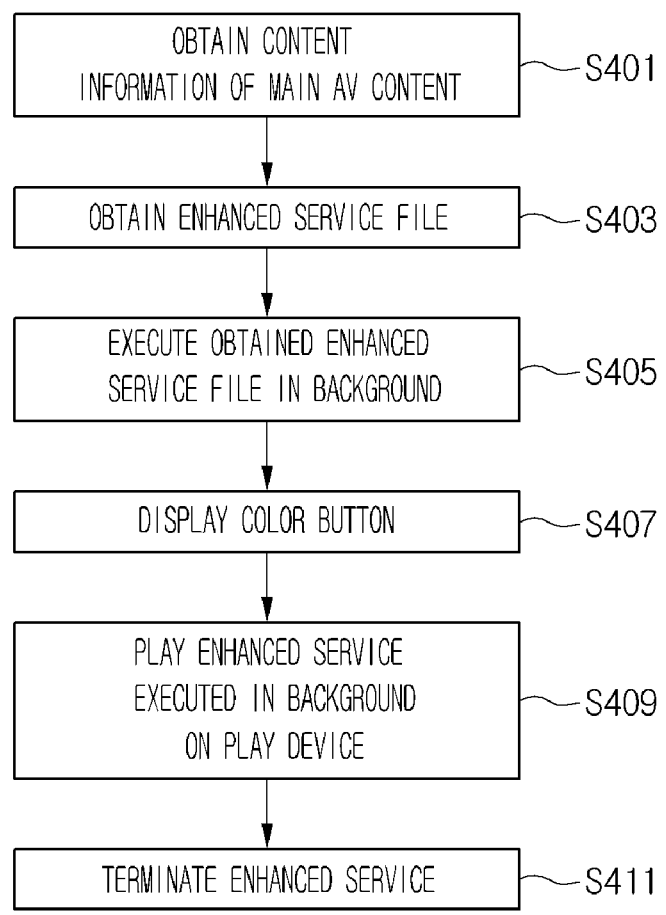
FIG. 12 is a flowchart illustrating an operation of an enhanced service management unit according to an embodiment.

FIG. 12 is a flowchart illustrating an operation of an enhanced service management unit according to an embodiment.

When the broadcast receiving device 60 and the video display device 100 are turned on and the external input port 111 of the video display device 100 is selected, the ACR daemon 137a obtains the content information of a main AV content broadcasted in a tuned channel through at least one ACR engine 136a in operation S401.

Then, the ACR daemon 137a obtains an available enhanced service relating to the content information in operation S403.

The ACR daemon 137a executes the obtained enhanced service in background in operation S405.

The ACR daemon 137a displays a color button on the display unit 121 to notify a user that enhanced service is available in operation S407.

When the ACR daemon 137a receives the use of the enhanced service, it plays the enhanced service executed in background in the play device 120 in operation S409.

If a change or main AV content is changed, the ACR daemon 137a recognizes a change through at least one ACR engine 136a and terminates the enhanced service in operation S411.

Figure 13:
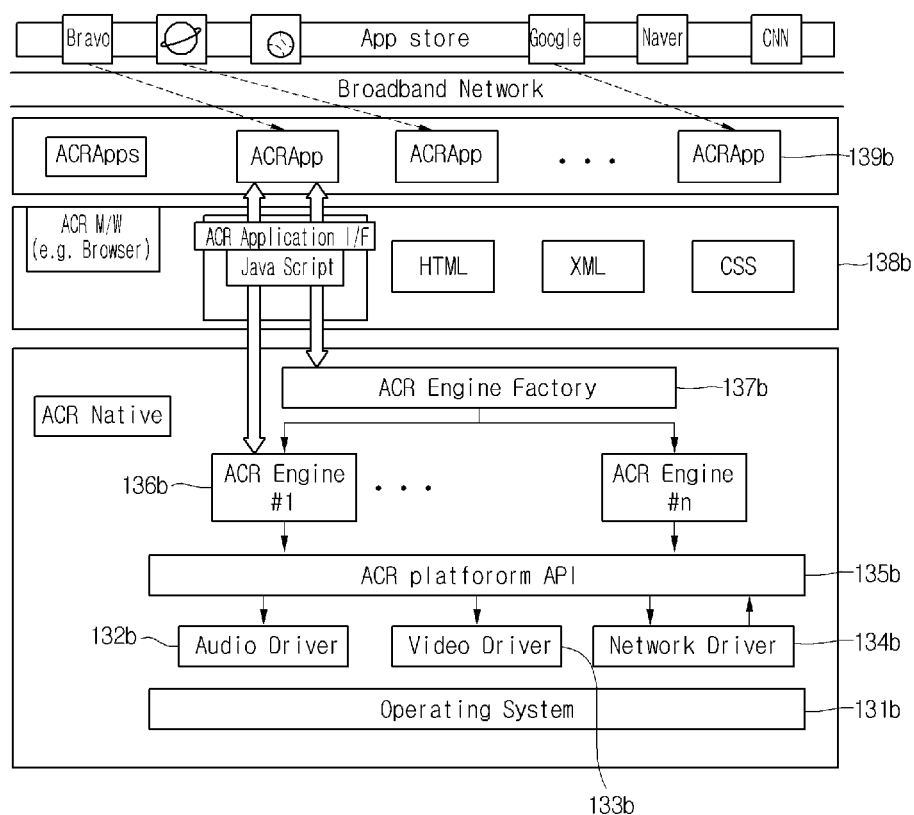
FIG. 13 is a hierarchy diagram of an enhanced service management unit according to an embodiment.

FIG. 13 is a hierarchy diagram of an enhanced service management unit according to an embodiment.

As shown in FIG. 13, the enhanced service management unit 130 may include an operating system 131b, an audio driver 132b, a video driver 133b, a network driver 134b, an ACR platform application program interface (API) 135b, at least one ACR engine 136b, an ACR engine management unit 137b, an ACR middleware 138b, and at least one ACR application 139b.

When the enhanced service management unit 130 is used as shown in FIG. 13, a user may need to necessarily recognize a channel or content. However, since the number of queries for ACR may be reduced, server overhead may be decreased.

The audio driver 132b, the video driver 133b, the network driver 134b, the ACR platform API 135b, the at least one ACR engine 136b, and the ACR middleware 138b in the enhanced service management unit 130 of FIG. 13 are identical or similar to those 132a, 133a, 134a, 135a, 136a, and 138a in the enhanced service management unit 130 FIG. 11. Therefore, their detailed descriptions will be omitted.

The ACR engine management unit 137b manages a list of at least one ACR engine 136b and provides a selection interface of the ACR engine 136b to the ACR application 139b.

The ACR application 139b may provide user experience enhanced by ACR to a user. The ACR application 139b may be an application downloaded from an application store or the Internet or may be a simple Uniform Resource Locator (URL). The ACR application 139b may provide content target advertisement, a content provider portal service, a program specific service such as electronic program guide (EPG), or a content provider specific service.

While the ACR application 139b interacts with the ACR engine management unit 137b through the ACR application interface of the ACR middleware 138b, it may select the ACR engine 136b to be used. For this, the ACR application interface that the ACR application 139b uses is shown in Table 4 and Table 5 below.

TABLE 4

| | Name | description |
|---|---|---|
| Property | readonly ACRCollection acrCollection | List of ACR engines installed in the Receiver |
| Method | ACR getACR(String acrId) | Return an ACR object matched with ACR Id, or undefined if no item matched is found. The argument acrid means the unique identifier of the ACR engine/solution. |
| | ACRCollection getAllACR( ) | Return the whole set of ACR objects installed in the Receiver, or undefined if no ACR is present at the Receiver. |

TABLE 5

|  | Name | description |
|---|---|---|
| Property | readonly Integer length | The number of ACR engines in the collection |
| Method | ACR item(Integer index) | Return the ACR object at position index in the collection, or undefined if no item is present at that position. The argument index means the index of the item that shall be returned. |

While the ACR application 139b interacts with the ACR engine 136b through the ACR application interface of the ACR middleware 138b, it controls the ACR engine 136b, and receives content information or signature from the ACR engine 136b to additionally obtain an enhanced service corresponding to the content information or signature. Then, the ACR application 139b plays them in the play device 120. For this, the ACR application interface that the ACR application 139b uses is shown in Table 6 below.

TABLE 6

|  | Name | description |
|---|---|---|
| Property | readonly String acrId | the unique id of the ACR engine |
|  | readonly String name | short name of ACR engine |
|  | readonly String description | Description of ACR engine |
|  | readonly Integer acrType | FP or WM |
|  | readonly Integer acrComponent | components used for ACR (audio, video and both) |
|  | readonly String contentId | for WM |
|  | readonly Date timing function | for WM |

TABLE 6-continued

|  | Name | description |
|---|---|---|
|  | onSignatureCaptured (String signature) |  |
| Constant | ACR_FINGERPRINT = 1 | ACR done by fingerprint technology |
|  | ACR_WATERMARK = 2 | ACR done by watermark technology |
|  | ACR_AUDIO = 1 | Audio component is used for the content recognition. |
|  | ACR_VIDEO = 2 | Video component is used for the content recognition. |
|  | ACR_AUDIO_VIDEO = 3 | Both audio/video components are used. |
| Method | Boolean Initialize( ) | Initialize the ACR object. |
|  | Boolean Finalize( ) | Destroy the ACR object. |
|  | Boolean startACR( ) | Start ACR engine in order to get ready to content recognition. |
|  | Boolean stopACR( ) | Stop the ACR engine. |
|  | Boolean getSignature( ) | for FP |
|  | String getContentId( ) | for WM |
|  | String getTiming( ) | for WM |
|  | String getALSURL( ) | for WM |
|  | Boolean setAudioAlgorithm (Integer audioNumCh, Interget audioSampleRate, Integer audioNumSamples, Integer audioBitPerSample) |  |
|  | Boolean setVideoAlgorithm (Integer videoNumFrames, RECT screenRect) |  |

Thus, one example of a fingerprint sample code of a content provider related application using such an ACR application interface is shown in Table 7.

TABLE 7

```
<HEAD>
<title>NBCU app</title>
<meta name="acr " content="zeitera-fp-audio" />
<meta name="appAttribute" content ="CP" />
<object type="application/x-acr"  id="ACRSol" / >
<object type="application/x-acrfactory"  id="ACRFac" / >
<script type="text / javascript">
var aspfpURL= "www.zeitera.com/fp-audio";
var acrSol = get ElementbyID(ACRSol);
var acrFac = get ElementbyID(ACRFac);
acrSol=acrFac.getACR("zeitera-fp-audio");
if(acrSol == null)    return;
acrSol . Initiailize( );
while ( ) { / / for FP
   var signature = acrSol .getSignature( );
   if (signature == null) continue;
   var res = sendRequest (aspfpURL, signature); / / 1st query
      if  (res.content ID.substring(0, 3) == "NBCU" ) { / / CP matching success
         var res2 = sendRequest(res.alsURL); / / 2nd query
         if (res2.asURL) {
            / / launch specific app application with this appURL
         }
      }
}
</script>
</HEAD>
<BODY>
  ...
</BODY>
```

Thus, one example of a fingerprint sample code of a content provider related application using such an ACR application interface is shown in Table 8.

TABLE 8

```
<HEAD>
<title>NBCU Heros app</title>
<meta name="acr " content="zeitera-fp-audio"/>
<meta name="appAttribute" content="Program"/>
<object  type="application/x-acr"  id="ACRSol" / >
<object  type="application/x-acrfactory"  id="ACRFac" / >
<script  type="text / javascript">
var aspfpURL= "www.zeitera.com/fp-audio";
var acrSol = get ElementbyID(ACRSol) ;
var acrFac = get ElementbyID(ACRFac) ;
acrSol=acrFac .getACR("zeitera-fp-audio") ;
if(acrSol == null)    return;
acrSol . Initiailize( );
while ( ) { / / for FP
    var signature = acrSol .getSignature( ) ;
    if (signature == null) continue;
    var res = sendRequest (aspfpURL, signature) ; / / 1st query
        if   (res.content ID.substring(0, 9) == "NBCU-Heros" ) { / / Program matching
success
            var res2 = sendRequest (res.alsURL, res.content ID, res.timing); / / 2nd query
            if (res2.asURL) {
                / / launch specific app application with this appURL
            }
        }
}
</script>
</HEAD>
<BODY>
</BODY>
```

Thus, one example of a watermarking sample code of a content provider related application using such an ACR application interface is shown in Table 9.

TABLE 9

```
<HEAD>
<title>NBCU app</title>
<meta name>"acr " content="nielsen-wm-audio" />
<meta name="appAttribute" content="CP" />
<object  type="application/x-acr"  id="ACRSol" / >
<object  type="application/x-acrfactory"  id="ACRFac" / >
<script type="text/javascript">
var aspfpURL= "www.nielsen.com/wm-audio" ;
var acrSol = get ElementbyID(ACRSol) ;
var acrFac = get ElementbyID(ACRFac) ;
acrSol=acrFac . getACR( "nielsen-wm-audio" );
if (acrSol == null)   return;
acrSol . Initiailize( ) ;
while ( ) { / / for WM
    var content Id = acrSol .getContent Id( );
    if (content Id == null) continue;
    var alsURL = acrSol .getALSURL( );
    if (content Id.substring(0, 3) == "NBCU" ) { / / CP matching success
        var res = sendRequest(alsURL); / / 2nd query
        if (res.asURL) {
            / / launch specific app application with this appURL
        }
    }
}
</script>
</HEAD>
<BODY>
    ...
</BODY>
```

Thus, one example of a watermarking sample code of a content provider related application using such an ACR application interface is shown in Table 10.

TABLE 10

```
<HEAD>
<title>NBCU Heros app</title>
<meta name="acr " content="nielsen-wm-audio" />
<meta name="appAttribute" content="Program" />
<object  type="application/x-acr"   id="ACRSol" / >
<object  type="application/x-acrfactory"   id="ACRFac" / >
<script type="text / javascript">
var aspfpURL= "www.nielsen.com/wm-audio";
var acrSol = get ElementbyID(ACRSol);
var acrFac = get ElementbyID(ACRFac);
acrSol=acrFac .getACR("nielsen-wm-audio");
if(acrSol == null)    return;
acrSol . Initiailize( );
while ( ) { / / for WM
    var contentId = acrSol .getContent Id( );
    if (contentId == null) continue;
    var timing = acrSol .getTiming( );
    var alsURL = acrSol .getALSURL( );
    if   (contentId.substring(0, 9) == "NBCU-Heros" ) { / / Program matching success
        var res = sendRequest(alsURL, content Id, timing); / / 2nd query
        if (res.asURL) {
          / / launch specific app application with this appURL
        }
    }
}
</script>
</HEAD>
<BODY>
    ...
</BODY>
```

Figure 14:
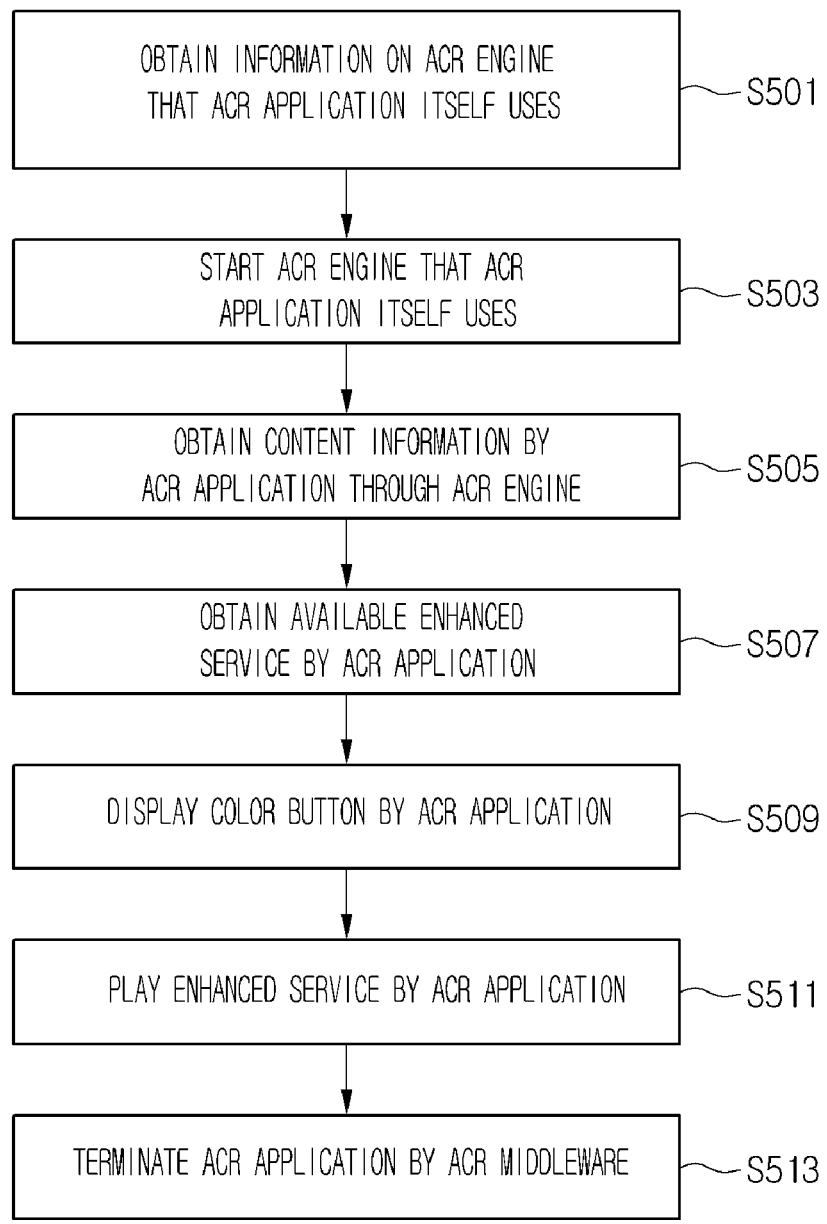
FIG. 14 is a flowchart illustrating an operation of an enhanced service management unit according to an embodiment.

FIG. 14 is a flowchart illustrating an operation of an enhanced service management unit according to an embodiment.

Although the broadcast receiving device 60 and the video display device 100 are turned on and the external input port 111 of the video display device 100 is selected, the video display device 100 may not perform automatic content recognition before the ACR application 139b is executed.

Once the corresponding channel related ACR application 139b is executed by a user recognizing a channel of a main AV content, the ACR application 139b queries and information on the ACR engine 136b that it uses to the ACR engine management unit 137b and receives it in operation S501.

Then, the ACR application 139b starts the ACR engine 136b that it uses in operation S503 and obtains content information through the ACR engine 136b in operation S505.

The ACR application 139b obtains an available enhanced service relating to a main AV content through the obtained content information in operation S507, and displays a color button on the display unit 121 to notify a user that an enhanced service is available in operation S509.

When the ACR application 139b receives the use of the enhanced service, it plays the enhanced service in the play device 120 in operation S511.

When the ACR middleware 138b receives a user input relating to the termination of the ACR application 139b, it terminates the ACR application 139b in operation S513.

Figure 15:
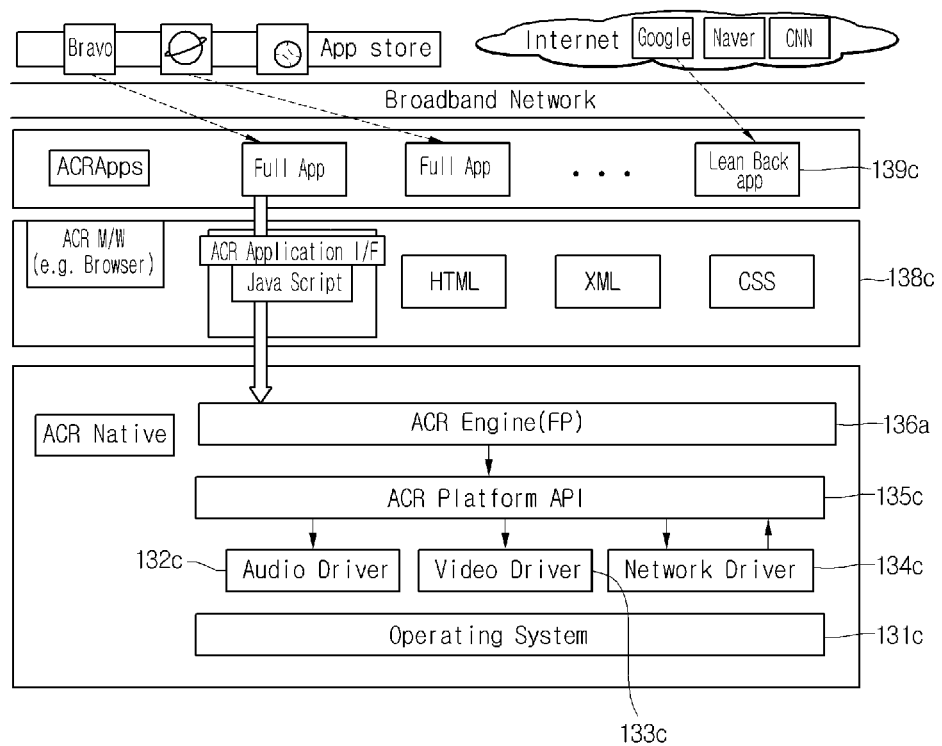
FIG. 15 is a hierarchy diagram of an enhanced service management unit according to an embodiment.

FIG. 15 is a hierarchy diagram of an enhanced service management unit according to an embodiment.

As shown in FIG. 15, the enhanced service management unit 130 may include an operating system 131c, an audio driver 132c, a video driver 133c, a network driver 134c, an ACR platform API 135c, an ACR engine 136c, an ACR middleware 138c, and at least one ACR application 139c.

When the enhanced service management unit 130 is used as shown in FIG. 15, a user may need to necessarily recognize a channel or content. However, since the number of queries for ACR may be reduced, server overhead may be decreased.

The audio driver 132c, the video driver 133c, the network driver 134c, the ACR platform API 135c, and the ACR middleware 138c in the enhanced service management unit 130 of FIG. 15 are identical or similar to those 132a, 133a, 134a, 135a, and 138a in the enhanced service management unit 130 FIG. 11. Therefore, their detailed descriptions will be omitted.

The ACR engine 136c extracts feature information from some frames or a certain section of audio samples of a main AV content to transmit a query including the extracted feature information to an ACR adjustment server (not shown). The ACR adjustment server may transmit a fingerprint server address in response to the query. Additionally, the ACR adjustment server may transmit content information corresponding to the feature information together with the fingerprint server address.

When receiving the fingerprint server address from the ACR engine 136c, the ACR application 139c directly transmit a query, which includes the feature information that the ACR engine 136c extracts, to the fingerprint server corresponding to the fingerprint server address. For this, the ACR application interface that the ACR application 139c uses is shown in Table 11 below.

TABLE 11

| | Name | Description |
| --- | --- | --- |
| Property | Readonly String signature | For fingerprint, |
| | function (String signature) onSignatureCaptured | For fingerprint, function pointer: pointed function will return signature value from lower ACREngine, event driven |
| Method | Boolean getSignature( ) | For fingerprint, asynchronous call to get signature, will use onSignatureCaptured |

TABLE 11-continued

| Name | Description |
| --- | --- |
| Boolean getContentID( ) | For watermark, Return recognized content id, or undefined if content has not been recognized. |
| Boolean resetACREngine( ) | When getSignature fails several times(ch change), app will give control to ACREngine to query back to ACRCoordinator. |
| String getACRBackend( ) | Return ACRBackend URL |

Thus, one example of a fingerprint sample code using such an ACR application interface is shown in Table 12.

TABLE 12

```
<HEAD>
<title>CP app</title>
<object  type="application/x-acr"   id="ACRSol" / >
<script type="text / javascript">
var acrSol = get ElementbyID(ACRSol) ;
acrSol . onSignatureCaptured = returnSignature;
var acrBE = acrSol .getACRBackend( );
function doACR( ) {
   acrSol .getSignature( );
   setTimer("acrTimeout", 1000);
}
function acrTimeout ( ) {
   timeout++;
   if(timeout > 3)
      acrSol.resetACREngine( );
}
function returnSignature(signature) {
   timeout = 0;
   doSpecificJob(signature);
}
function doSpecificJob(signature) {
   // do specific work regarding this time
}
</script>
</HEAD>
<BODY onload="doACR( )">
...
</BODY>
```

Figure 16:
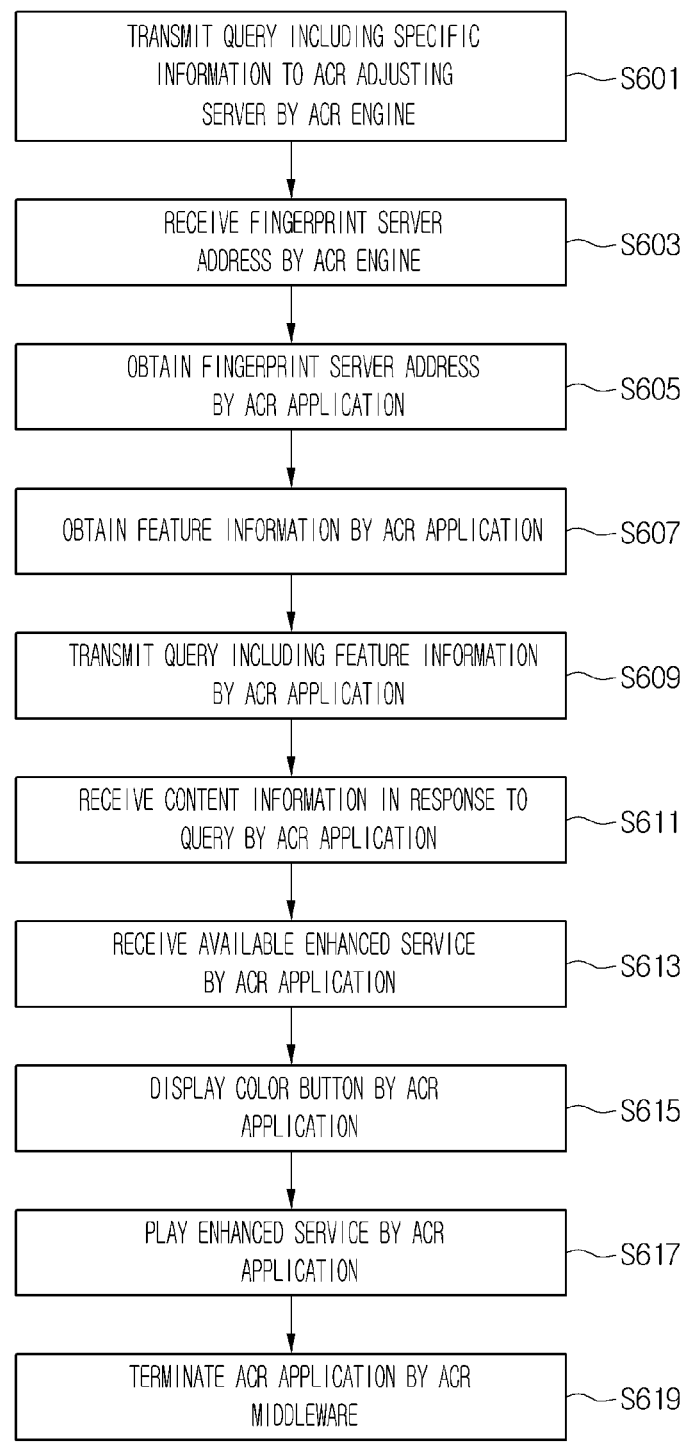
FIG. 16 is a flowchart illustrating an operation of an enhanced service management unit according to an embodiment.

FIG. 16 is a flowchart illustrating an operation of an enhanced service management unit according to an embodiment.

When the broadcast receiving device 60 and the video display device 100 are turned on and the external input port 111 of the video display device 100 is selected, the ACR engine 136c extracts feature information from some frames or a certain section of audio samples of a main AV content to transmit a query including the extracted feature information to an ACR adjustment server (not shown) in operation S601.

The ACR engine 136c receives a fingerprint server address in response to the query in operation S603.

The ACR application 139c obtains the fingerprint server address from the ACR engine 136c through a getACRBackend( ) method.

The ACR application 139c obtains feature information of a certain video frame section or a certain audio section of a main AV content from the ACR engine 136c through a getSignature( ) method in operation S607.

The ACR application 139c transmits a query, which includes the obtained feature information, to a fingerprint server corresponding to the obtained fingerprint server address in operation S609.

The ACR application 139c receives content information in response to the query in operation S611.

The ACR application 139c obtains an available enhanced service on the basis of the obtained content information in operation S613, and displays a color button on the display unit 121 to notify a user that an enhanced service is available in operation S615.

When the ACR application 139c receives the use of the enhanced service, it plays the enhanced service in the play device 120 in operation S617.

When the ACR middleware 138c receives a user input relating to the termination of the ACR application 139c, it terminates the ACR application 139c in operation S619.

Figure 17:
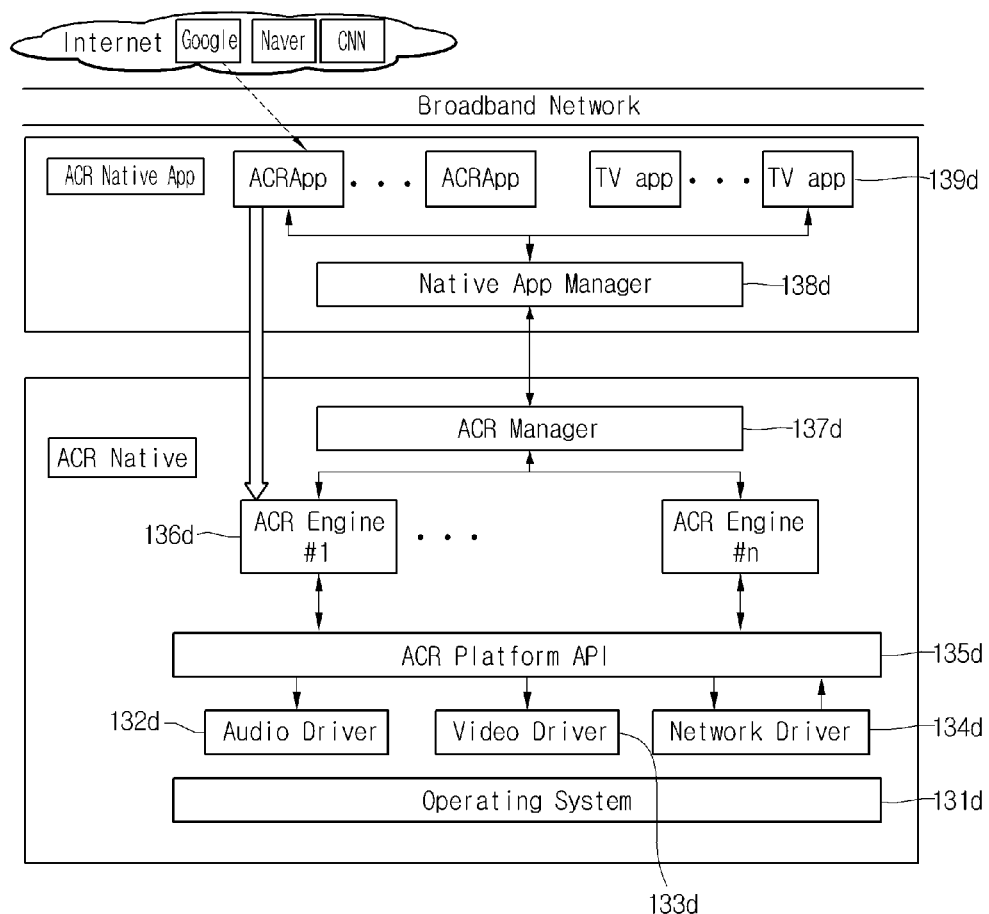
FIG. 17 is a hierarchy diagram of an enhanced service management unit according to an embodiment.

FIG. 17 is a hierarchy diagram of an enhanced service management unit according to an embodiment.

As shown in FIG. 17, the enhanced service management unit 130 may include an operating system 131d, an audio driver 132d, a video driver 133d, a network driver 134d, an ACR platform API 135d, at least one ACR engine 136d, an ACR engine management unit 137d, an application management unit 138d, and at least one ACR application 139d.

When the enhanced service management unit 130 is used as shown in FIG. 17, a user doesn't need to necessarily recognize a channel or content and an ACR operation may be performed always.

The audio driver 132d, the video driver 133d, the network driver 134d, the ACR platform API 135d, and the plurality of ACR engines 136d in the enhanced service management unit 130 of FIG. 17 are identical or similar to those 132a, 133a, 134a, 135a, and 136a in the enhanced service management unit 130 FIG. 11. Therefore, their detailed descriptions will be omitted.

The ACR engine management unit 137d confirms that the ACR engine 136d matches to the main AV content received from the external input port 111 and confirms that the ACR engine 136d matches to the application 139d. At this point, the ACR engine management unit 137d controls the plurality of ACR engines 136d to simultaneously or sequentially perform watermark extraction or query transmission. The ACR engine management unit 137d controls the plurality of ACR engines 136d through priority. If one of the plurality of ACR engines 136d is successful in recognizing a main AV content, the ACR engine management unit 137d puts the remaining ACR engines in sleep mode and obtains the content information of the main AV content from the operating ACR engine.

While the application management unit 138d interacts with the ACR engine management unit 137d, it controls generation, start, stop, sleep, and termination of the ACR application.

The ACR application 139d may be a built-in application. The ACR application 139d may control the ACR engine 136b through functions shown in Table 13.

TABLE 13

| | Name |
| --- | --- |
| Function calls | char *getContent ID( ) <br> Date getTiming( ) <br> char *getSignature( ) <br> Boolean registerEventListener(EvtType evtType, Boolean (*eventListener)(EvtType evtType, char *contentId, Date *timing, char *signature)); |
| Data Structure | struct Date { <br>     int year; <br>     int month; <br>     int day; <br>     int hour; <br>     int minute; |

TABLE 13-continued

```
        Name int    second;
    int    msecond;
};
typedef enum EvtType {
    EVT_PROGRAM_CHANGED,
    EVT_CHANNEL_CHANGED,
    EVT_ALL };
```

Figure 18:
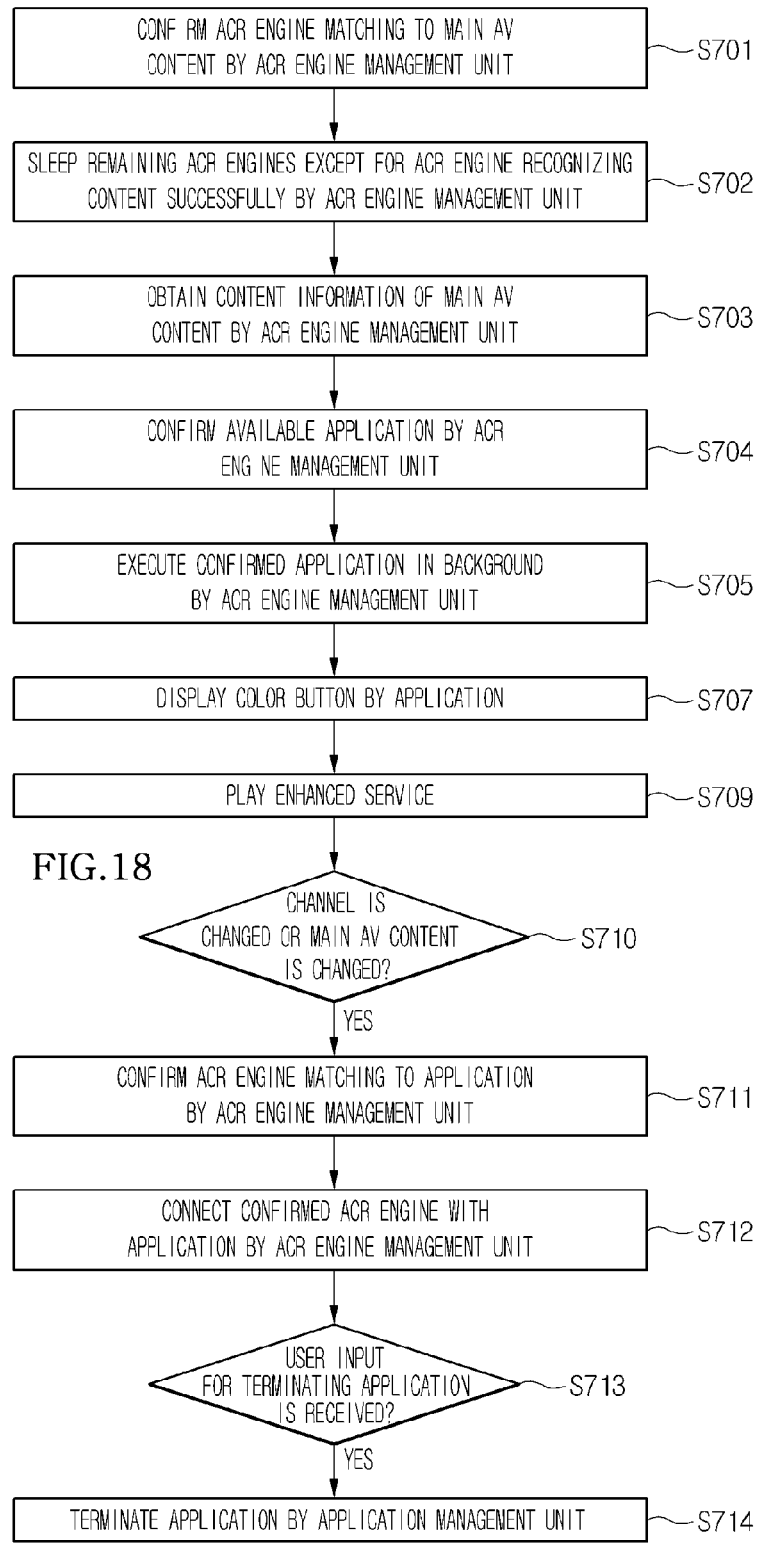
FIG. 18 is a flowchart illustrating an operation of an enhanced service management unit according to an embodiment.

FIG. 18 is a flowchart illustrating an operation of an enhanced service management unit according to an embodiment.

When the broadcast receiving device 60 and the video display device 100 are turned on and the external input port 111 of the video display device 100 is selected, the ACR engine management unit 137d confirms that the ACR engine 136a matches to the main AV content received from the external input port 111 in operation S701. At this point, the ACR engine management unit 137d controls the plurality of ACR engines 136d to simultaneously or sequentially perform watermark extraction or query transmission. The ACR engine management unit 137d controls the plurality of ACR engines 136d through priority.

If one of the plurality of ACR engines 136d is successful in recognizing a main AV content, the ACR engine management unit 137d puts the remaining ACR engines in sleep mode in operation S702, and obtains the content information of the main AV content from the operating ACR engine in operation S703.

Then, the ACR engine management unit 137d confirms an available application relating to content information in operation S704, and requests the execution of the confirmed application 139d to the application management unit 138d.

The application management unit 138d executes the confirmed application 139d in background in operation S705.

The application 139d executed in background displays a color button on the display unit 121 to notify a user that enhanced service is available in operation S707.

When the application 139d executed in background receives the use of the enhanced service from a user, it plays the enhanced service in the play device 120 in operation S709.

If a channel or main AV content is changed in operation S710, the ACR engine management unit 137d confirms the ACR engine 136a matching to the application 139d and connects the confirmed ACR engine 136a to the application 139d in operation S711. At this point, the ACR engine management unit 137d controls the plurality of ACR engines 136d to simultaneously or sequentially perform watermark extraction or query transmission.

If the application management unit 138d receives a user input for the termination of the application 139d in operation S712, it terminates the application 139d in operation S713.

Figure 19:
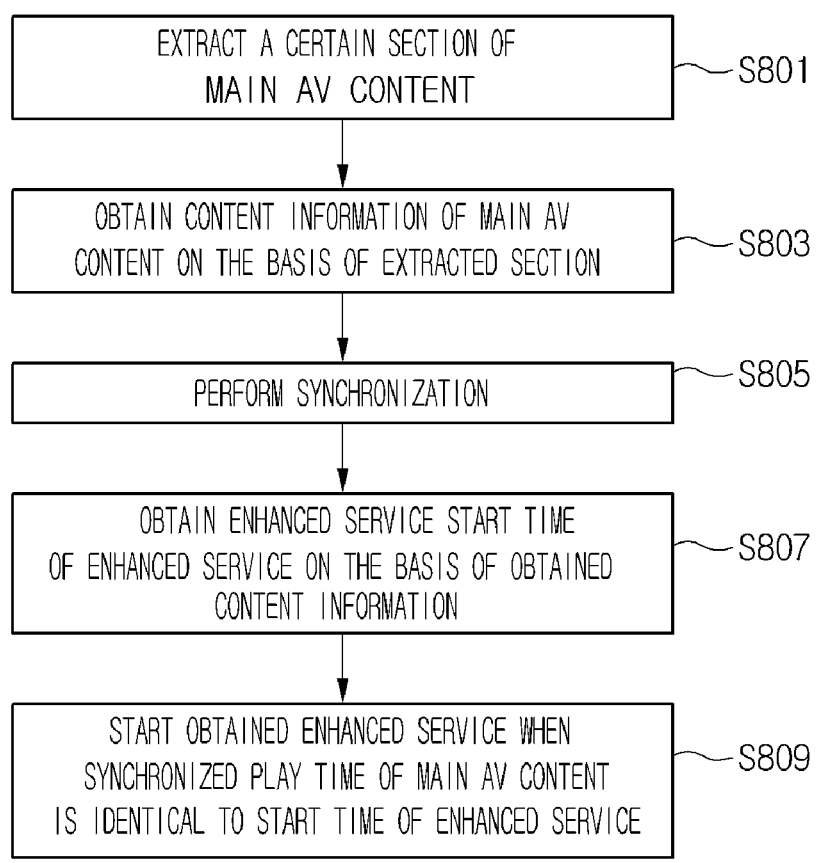
FIG. 19 is a flowchart illustrating a method of synchronizing a play time of a main AV content with a play time of an enhanced service according to an embodiment.

Then, referring to FIGS. 19 and 20, a method of synchronizing a play time of a main AV content with a play time of an enhanced service according to an embodiment will be described.

Then, referring to FIGS. 19 and 20, a method of synchronizing a play time of a main AV content with a play time of an enhanced service according to an embodiment will be described.

Enhanced service information may include a start time of an enhanced service. At this point, the video display device 100 may need to start the enhanced service at the start time. However, since the video display device 100 receives a signal transmitting an uncompressed main AV content with no time stamp, the reference time of a plying time of the main AV content is different from that of a start time of the enhanced service. Although the video display device 100 receives a main AV content having time information, the reference time of a plying time of the main AV content may be different from that of a start time of the enhanced service, like rebroadcasting. Accordingly, the video display device 100 may need to synchronize the reference time of the main AV content with that of the enhanced service. Especially, the video display device 100 may need to synchronize the play time of the main AV content with the start time of the enhanced service.

First, the enhanced service management unit 130 extracts a certain section of a main AV content in operation S801. The section of the main AV content may include at least one of some video frames or a certain audio section of the main AV content. Time that the enhanced service management unit 130 extracts the section of the main AV content is designated as Tn.

The enhanced service management unit 130 obtains content information of a main AV content on the basis of the extracted section. In more detail, the enhanced service management unit 130 decodes information encoded with invisible watermark in the extracted section to obtain content information. Additionally, the enhanced service management unit 130 may extract feature information in the extracted section, and obtain the content information of the main AV content from the fingerprint server 22 or the content information storage unit 151 on the basis of the extracted feature information. Time that the enhanced service management unit 130 obtains the content information is designated as Tm.

Moreover, the content information includes a start time Ts of the extracted section. After the content information acquisition time Tm, the enhanced service management unit 130 synchronizes the play time of the main AV content with the start time of the enhanced service on the biases of Ts, Tm, and Tn. In more detail, the enhanced service management unit 130 regards the content information acquisition time Tm as a time Tp calculated by the following Equation 1.

$$Tp = Ts + (Tm - Tn) \quad \text{[Equation 1]}$$

Additionally, the enhanced service management unit 130 regards a time of when Tx elapses after the content information acquisition time as Tp+Tx.

Then, the enhanced service management unit 130 obtains an enhanced service and its start time Ta on the obtained content information in operation S807.

If the synchronized play time of the main AV content is identical to the start time Ta of the enhanced service, the enhanced service management unit 130 starts the obtained enhanced service in operation S809. In more detail, the enhanced service management unit 130 may start the enhanced service when the following Equation 2 is satisfied.

$$Tp + Tx = Ta \quad \text{[Equation 2]}$$

Figure 20:
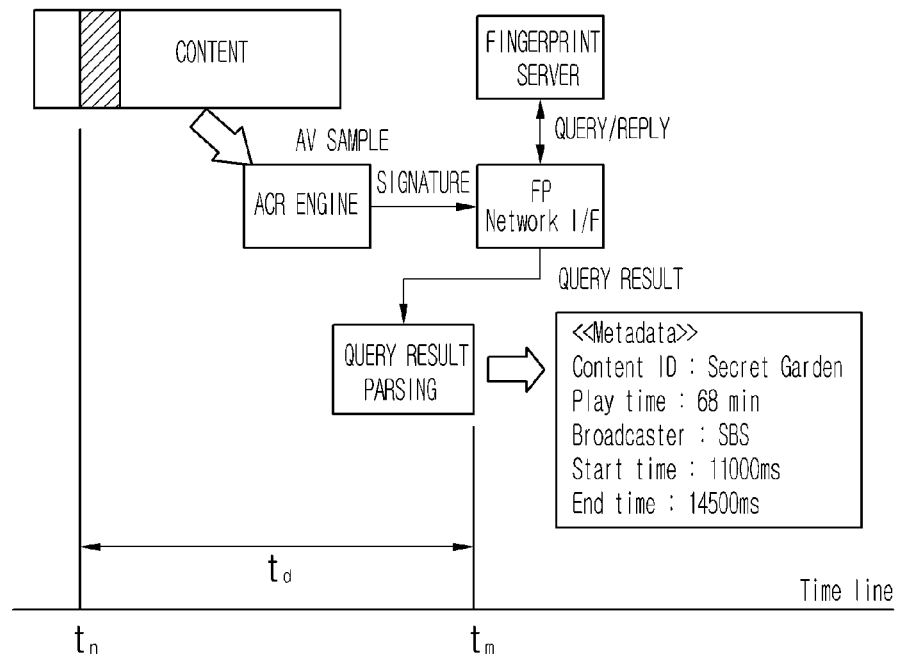
FIG. 20 is a conceptual diagram illustrating a method of synchronizing a play time of a main AV content with a play time of an enhanced service according to an embodiment.

FIG. 20 is a conceptual diagram illustrating a method of synchronizing a play time of a main AV content with a play time of an enhanced service according to an embodiment.

As shown in FIG. 20, the video display device 100 extracts an AV sample during a system time Tn.

The video display device 100 extracts feature information from the extracted AV sample, and transmits a query including the extracted feature information to the fingerprint server 22 to receive a query result. The video display device 100 confirms whether a start time Ts of the extracted AV sample corresponds to 11000 ms at Tm by parsing the query result.

Accordingly, the video display device 100 regards the time of when the start time of the extracted AV sample is confirmed according to Equation 1 as Ts+(Tm−Tn), so that, after that, the play time of the main AV content may be synchronized with the start time of the enhanced service.

Next, an ACR application will be described according to various embodiments with reference to FIGS. 21 to 50.

The ACR application may include an auto playing application, a content provider application, and an video display manufacturer application.

Figure 21:
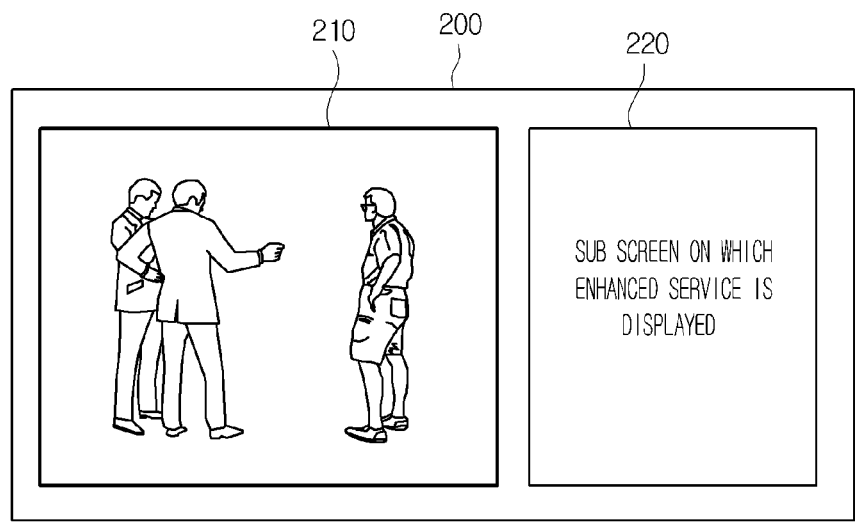
FIG. 21 is a screen when an auto playing application is executed according to an embodiment.

FIG. 21 is a screen when an auto playing application is executed according to an embodiment.

The auto playing application automatically plays an enhanced service even when a user makes no action. In this sense, the auto playing application is designated as a lean back application in this specification.

The auto playing application automatically plays an enhanced service such as scene related information that a content provider or broadcasting station provides during playing of the main AV content according to a play time of the main AV content, without a user's input. That is, a content provider or broadcasting station entirely controls the auto playing application.

As shown in FIG. 21, once the auto playing application is executed, the screen 200 may include a sub screen 210 where a reduced main AV content is played and a sub screen 220 where additional information is displayed. The sub screen 200 where additional information is displayed may be spatially separated from the sub screen 210 where a main AV content is played.

Moreover, when an auto playing application is executed, an area where additional information is displayed may be semi-transparent. In this case, the area where additional information is displayed may overlay on an area where a main AV content played.

FIG. 22 is a screen when a content provider application is executed according to an embodiment.

In this specification, the content provider application is designated as a full interactive application.

As shown in FIG. 22 (A), the video display device 100 downloads and stores a plurality of applications. FIG. 22 (A) illustrates icons 230 of the applications. A content provider application among the plurality of applications is an application created and distributed by a content provider, and thus, may be under control of the content provider.

A user of the video display device 100 may download a content provider application from an application store and determines whether to execute the downloaded content provider application.

FIG. 22 (B) is a screen when a content provider application is executed. As shown in FIG. 22 (B), the screen 200 may include the sub screen 210 where a reduced main AV content is played and the sub screen 220 where additional information is displayed.

Hereinafter, a video display device manufacturer application will be described according to an embodiment with reference to FIGS. 23 to 50.

The video display device manufacturer application is created and controlled by a video display device manufacturer, and may be stored in advance when the video display device 100 is manufactured. That is, the video display device manufacturer application may provide the same service and user interface regardless of a content provider or content.

The video display device manufacturer application may include an area where an enhanced service that a content provider provides is displayed and an area where an enhanced service that a video display device manufacturer provides is displayed, separately. A user of the video display device 100 may determine whether to execute the video display device manufacturer application.

The video display device manufacturer application may have two types.

The video display device manufacturer application of the first type has a resizing user interface. The video display device manufacturer application having the resizing user interface reduces the size of an area where a main AV content is displayed to display all the main AV content in a reduced area. Additionally, the video display device manufacturer application having the resizing user interface reshapes an area where an application is displayed with an L or inverse-L shaped structure.

The video display device manufacturer application of the second type has an overlay user interface. The video display device manufacturer application having the overlay user interface maintains the size of an area where a main AV content is displayed, and overlaps an area where an application is displayed on the main AV content. Since the area where an application is displayed covers the main AV content, an application area may be semi-transparent.

Figure 23:
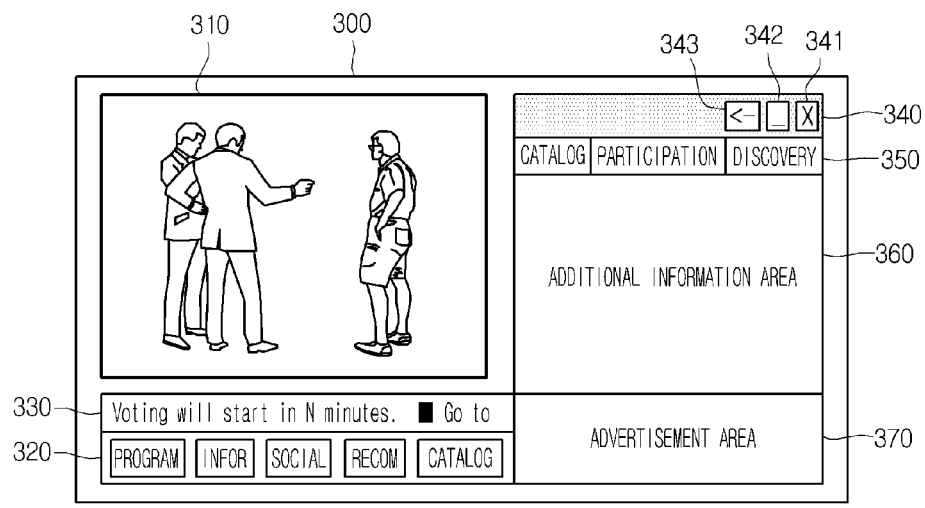
FIG. 23 is a screen when a video display device manufacturer application having a resizing user interface is executed according to an embodiment.

FIG. 23 is a screen when a video display device manufacturer application having a resizing user interface is executed according to an embodiment.

As shown in FIG. 23, the screen 300 of when a video display device manufacturer application having a resizing user interface is executed includes a main content area 310 where a main AV content is displayed, a main menu area 320 where a main menu is displayed, a notification area 330 where a notification message is displayed, a control button area 340 where a control button is displayed to control the video display device manufacturer application, a sub menu area 350 where a sub menu is displayed, an additional information area 360 where additional information is displayed, and an advertisement area 370 where advertisement is displayed.

The control button area 340 includes an ending button 341 for ending the video display device manufacturer application, a hiding button 342 for hiding the video display device manufacturer application, and a back button 343 for returning to previous information.

In the video display device manufacturer application having the resizing user interface, the main AV content area 310 is disposed on the top-left of the screen 300; the main menu area 320 and the notification area 330 is disposed on the bottom of the main AV content area 310; the control button area 340 is disposed on the top-left; the sub menu area 350 is disposed between the control button area 340 and the additional information area 360; the advertisement area 370 is disposed on the bottom-right; and the additional information area 360 is disposed between the sub menu area 350 and the advertisement area 370. However, their positions may vary.

Figure 24:
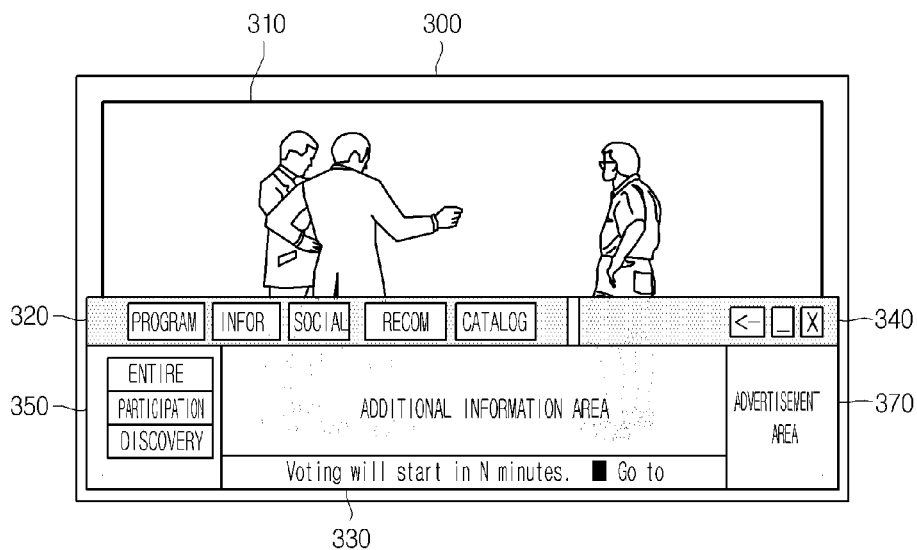
FIG. 24 is a screen when a video display device manufacturer application having an overlay user interface is executed according to an embodiment.

FIG. 24 is a screen when a video display device manufacturer application having an overlay user interface is executed according to an embodiment.

As shown in FIG. 24, like the video display device manufacturer application having the resizing user interface, the screen 300 of when the video display device manufacturer application having the overlay user interface is executed includes a main content area 310 where a main AV content is displayed, a main menu area 320 where a main menu is displayed, a notification area 330 where a notification message is displayed, a control button area 340 where a control button is displayed to control the video display device manufacturer application, a sub menu area 350 where a sub menu is displayed, an additional information area 360 where additional information is displayed, and an advertisement area 370 where advertisement is displayed.

In the video display device manufacturer application having the overlay user interface, the main AV content area 310 is disposed on the top-left of the screen 300; the main menu area 320 and the notification area 330 is disposed on the bottom of the main AV content area 310; the control button area 340 is disposed on the top-left; the sub menu area 350 is disposed between the control button area 340 and the additional information area 360; the advertisement area 370 is disposed on the bottom-right; and the additional information area 360 is disposed between the sub menu area 350 and the advertisement area 370. However, their positions may vary.

Hereinafter, a video display device manufacturer application having a resizing user interface will be mainly described.

The video display device manufacturer application receives necessary information from an ACR engine built in the video display device 100 and has two types of menus largely according to its character.

The first type menu is for a time insensitive enhanced service. That is, when a menu relating to the time insensitive enhanced service is selected, the video display device 100 obtains an identifier of a main AV content that is currently played on a screen, obtains an enhanced service on the basis of the obtained identifier, and displays the obtained enhanced service on the additional information area 360. Examples of such a time insensitive enhanced service includes titles, genres, actors, directors, and other people's evaluations, short clips, and short explanations. Through this basic information, the video display device 100 may search additional information, link to a social network service such as Facebook and Twitter, or provide a recommended service and a related advertisement.

The second type menu is for a time sensitive enhanced service. That is, when a menu relating to the time sensitive enhanced service is selected, the video display device 100 obtains an identifier and play time information of a main AV content that is currently played on a screen, obtains a time sensitive enhanced service on the basis of the obtained identifier and play time information, and displays the obtained enhanced service on the additional information area 360.

The main menu of the video display device manufacturer application includes a program menu, an information menu, a social menu, a recommendation menu, and a catalogue menu. Among these, the time insensitive menu includes the information menu, the social menu, the recommendation menu, and the catalogue menu, and the time sensitive menu includes the program menu. If the time insensitive menu is selected, the time sensitive application may be called. Other than these five main menus, other main menus may be added. If each main menu is selected, a sub menu of the selected main menu is displayed on the sub menu area 350.

Figure 25:
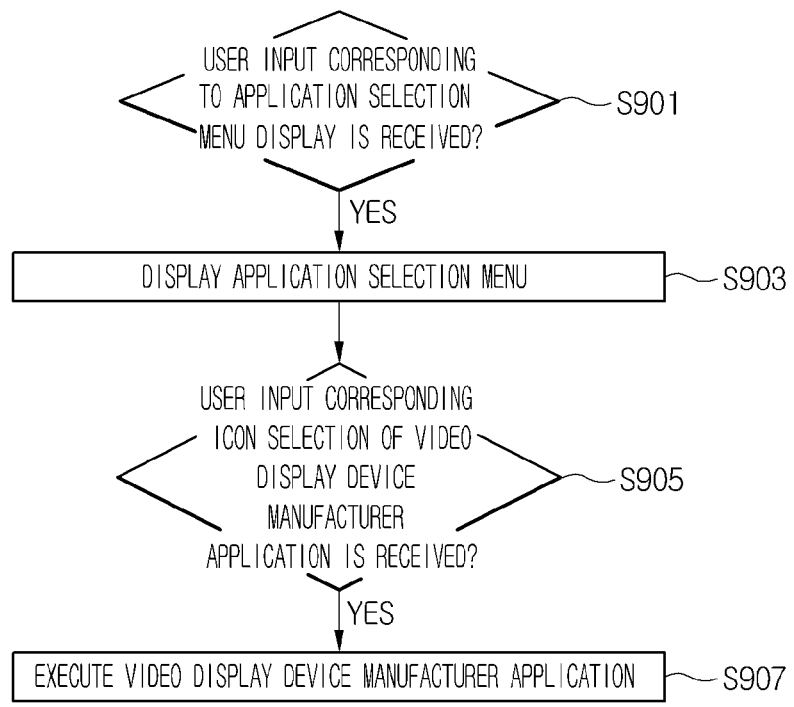
FIG. 25 is a flowchart illustrating a method of executing a video display device manufacturer application according to an embodiment.

FIG. 25 is a flowchart illustrating a method of executing a video display device manufacturer application according to an embodiment.

Figure 26:
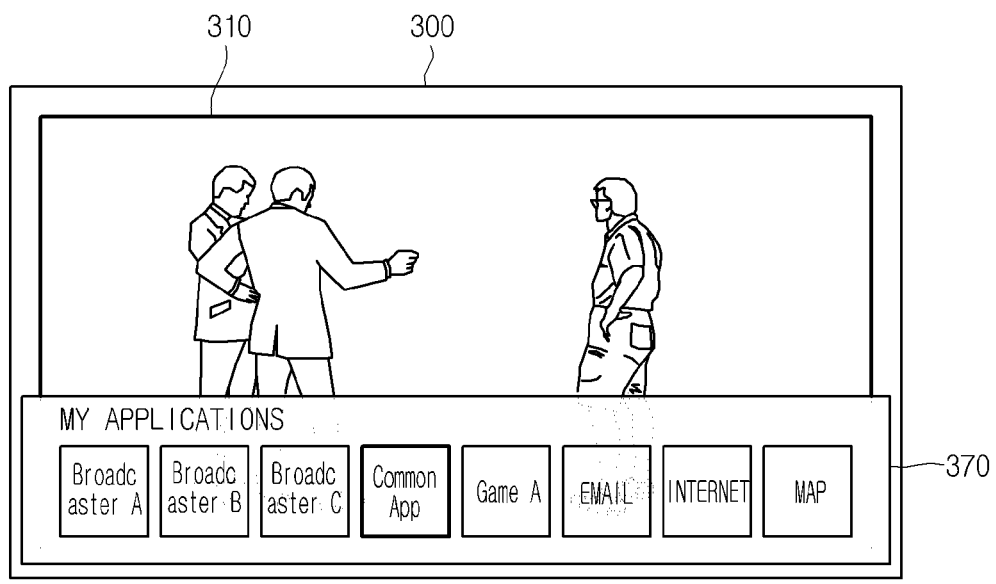
FIG. 26 is a screen when an application selection menu is displayed according to an embodiment.

When receiving a user input corresponding to an application selection menu display through pressing of a specific key of a remote controller, shaking of a motion remote controller in a downward direction, zooming of the cursor of a motion remote controller in the bottom direction of the screen while a main AV content is played in operation S901, the video display device 100 displays an application selection menu of FIG. 26 in operation S903.

FIG. 26 is a screen when an application selection menu is displayed according to an embodiment.

As shown in FIG. 26, the application selection menu 380 is disposed at the bottom of the screen 300. The application selection menu 380 may be semi-transparent.

The application selection menu 380 includes execution icons of a plurality of applications installed in the video display device 100. One icon of the displayed execution icons corresponds to the execution icon of the video display device manufacturer application.

When receiving a user input corresponding to an icon selection of the video display device manufacturer application through manipulating of the left and right arrow keys in a remote controller or moving of the cursor according to a movement of a motion remote controller in operation S905, the video display device 100 executes the video display device manufacturer application in operation S907. Through this, a user may immediately execute the application if he/she wants without access to an application store while watching a main AV content.

Once the video display device manufacturer application is executed, its main menu is displayed. If a program menu is selected by default, its sub menu is displayed on the sub menu area 350. An all sub menu is selected by default among the sub menus of the program menu. Focus is made on the all sub menu. As time elapses, an enhanced service displayed on the additional information area 360 is automatically updated. The ← button is used for returning to a previous menu and the X button is used for returning to an entire screen after closing the video display device manufacturer application.

Then, a video display device manufacturer application will be described according to an embodiment with reference to FIGS. 27 to 29.

The program main menu is a menu for displaying an application, which is time-related to a main AV content that is being played, on the additional information area 360. Enhanced service information for displaying an application linking with the main AV content may be provided from a content owner such as TV broadcasters. The video display device 100 analyzes the enhanced service information to display a corresponding application in the additional information area 360 at the right timing. UI in a screen is shown in the drawing below.

The program menu includes an all sub menu, a participation sub menu, and a discovery sub menu.

The all sub menu is a menu for displaying all applications related to the participation sub menu and discovery sub menu on the additional information area 360. The participation sub menu is a menu for displaying an application inducing program participation such as voting in a program. The discovery sub menu is a menu for displaying an application such as scene related information. The sub menu of the program menu may be added or edited according to contents of an application that a content owner wants.

Figure 27:
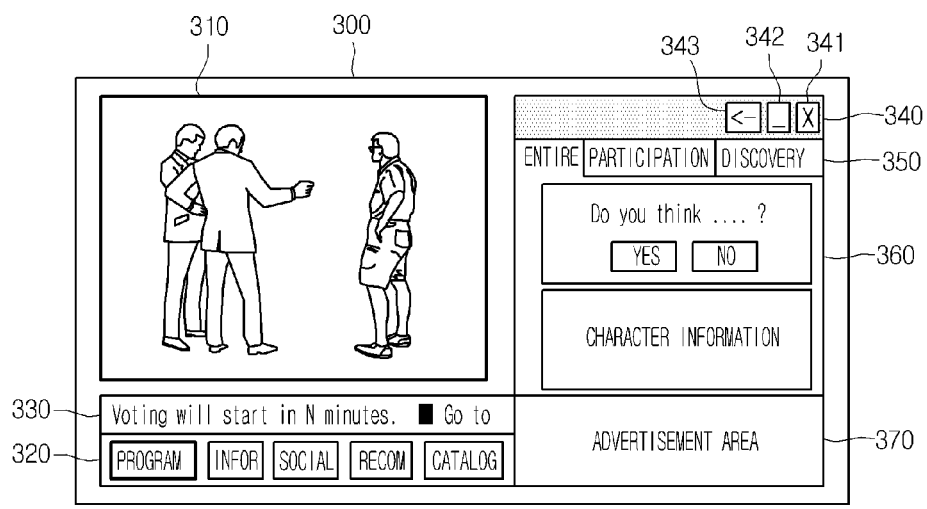
FIG. 27 is a screen when an all sub menu of a program main menu in a video display device manufacturer application is selected according to an embodiment.

FIG. 27 is a screen when an all sub menu of a program main menu in a video display device manufacturer application is selected according to an embodiment.

When the all sub menu, i.e., the first sub menu of the program main menu, is selected, the video display device 100 displays all applications related to the participation sub menu and display sub menu on the additional information area 360.

When the all sub menu is selected, the video display device 100 displays an application or event synchronized with a specific time on the additional information area 360. If there is no application synchronized with a specific time, the video display device 100 may leave the additional information area 350 as empty space. However, since the empty space may not give motivation for additional interaction to a user, if there is no application synchronized with a specific time, the video display device 100 may gather applications or events that occur prior to now in order to display a history.

When a user enters into the video display device manufacturer application, it may be seen that the user may have an intention to perform an interactive application related to a main AV content while watching the main AV content. While navigating several menus, a user may not watch an event at a specific time. Especially, when a user navigates menus for time insensitive enhanced services, the above case may likely occur. Therefore, after entering into the video display device manufacturer application, if a time sensitive event occurs during navigation, the video display device 100 displays a notification message for this on the notification area 330 to notify a user that there is a special event at the current time broadcasted from a broadcasting station.

While a user confirms music information or place information through the video display device manufacturer application, a time linked application occurs, the video display device 100 displays a notification message on the notification area 330. When receiving a user input corresponding to the Go To button press, the video display device 100 enters into a sub menu related to an occurring time linked application and displays the occurring time linked application on the additional information area 360. The notification message may be a text message. Additionally, the video display device 100 may display an amount of the delivered application as a number. The notification message may be delivered to a viewer in a Push method.

Figure 28:
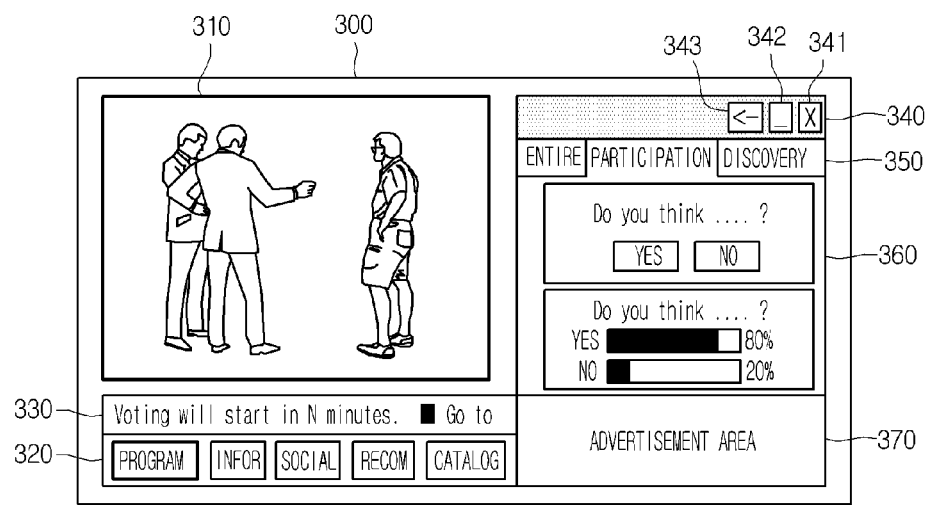
FIG. 28 is a screen when a participation sub menu of a program main menu in a video display device manufacturer application is selected according to an embodiment.

FIG. 28 is a screen when a participation sub menu of a program main menu in a video display device manufacturer application is selected according to an embodiment.

As shown in FIG. 28, once the participation sub menu is selected, the video display device 100 displays an application inducing viewer participation such as voting on the additional information area 360. If a viewer participation application occurs, the video display device 100 displays it on the additional information area 360. If the viewer participation application is voting, the video display device 100 may display voting questions and voting results. Moreover, the video display device 100 displays current events and also previous events that the viewer participates on the bottom of the current event, for the viewer's convenience.

Figure 29:
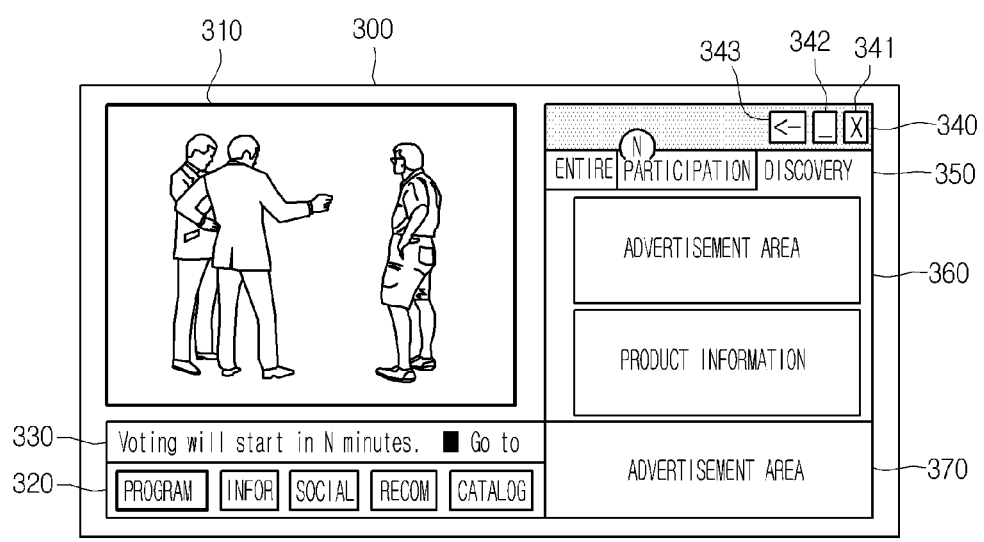
FIG. 29 is a screen when a discovery sub menu of a program main menu in a video display device manufacturer application is selected according to an embodiment.

FIG. 29 is a screen when a discovery sub menu of a program main menu in a video display device manufacturer application is selected according to an embodiment.

As shown in FIG. 29, once the discovery sub menu is selected, the video display device 100 displays all time linked applications besides a viewer participation application on the additional information area 360. For example, the video display device 100 displays scene related information on products or places shown in a main AV content. The video display device 100 may display current scene related information and previous scene related information simultaneously.

Moreover, the video display device 100 may display a notification message that there is a time linked application or event on a sub menu. For example, if a viewer participation application occurs, the video display device 100 displays an icon having a flashing N on the participation sub menu to induce viewer participation. If a user does not respond to the notification for a predetermined time, the video display device 100 may remove the notification.

Hereinafter, an information main menu of a video display device manufacturer application will be described according to an embodiment with reference to FIGS. 30 to 36.

The information main menu corresponds to a time insensitive area. Like the UI of the program main menu, the information main menu does not operate in a UI manner that an application is automatically displayed and disappears at a specific time. Of course, although the above-mentioned time linked application may be displayed through this menu, when a main menu other than the program main menu is selected, a second service such as search service or Twitter service may be linked.

The information main menu includes a search sub menu, a Twitter sub menu, and a news sub menu.

Then, a search sub menu of an information main menu in a video display device manufacturer application will be described according to an embodiment with reference to FIGS. 30 to 32.

Figure 30:
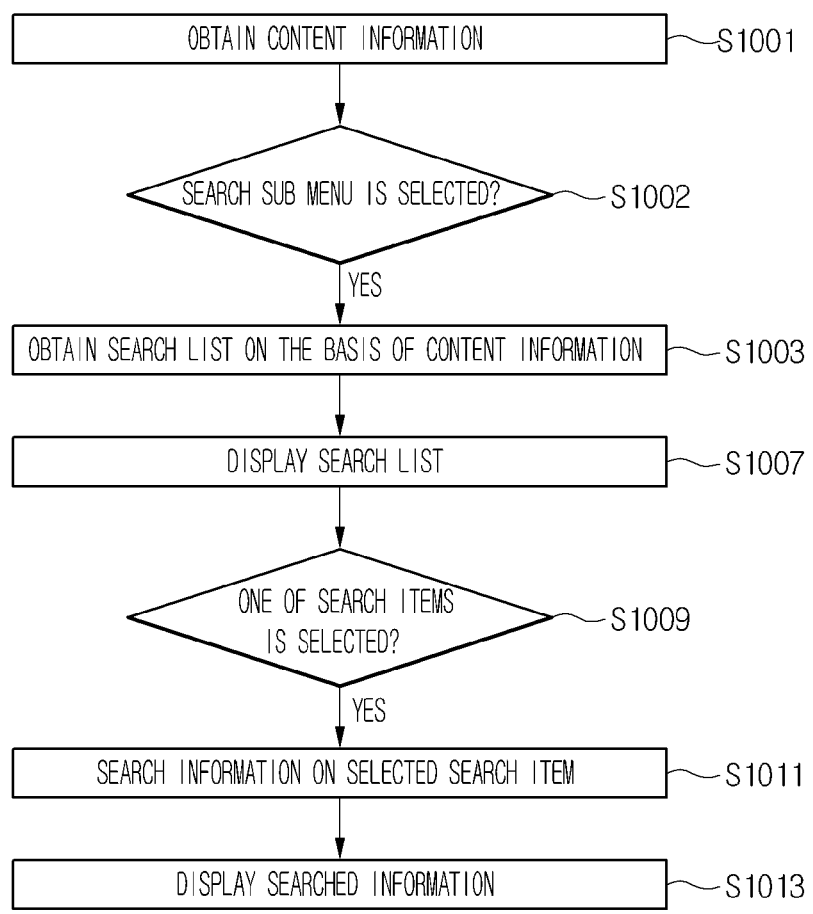
FIG. 30 is flowchart illustrating a searching method according to an embodiment.

FIG. 30 is flowchart illustrating a searching method according to an embodiment.

The video display device 100 extracts a certain section of a main AV content and obtains content information on the basis of the extracted section.

Once the search sub menu of an information main menu in a video display device manufacturer application is selected in operation S1002, the video display device 100 obtains a search list including a plurality of search items corresponding to an enhanced service on the basis of the obtained content information in operation S1003. The search list includes at least one of genres, actors, directors, places, and products.

The video display device 100 displays the search list on the additional information area 360 in operation S1007. A display example of the search list will be described with reference to FIG. 30.

Figure 31:
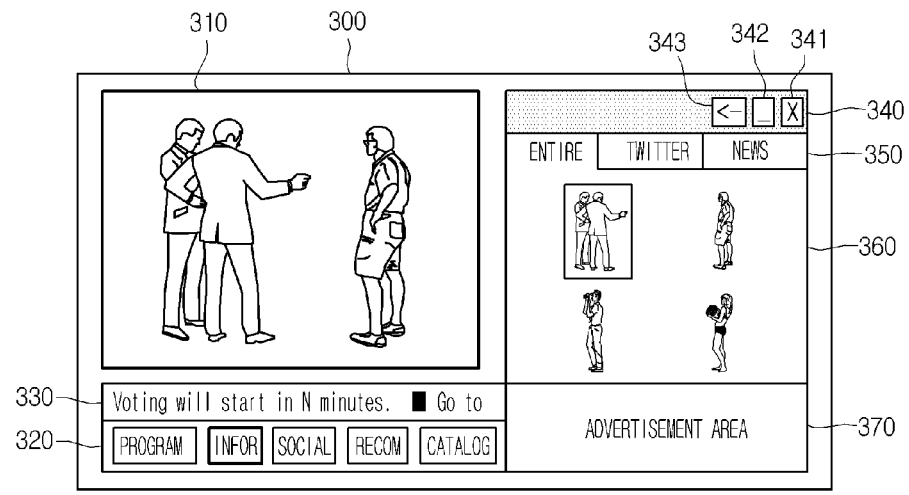
FIG. 31 is a screen when a search sub menu of an information main menu in a video display device manufacturer application is selected according to an embodiment.

FIG. 31 is a screen when a search sub menu of an information main menu in a video display device manufacturer application is selected according to an embodiment.

As shown in FIG. 31, the search list includes characters of a main AV content. The video display device 100 may display at least one of pictures or names of a search item on the additional information area 360.

When one of a plurality of search items is selected through the cursor of a remote controller in operation S1009, the video display device 100 searches information on the selected search item in operation S1011. At this point, the video display device 100 may use an internet search engine such as Google. Moreover, the video display device 100 may use information such as Tribune media or IMDb.

The video display device 100 displays the searched information on the additional information area 360 in operation S1013. Since the searched result is automatically retrieved through programming such as Open API of a service provider, time for a screen design may be greatly saved. A display example of the search information will be described with reference to FIG. 32.

Figure 32:
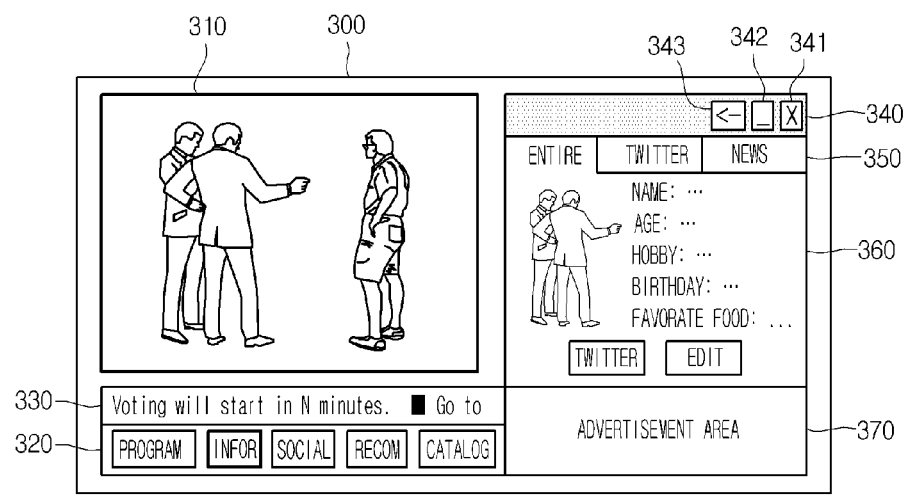
FIG. 32 is another screen when a search sub menu of an information main menu in a video display device manufacturer application is selected according to an embodiment.

FIG. 32 is another screen when a search sub menu of an information main menu in a video display device manufacturer application is selected according to an embodiment.

As shown in FIG. 32, the video display device 100 displays a search result for the selected search item on the additional information area 360. Moreover, the video display device positions a Twitter button and an edit button on the additional information area 360 to follow an actor's Twitter or edit an actor's profile such as filmography or biography.

Like this, if the searching method according to an embodiment is used, information related to a main AV data may be searched through one click, so that an effort to input a search word may be reduced.

Next, a Twitter sub menu of an information main menu in a video display device manufacturer application will be described according to an embodiment with reference to FIGS. 33 to 34.

Figure 33:
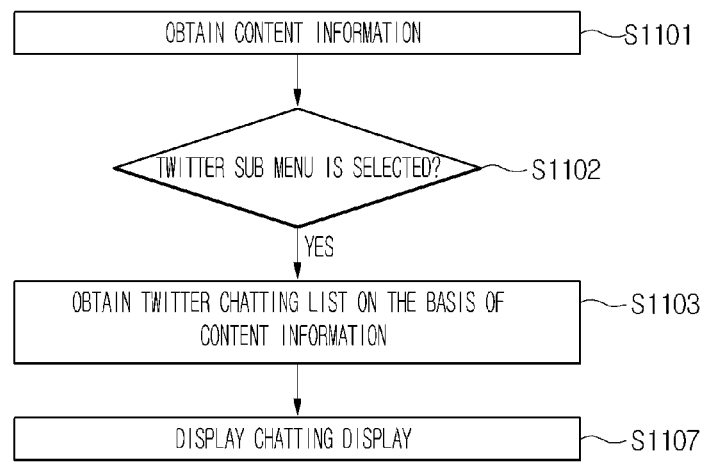
FIG. 33 is flowchart illustrating a chatting window displaying method according to an embodiment.

FIG. 33 is flowchart illustrating a chatting window displaying method according to an embodiment.

The video display device 100 extracts a certain section of a main AV content and obtains content information on the basis of the extracted section in operation S1101.

Once a Twitter sub menu of an information main menu in a video display device manufacturer application is selected in operation S1102, the video display device 100 obtains a Twitter chatting list corresponding to an enhanced service on the basis of the obtained content information in operation S1103. The video display device 100 writes a program name on Hashtag of Twitter to load a Twitter chatting list related to the program. This chatting list is linked to Twitter and is continuously updated in real time.

The video display device 100 displays one chatting window in the Twitter chatting list on the additional information area 360 through a user selection or automatically in operation S1107. A display example of the chatting window will be described with reference to FIG. 34.

Figure 34:
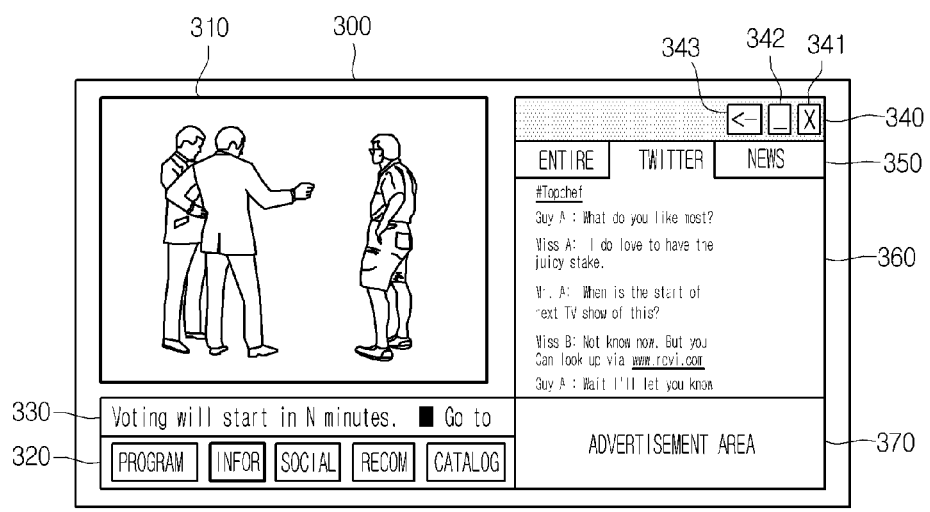
FIG. 34 is a screen when a Twitter sub menu of an information main menu in a video display device manufacturer application is selected according to an embodiment.6

FIG. 34 is a screen when a Twitter sub menu of an information main menu in a video display device manufacturer application is selected according to an embodiment.6

As shown in FIG. 34, the video display device 100 displays a chatting window on the additional information area 360 to support chatting between viewers watching the same program.

When a program is broadcasted, a user of the program may directly write a message in a chatting room actually. If the video display device 100 has a log in mechanism like Smart TV, a user of the video display device 100 may immediately start chatting with his own ID in a logged in state when entering into a menu. If it is inconvenient to make an input to the video display device 100 through a remote controller, the video display device 100 may display only a chatting message. If the video display device 100 is linked to a second device such as Smart Phone or tablet, a message may be typed using the input device of the second device. Although information in Hashtag is a program name basically, it may be selected as a tag of actors or directions, i.e., the above-mentioned another basic information, so that a user may selectively participate in chatting of a corresponding subject.

Next, a news sub menu of an information main menu in a video display device manufacturer application will be described according to an embodiment with reference to FIGS. 35 to 36.

Figure 35:
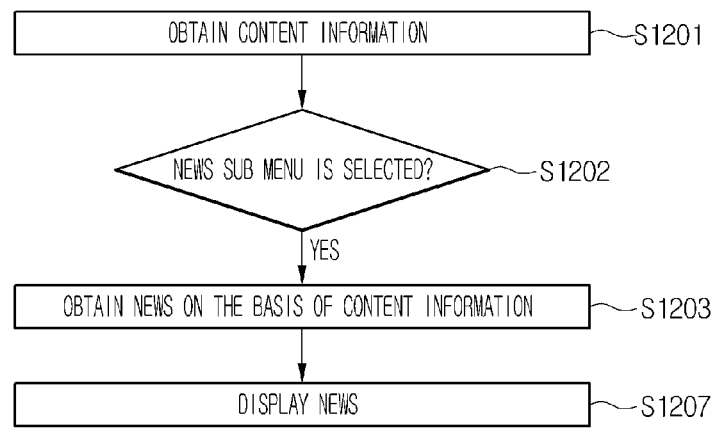
FIG. 35 is a flowchart illustrating a news obtaining method according to an embodiment.

FIG. 35 is a flowchart illustrating a news obtaining method according to an embodiment.

The video display device 100 extracts a certain section of a main AV content and obtains content information on the basis of the extracted section in operation S1201.

Once the news sub menu of an information main menu in a video display device manufacturer application is selected in operation S1202, the video display device 100 obtains news corresponding to an enhanced service on the basis of the obtained content information in operation S1203. At this point, the news may or may not relate to a main AV content. Or, the news may be provided from a broadcaster of a main AV content. If the broadcaster does not provide news through Open API, the video display device 100 may receive news through News feeds of an internet service such as Google or Yahoo.

The video display device 100 displays the obtained news on the additional information area 360 in operation S1207. A display example of news will be described with reference to FIG. 36.

Figure 36:
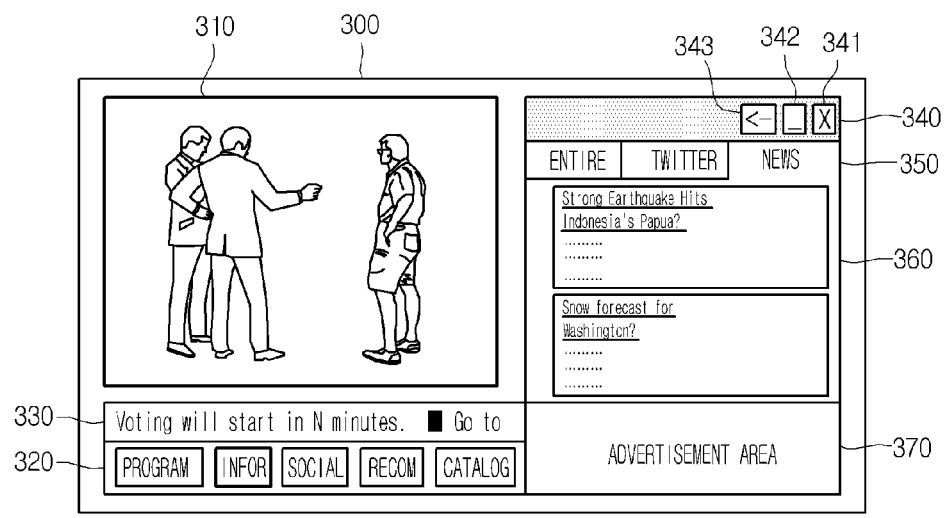
FIG. 36 is a screen when a news sub menu of an information main menu in a video display device manufacturer application is selected according to an embodiment.

FIG. 36 is a screen when a news sub menu of an information main menu in a video display device manufacturer application is selected according to an embodiment.

As shown in FIG. 36, the video display device 100 may display the obtained news on the additional information area 360.

Hereinafter, a social main menu of a video display device manufacturer application will be described according to an embodiment with reference to FIGS. 37 to 42.

The social main menu corresponds to a time insensitive area. Like the UI of the program main menu, the social main menu does not operate in a UI manner that an application is automatically displayed and disappears at a specific time. Of course, although the above-mentioned time linked application may be displayed through this menu, when a main menu other than the program main menu is selected, a second service such as Facebook may be linked.

The social main menu includes a viewer list sub menu and a preference display sub menu.

Then, a viewer list sub menu of a social main menu in a video display device manufacturer application will be described according to an embodiment with reference to FIGS. 37 to 40.

Figure 37:
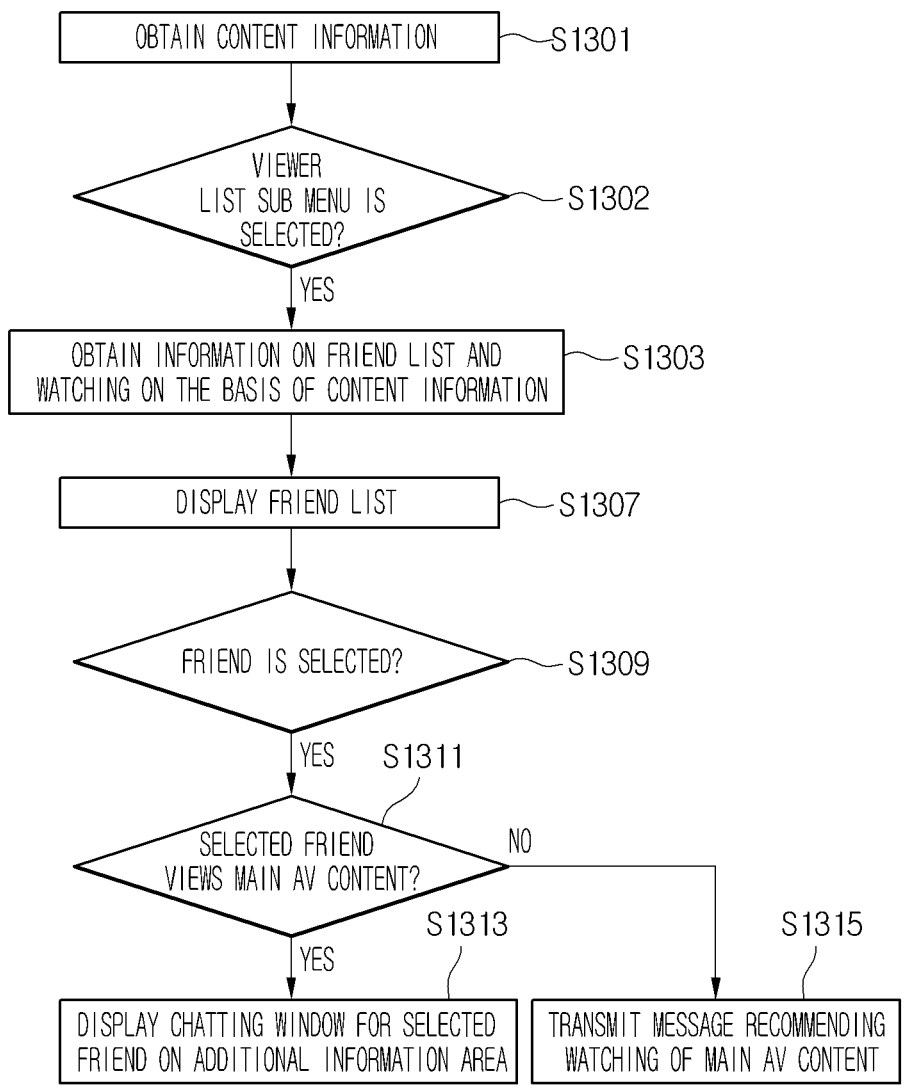
FIG. 37 is flowchart illustrating a viewer list displaying method according to an embodiment.

FIG. 37 is flowchart illustrating a viewer list displaying method according to an embodiment.

The video display device 100 extracts a certain section of a main AV content and obtains content information on the basis of the extracted section in operation S1301.

Once a viewer list sub menu of a social main menu in a video display device manufacturer application is selected in operation S1302, the video display device 100 obtains information on a friends list and whether each friend watches a main AV content on the basis of the obtained content information in operation S1303. The video display device 100 may be linked with a social network service such as Facebook to obtain a list of friends watching a main AV content.

The video display device 100 displays the obtained viewer list on the additional information area 360 in operation S1307. A display example of the viewer list will be described with reference to FIG. 38.

Figure 38:
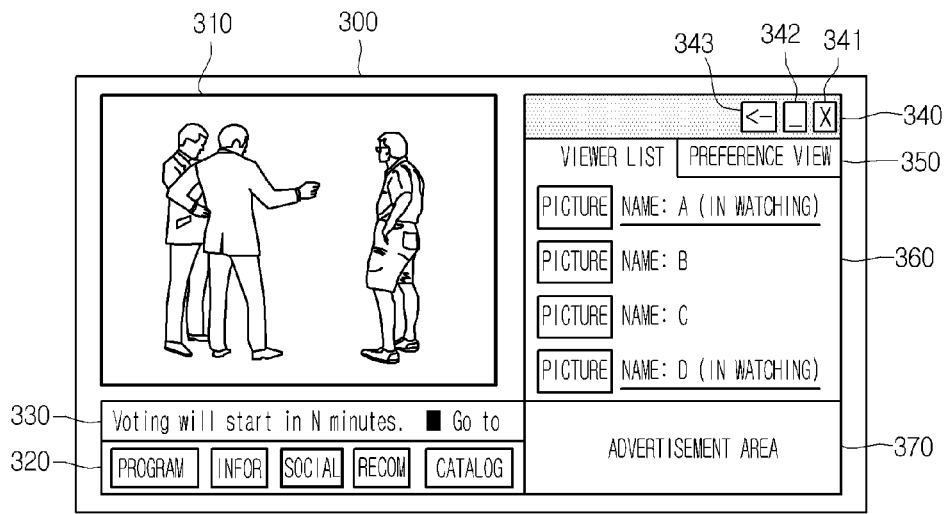
FIG. 38 is a screen when a viewer list sub menu of a social main menu in a video display device manufacturer application is selected according to an embodiment.

FIG. 38 is a screen when a viewer list sub menu of a social main menu in a video display device manufacturer application is selected according to an embodiment.

As shown in FIG. 38, the video display device 100 may display the pictures and names of the viewers corresponding to the obtained viewer list on the additional information area 360.

Especially, the video display device 100 may display a friends list together with whether each friend watches contents or only a list of friends watching contents currently.

When one friend is selected from the displayed friends list in operation S1309, the video display device 100 confirms whether the selected friend watches a main AV content in operation S1311.

If the selected friend watches the main AV content, the video display device 100 displays the chatting window of the selected friend on the additional information are 360 in operation S1313.

Additionally, if the selected friend does not watch the main AV content, the video display device 100 sends a message recommending watching the main AV content to the e-mail or mobile phone of the selected friend in operation S1315. Even if the selected friend does not watch the main AV content, the video display device 100 may display the chatting window of the selected friend on the additional information are 360.

For chatting, a user may use the remote controller of the video display device 100 or the input device of the second device connected to the video display device 100, and may chat with friends through a social network service application of a smart phone regardless of the video display device 100. In any cases, a chatting screen of the social network service may be displayed on the screen of the video display device 100. Through buttons for evaluating a program, a user may send his/her intention to friends. For example, a user may notify friends that he/she currently watches a main AV content and may recommend friends who do not watch the main AV content currently to watch it through a "good" button.

Like this, the video display device 100 automatically realizes who is watching which program by using an ACR technique through a viewer list sub menu. In order to confirm who is watching which program, a user needs to log in. Once an account for log in is registered in the video display device 100, each time the video display device 100 is turned on, a user may log in automatically. Therefore, the video display device 100 may realize who is watching a main AV content.

Figure 39:
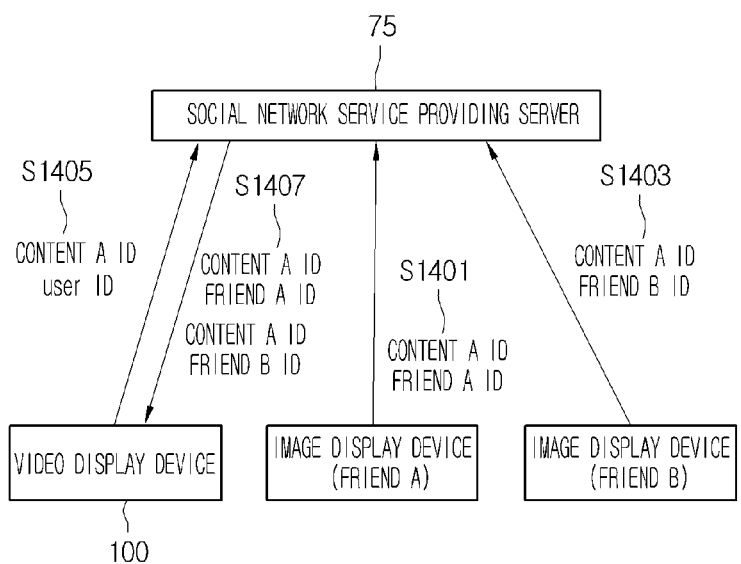
FIG. 39 is a signal flow when a video display device obtains a friends list and watching information according to an embodiment.

FIG. 39 is a signal flow when a video display device obtains a friends list and watching information according to an embodiment.

As shown in FIG. 39, if a video display device of a friend A plays a main AV content A, it transmits an identifier of the main AV content A and an identifier of the friend A to the SNS providing server 75 in operation S1401.

Additionally, if a video display device of a friend B plays the main AV content A, it transmits an identifier of the main AV content A and an identifier of the friend B to the SNS providing server 75 in operation S1403.

If the video display device 100 plays the main AV content A, it transmits a user ID and an identifier of the main AV content A to the SNS providing server 75 in operation S1405.

The SNS providing server 75 confirms information on a friends list of the video display device 100 and whether each friend watches a main AV content on the basis of the friend relationship information and received content identifiers in operation S1407.

Figure 40:
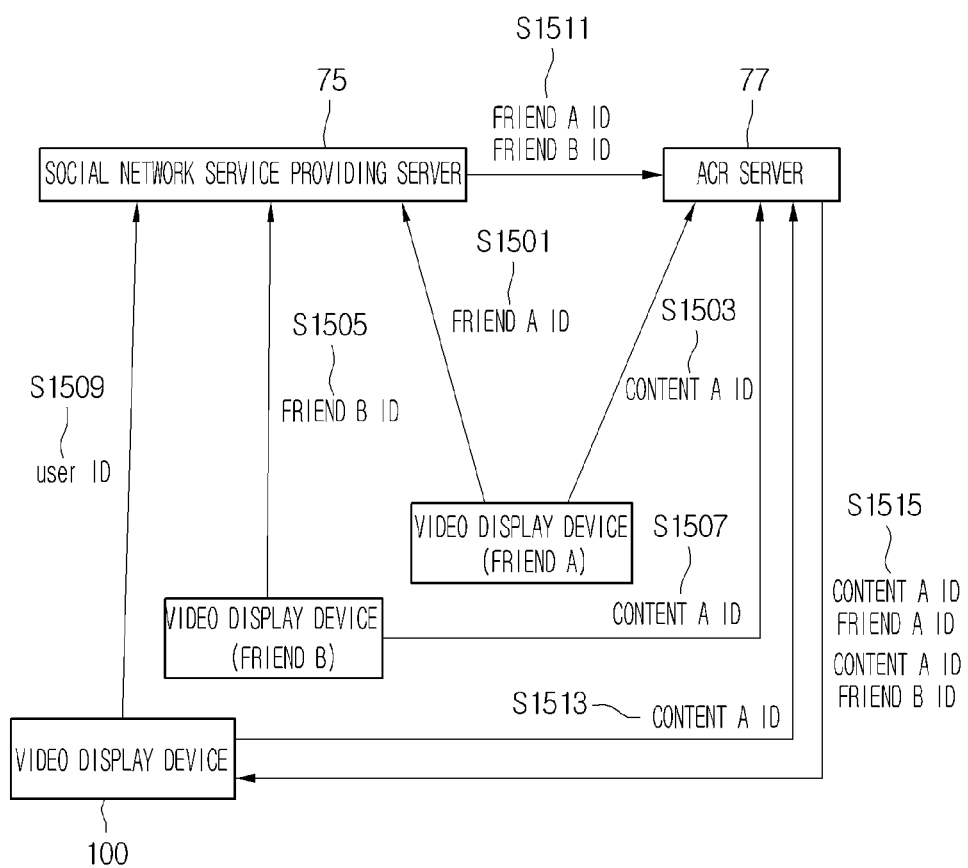
FIG. 40 is a signal flow when a video display device obtains a friends list and watching information according to another embodiment.

FIG. 40 is a signal flow when a video display device obtains a friends list and watching information according to another embodiment.

As shown in FIG. 40, if a video display device of a friend A plays a main AV content A, it transmits an identifier of the friend A to the SNS providing server 75 in operation S1501, and transmits the main AV content A to the ACR sever in operation S1503. The ACR server 77 may be one of a watermark server 21, a fingerprint server 22, an enhanced service information providing server 40, and an enhanced service providing sever 50.

Additionally, if a video display device of a friend B plays the main AV content A, it transmits an identifier of the friend B to the SNS providing server 75 in operation S1505, and transmits the main AV content A to the ACR sever 77 in operation S1507.

The video display device 100 transmits a user ID to the SNS providing server 75 in operation 1509.

Then, the SNS providing server 75 provides a friend list corresponding to the user ID to the ACR server 75 in operation S1511.

Moreover, if the video display device 100 plays the main AV content A, it transmits a user ID and an identifier of the main AV content A to the ACR server 75 in operation S1513.

The ACR server 75 confirms information on the friends list of the video display device 100 and whether each friend watches a main AV content on the basis of the friends list corresponding to the user ID and content identifier, and then, provides the confirmed information to the video display device 100 in operation S1515.

Then, a preference display sub menu of a social main menu in a video display device manufacturer application will be described according to an embodiment with reference to FIGS. 41 to 42.

Figure 41:
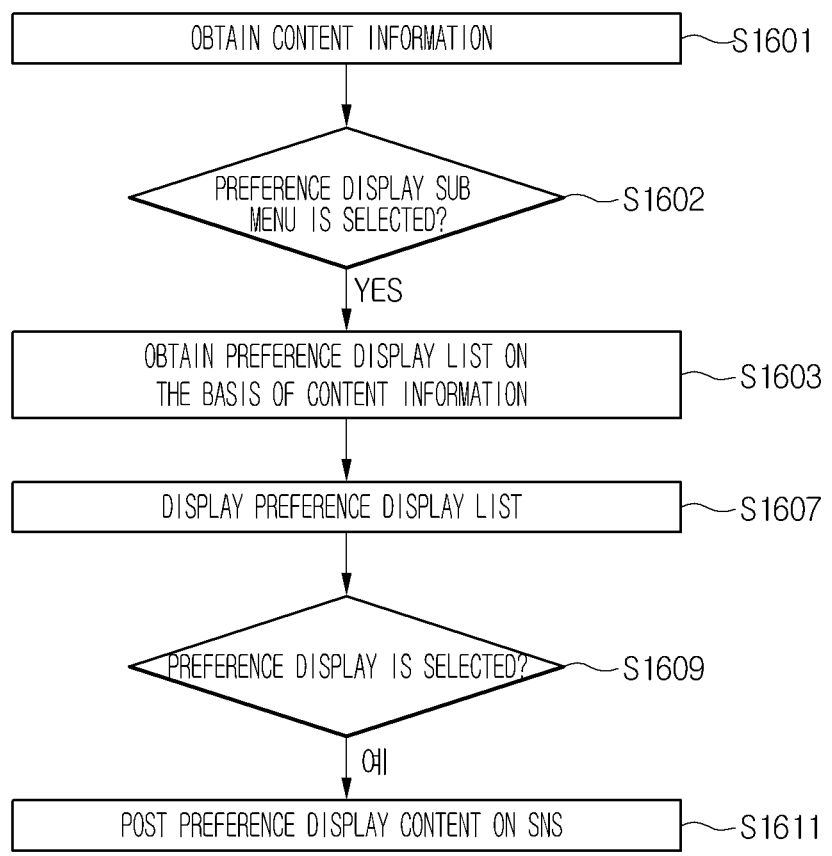
FIG. 41 is flowchart illustrating a preference displaying method according to an embodiment.

FIG. 41 is flowchart illustrating a preference displaying method according to an embodiment.

The video display device 100 extracts a certain section of a main AV content and obtains content information on the basis of the extracted section in operation S1601.

Once a preference display sub menu of a social main menu in a video display device manufacturer application is selected in operation S1602, the video display device 100 obtains a preference display list including a plurality of preference display items on the basis of the obtained content information in operation S1603. Here, the preference display item may include preview or a preview address. The preview may be an image or a short video. The preview may be directly provided from a broadcaster through Open API, or may be obtained by a search engine of an internet service, or obtained by extracting only a necessary portion from an internet server of a broadcaster. Images corresponding to core scenes of a time interval corresponding to several minutes may be provided or one image for one program may be provided.

The video display device 100 displays the obtained preference display list on the additional information area 360 in operation S1607. A display example of the viewer list will be described with reference to FIG. 42.

Figure 42:
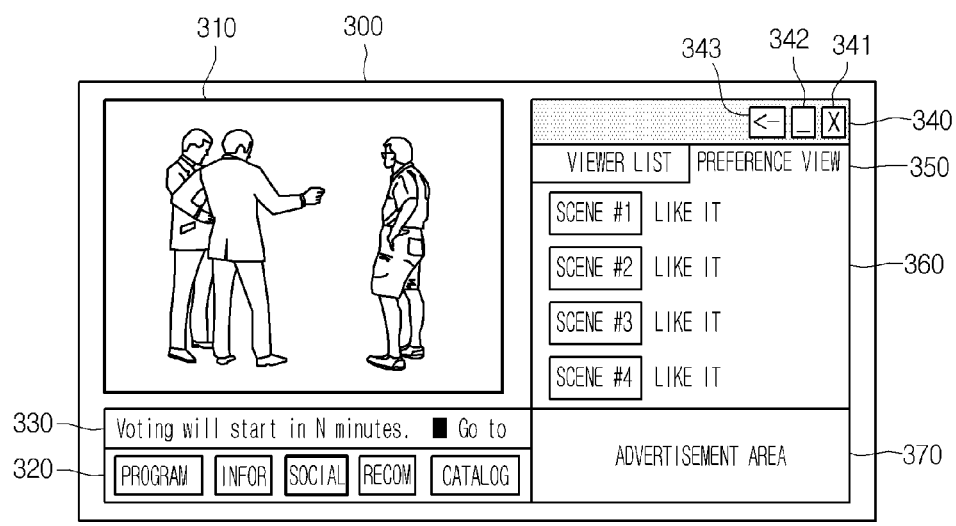
FIG. 42 is a screen when a preference display sub menu of a social main menu in a video display device manufacturer application is selected according to an embodiment.

FIG. 42 is a screen when a preference display sub menu of a social main menu in a video display device manufacturer application is selected according to an embodiment.

As shown in FIG. 42, the video display device 100 may display previews in a preference display list and "Like it" buttons for preference display on the additional information area 360.

Once the "Like it" button corresponding to one preference display item is selected in operation S1609, the video display device 100 posts a preview and simple text corresponding to the selected preference display item on SNS such as Facebook in operation S1611. Here, the simple text may be automatically generated, or may be inputted through a remote controller or an input device of a second device.

Hereinafter, a recommendation main menu of a video display device manufacturer application will be described according to an embodiment with reference to FIGS. 43 to 46.

The recommendation main menu corresponds to a time insensitive area. Like the UI of the program main menu, the recommendation main menu does not operate in a UI manner that an application is automatically displayed and disappears at a specific time. Of course, through this menu, the above-mentioned time linked application may be displayed but if a recommendation menu is selected, another service may be linked.

The recommendation main menu may include a previous episode sub menu, a VOD sub menu, and an application sub menu.

Figure 43:
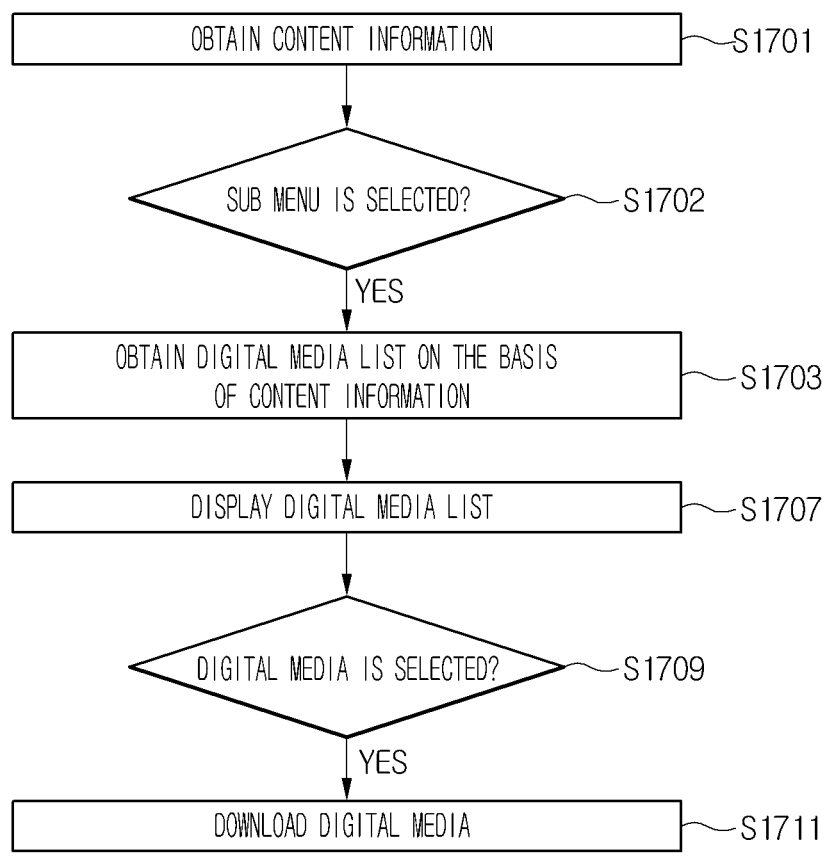
FIG. 43 is flowchart illustrating a digital media downloading method according to an embodiment.

FIG. 43 is flowchart illustrating a digital media downloading method according to an embodiment.

The video display device 100 extracts a certain section of a main AV content and obtains content information on the basis of the extracted section in operation S1701.

Once a recommendation main menu of a video display device manufacturer application is selected in operation S1702, the video display device manufacturer application obtains a digital media list on the basis of the obtained content information in operation S1703. If the previous episode sub menu is selected, the video display device 100 obtains a previous episode list. If the VOD sub menu is selected, the video display device 100 obtains a VOD list that relates to a main AV content or a provider of the main AV content recommends. If the application sub menu is selected, the video display device 100 obtains a VOD list that relates to a main AV content or a provider of the main AV content recommends. Here, the digital media list may include a preview, a preview address, and an icon related image.

The video display device manufacturer application displays the obtained digital media list on the additional information area 360 in operation S1707.

An example of a previous episode list is described with reference to FIG. 44.

Figure 44:
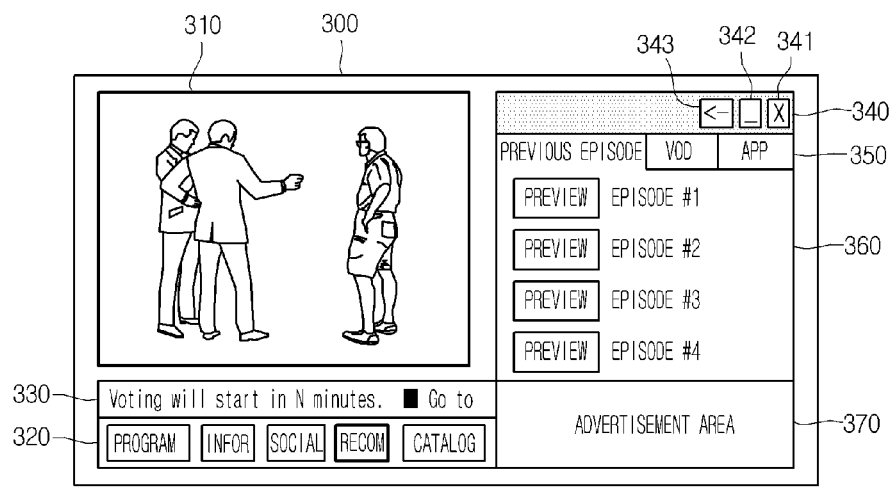
FIG. 44 is a screen when a previous episode sub menu of a recommendation main menu in a video display device manufacturer application is selected according to an embodiment.

FIG. 44 is a screen when a previous episode sub menu of a recommendation main menu in a video display device manufacturer application is selected according to an embodiment.

As shown in FIG. 44, the video display device 100 displays previews and titles of a previous episode list on the additional information area 360. Like this, according to an embodiment, the video display device 100 may automatically search and display a previous episode without user's manipulation.

A display example of the VOD list will be described with reference to FIG. 45.

Figure 45:
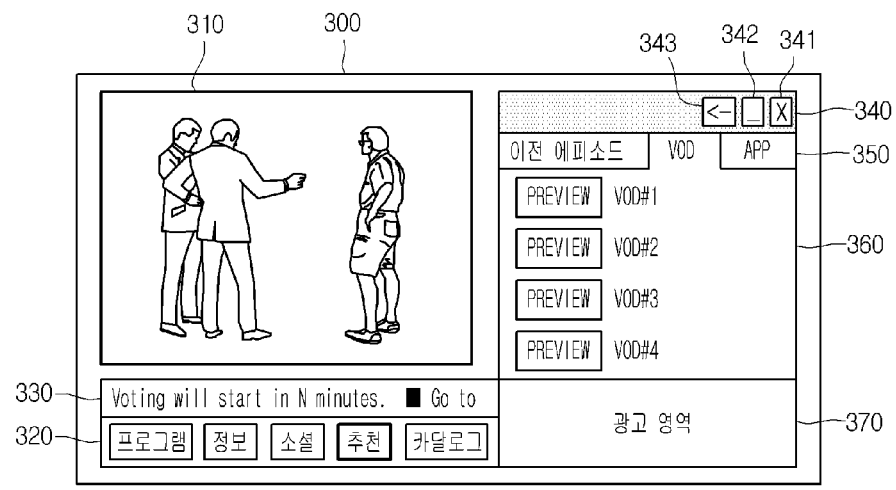
FIG. 45 is a screen when a VOD sub menu of a recommendation main menu in a video display device manufacturer application is selected according to an embodiment.

FIG. 45 is a screen when a VOD sub menu of a recommendation main menu in a video display device manufacturer application is selected according to an embodiment.

As shown in FIG. 45, the video display device 100 displays previews and titles of a VOD list on the additional information area 360. Like this, according to an embodiment, the video display device 100 may automatically search and display VOD related to a main AV content without user's manipulation.

A display example of the application list will be described with reference to FIG. 46.

Figure 46:
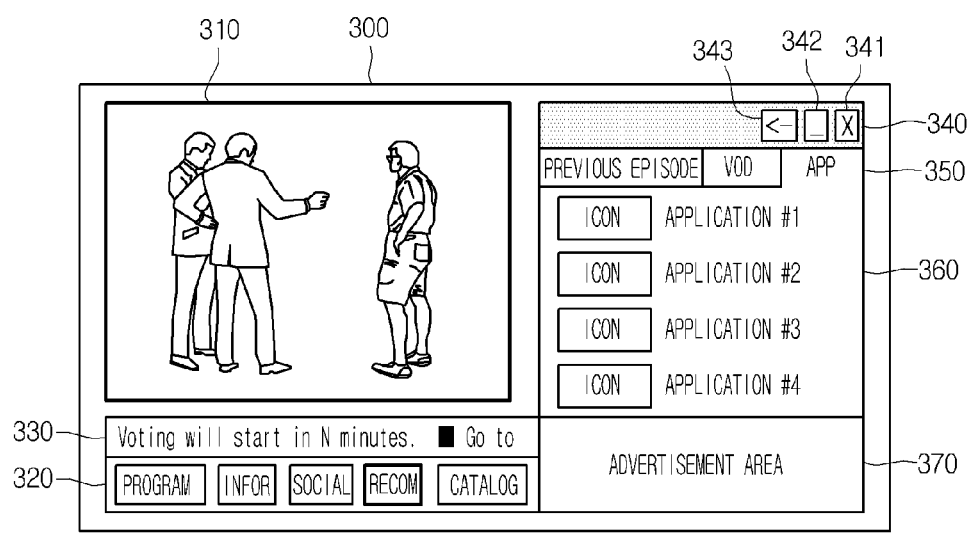
FIG. 46 is a screen when an application sub menu of a recommendation main menu in a video display device manufacturer application is selected according to an embodiment.

FIG. 46 is a screen when an application sub menu of a recommendation main menu in a video display device manufacturer application is selected according to an embodiment.

As shown in FIG. 46, the video display device 100 displays icons and application names of the application list on the additional information area 360. Like this, according to an embodiment, the video display device 100 may automatically search and display applications related to a main AV content without user's manipulation.

Once one item is selected from the digital media list in operation S1709, the video display device manufacturer application downloads a digital media corresponding to the selected item in operation S1711. At this point, the video display device 100 may download the digital media after payment. If the selected item is a previous episode or VOD, the video display device 100 may play the downloaded digital media. If the selected item is an application, the video display device may automatically play the downloaded application or may play it through a user's selection.

Like this, according to an embodiment, the video display device may download digital media through simple manipulation.

Hereinafter, a catalog main menu of a video display device manufacturer application will be described according to an embodiment with reference to FIGS. 47 to 50.

The catalog main menu corresponds to a time insensitive area. Like the UI of the program main menu, the catalog main menu does not operate in a UI manner that an application is automatically displayed and disappears at a specific time. Of course, through this menu, the above-mentioned time linked application may be displayed but if a catalog menu is selected, another service may be linked.

The catalog main menu may include a style sub menu, a music sub menu, and another sub menu.

Figure 47:
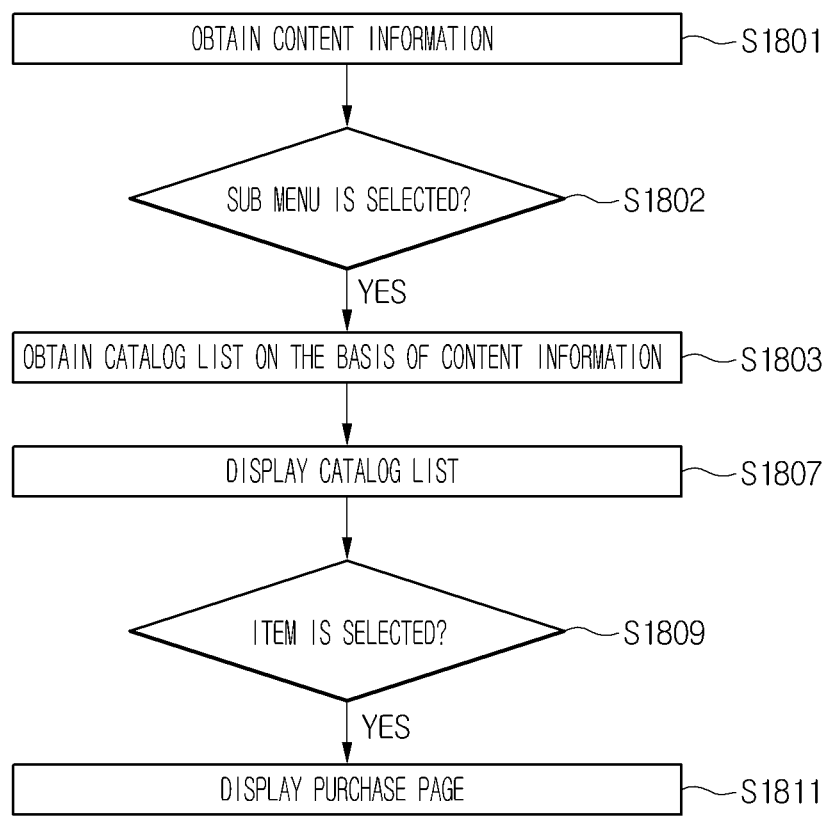
FIG. 47 is flowchart illustrating a catalog displaying method according to an embodiment.

FIG. 47 is flowchart illustrating a catalog displaying method according to an embodiment.

The video display device 100 extracts a certain section of a main AV content and obtains content information on the basis of the extracted section in operation S1801.

Once a sub menu of a catalog main menu in a video display device manufacturer application is selected in operation S1802, the video display device manufacturer application obtains a catalog list on the basis of the obtained content information in operation S1803. If the style sub menu is selected, the video display device 100 obtains a clothing catalog list that relates to a main AV content or a provider of the main AV content recommends. If the music sub menu is selected, the video display device 100 obtains a music catalog list that relates to a main AV content or a provider of the main AV content recommends. If the other sub menu is selected, the video display device 100 obtains a products or places catalog list that relates to a main AV content or a provider of the main AV content recommends. Here, the digital media list may include a related image, price information, description, and coupon. The coupon may be numbers or QR codes. The video display device 100 may display coupons only when a user watches a main AV content, or may allow a user to use it during the available period after storing it on the memory 150.

The video display device manufacturer application displays the obtained catalog list on the additional information area 360 in operation S1807.

A display example of the clothing catalog list will be described with reference to FIG. 48.

Figure 48:
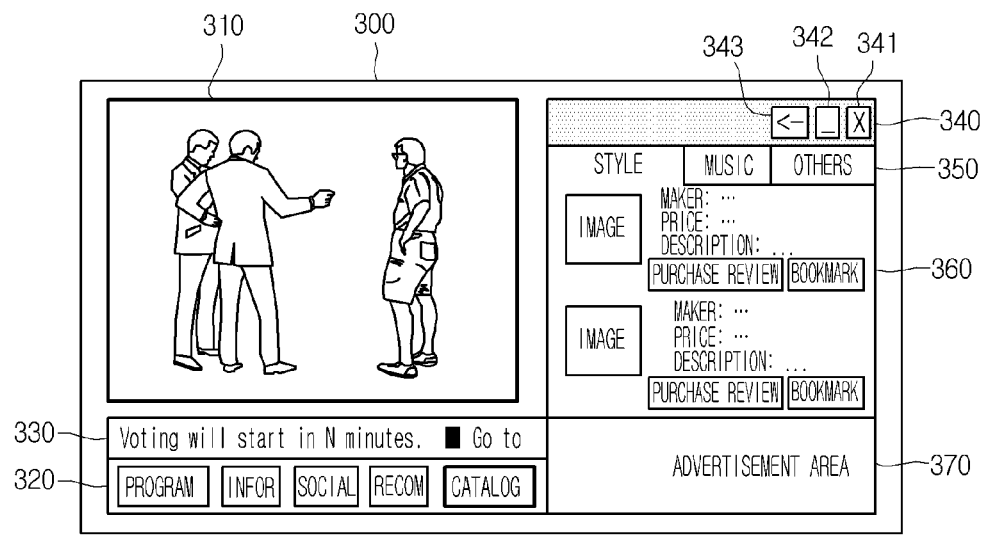
FIG. 48 is a screen when a style sub menu of a recommendation main menu in a video display device manufacturer application is selected according to an embodiment.

FIG. 48 is a screen when a style sub menu of a recommendation main menu in a video display device manufacturer application is selected according to an embodiment.

As shown in FIG. 48, the video display device 100 displays maker information, price information, of description information of clothing related to a main AV content on the additional information area 360. Like this, according to an embodiment, the video display device 100 may automatically search and display a clothing catalog related to a main AV content without user's manipulation.

An example of a music catalog list is described with reference to FIG. 49.

Figure 49:
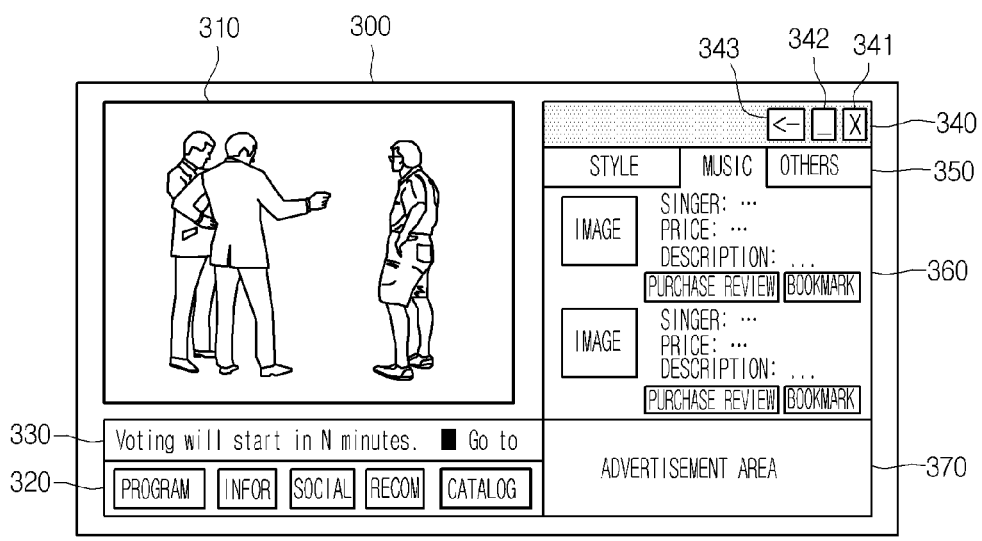
FIG. 49 is a screen when a music sub menu of a recommendation main menu in a video display device manufacturer application is selected according to an embodiment.

FIG. 49 is a screen when a music sub menu of a recommendation main menu in a video display device manufacturer application is selected according to an embodiment.

As shown in FIG. 49, the video display device 100 displays singer information, price information, and description information of music related to a main AV content on the additional information area 360. Like this, according to an embodiment, the video display device 100 may automatically search and display a music catalog related to a main AV content without user's manipulation.

A display example of another catalog list will be described with reference to FIG. 50.

Figure 50:
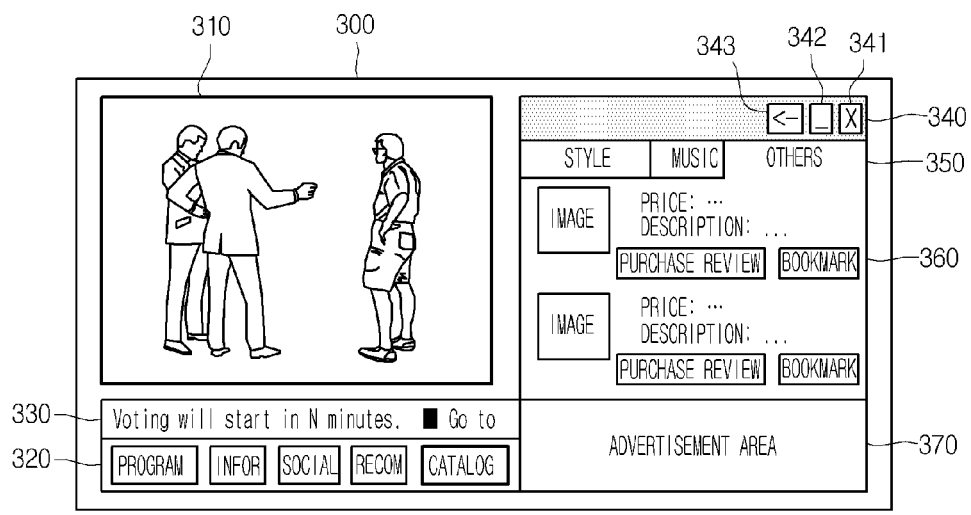
FIG. 50 is a screen when another sub menu of a recommendation main menu in a video display device manufacturer application is selected according to an embodiment.

FIG. 50 is a screen when another sub menu of a recommendation main menu in a video display device manufacturer application is selected according to an embodiment.

As shown in FIG. 50, the video display device 100 displays price information and description information of products and places related to a main AV content on the additional information area 360. Like this, according to an embodiment, the video display device 100 may automatically search and display a products or places catalog related to a main AV content without user's manipulation.

Once one item is selected from the catalog list in operation S1809, the video display device manufacturer application displays a purchase item corresponding to the selected item in operation S1811.

Like this, according to an embodiment, a user may purchase products through simple manipulation.

A post purchase review button and a bookmark button may be disposed at each item in the catalog list.

Once the post purchase review button is selected, the video display device 100 may display a post use review of a product on the additional information are 360. Additionally, a user may write a post purchase review.

Additionally, after bookmarking a specific item through the bookmark button, a user may recommend the bookmarked item through a viewer list sub menu of a social main menu.

In this case, the video display device 100 may provide bookmark item information to the ACR server 77 or SNS providing server 75.

Then, the video display device 100 of a user receiving the recommendation obtains content information on the basis of the extracted section from a main AV content, and may display a recommendation message such as "this product is recommended by a friend U" if the main AV content corresponds to an advertisement of the recommended item on the basis of the obtained content information. Additionally, instead of a recommendation message, a short video may be displayed.

Then, an on/off control of an ACR function will be described according to an embodiment with reference to FIGS. 51 and 52.

Figure 51:
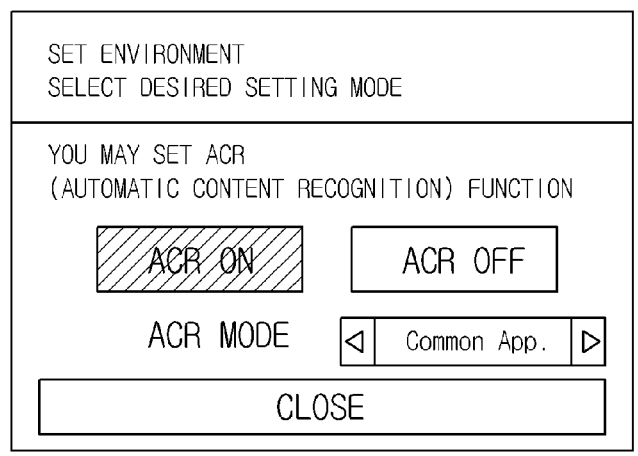
FIG. 51 is a view of a user interface for controlling an ACR function according to an embodiment.

FIG. 51 is a view of a user interface for controlling an ACR function according to an embodiment.

As shown in FIG. 51, the play controlling unit 113 displays an ACR function setting window. A user may activate or deactivate the ACR function through the ACR function setting window.

When the ACR function is activated, a user may select an ACR mode. The ACR mode may be set with one of an auto playing application mode, a content provider application mode, and an video display manufacturer application mode.

When the ACR function mode is set in the above manner, the play controlling unit 113 stores setting information on a setting information storage unit 154.

Figure 52:
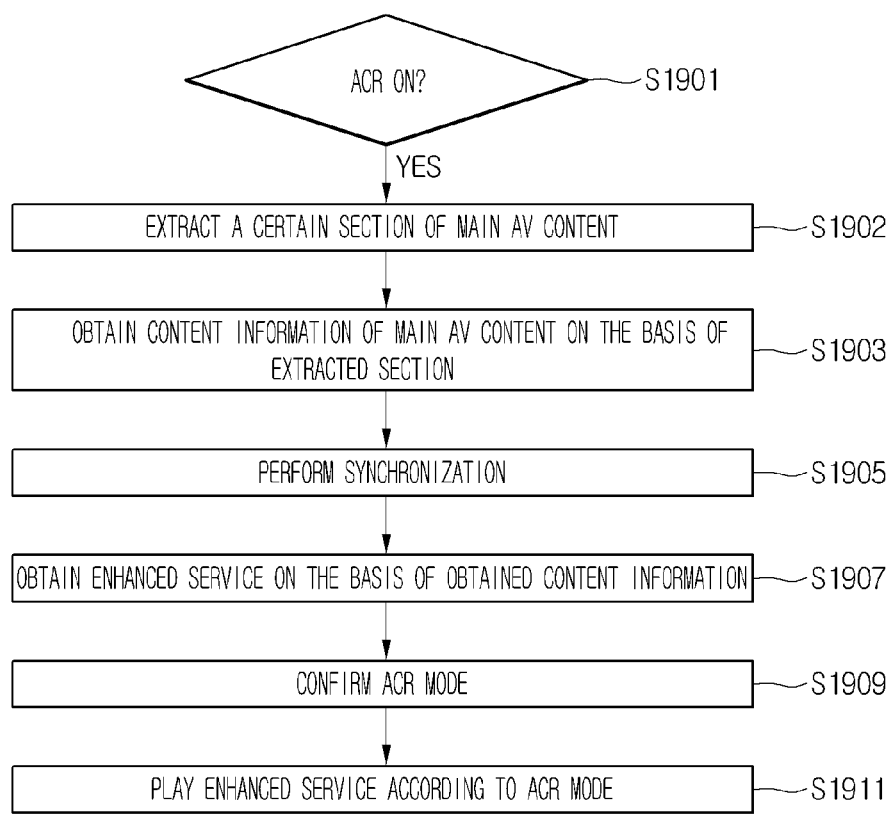
FIG. 52 is a flowchart illustrating a method of controlling a video display device according to the embodiment.

FIG. 52 is a flowchart illustrating a method of controlling a video display device according to the embodiment.

The enhanced service management unit 130 confirms whether the ACR function is turned on in operation S1901.

If the ACR function is deactivated, the enhanced service management unit 130 does not perform a content information obtaining procedure any more.

If the ACR function is activated, the enhanced service management unit 130 extracts a certain section of a main AV content in operation S1902.

The enhanced service management unit 130 obtains content information of the main AV content on the basis of the extracted section in operation S1903.

The enhanced service management unit 130 synchronizes the reference time of the main AV content with the reference time of an alternative advertisement in operation S1905.

The enhanced service management unit 130 obtains an enhanced service on the basis of the obtained content information in operation S1907. The enhanced service management unit 130 obtains enhanced service information on the basis of the content information, and then obtains an enhanced service on the basis of the enhanced service information.

Then, the enhanced service management unit 130 confirms the ACR mode in operation S1909.

The enhanced service management unit 130 plays the enhanced service according to the ACR mode in operation S1911.

In more detail, if the ACR mode is an automatic play application mode, the enhanced service management unit 130 executes an automatic play application, and the executed automatic play application plays the obtained enhanced service.

If the ACR mode is the content provider application mode, the enhanced service management unit 130 executes a content provider application corresponding to the obtained content information in background. The enhanced service management unit 130 displays a content provider application when receiving a user input corresponding to an enhanced service use. This content provider application may play the obtained enhanced service. Instead that the content provider application is automatically executed in background, it may be executed by a user input.

If the ACR mode is the video display device manufacturer application mode, the enhanced service management unit 130 executes its video display device manufacturer application in background. The enhanced service management unit 130 displays the video display device manufacturer application when receiving a user input corresponding to an enhanced service use. This video display device manufacturer application may play the obtained enhanced service. Instead that the video display device manufacturer application is automatically executed in background, it may be executed by a user input.

Hereinafter, a method of controlling a video display device will be described with reference to FIGS. 53 and 54.

Figure 53:
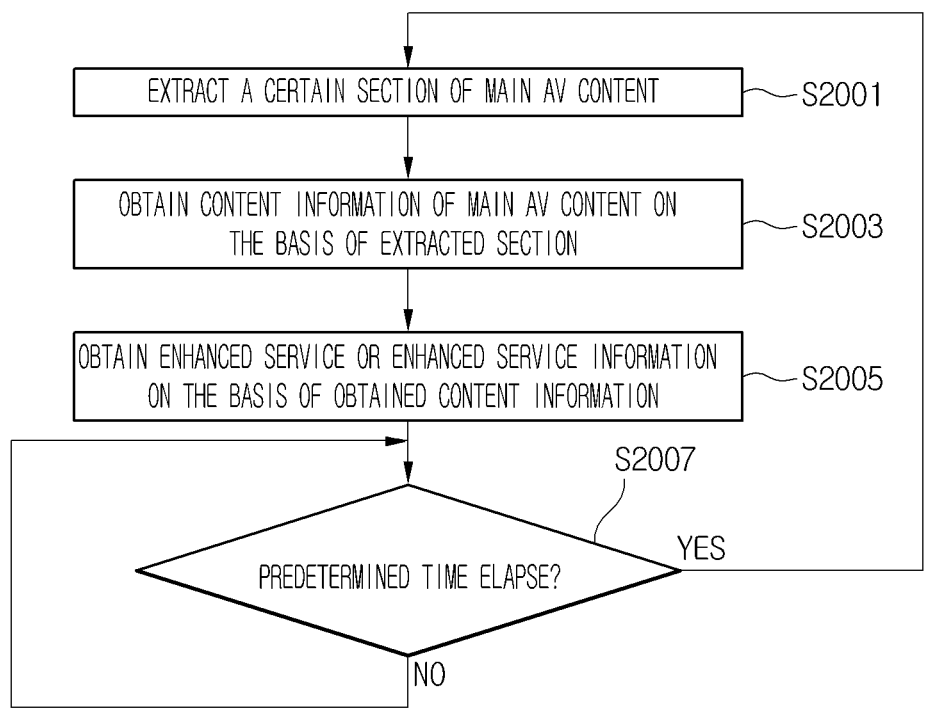
FIG. 53 is a flowchart illustrating a method of controlling a video display device according to another embodiment.

FIG. 53 is a flowchart illustrating a method of controlling a video display device according to another embodiment.

When the video display device 100 is turned on, the enhanced service management unit 130 extracts a certain section of a main AV content in operation S2001.

The enhanced service management unit 130 obtains content information of the main AV content on the basis of the extracted section in operation S2003. For example, the enhanced service management unit 130 extracts watermark information from the extracted section, and obtains content information from the extracted watermark information. Additionally, the enhanced service management unit 130 extracts feature information of the extracted section, and transmits a query including the extracted feature information to the fingerprint server 22, so that content information is obtained in response to the query.

The enhanced service management unit 130 obtains enhanced service information or enhanced service on the basis of the obtained content information in operation S2005.

After the enhanced service information or enhanced service is obtained, when a predetermined time (Tdelay) elapses in operation S2007, the enhanced service management unit 130 performs a process from operation S2001 again.

Even if a main AV content or channel is identified by ACR, since the video display device 100 may not predict when a main AV content is changed in the same channel, ACR does not need to be performed periodically. Additionally, when a user changes a channel, the video display device 100 needs to perform ACR with the maximum fast period in order to detect channel change timing.

For this, if a predetermined time (Tdelay) is reduced, resources (CPU and memory occupation) of the video display device 100 are wasted, and a frequent request reduces usage efficiency of channel bandwidth.

Additionally, a frequent request increases the loads of the content recognizing service providing server 20, the enhanced service information providing server 40, and the enhanced service providing server 50.

In relation to fingerprint based ACR, if a time from extracting a certain section of main AV content to obtaining content information is called Tacr, and a time from obtaining the content information to obtaining enhanced service information or enhanced service is called Tr, ACR period (Tp) may be determined as the following Equation 3.

$$Tp=Tacr+Tr+Tdelay \quad \text{[Equation 3]}$$

Accordingly, when the same main AV content is maintained during Tc, the number of requests for enhanced service information or enhanced service may be determined as the following Equation 4.

$$N=[Tc/Tp] \quad \text{[Equation 4]}$$

In Equation 4, [ ] represents a Gaussian symbol.

As shown in Equation 4, the (N−1) number of requests for enhanced service information or enhanced service may not be necessary.

Moreover, when a channel is changed, a consumed time from channel change timing to obtaining content information is between Tmin of Equation 5 and Tmax of Equation 6.

$$Tmin=Tacr+Tr \quad \text{[Equation 5]}$$

$$Tmax=Tacr+Tr+Tdelay+Tacr+Tr \quad \text{[Equation 6]}$$

An average consumed time Tt from channel change timing to obtaining content information is as the following Equation 7.

$$Tt=(Tmin+Tmax)/2 \quad \text{[Equation 7]}$$

Tmin corresponds to when an ACR operation starts immediately after channel change and Tmax corresponds to when an ACR operation starts immediately before channel change.

If Tdelay is reduced to shorten Tmax, system load may be drastically increased.

Figure 54:
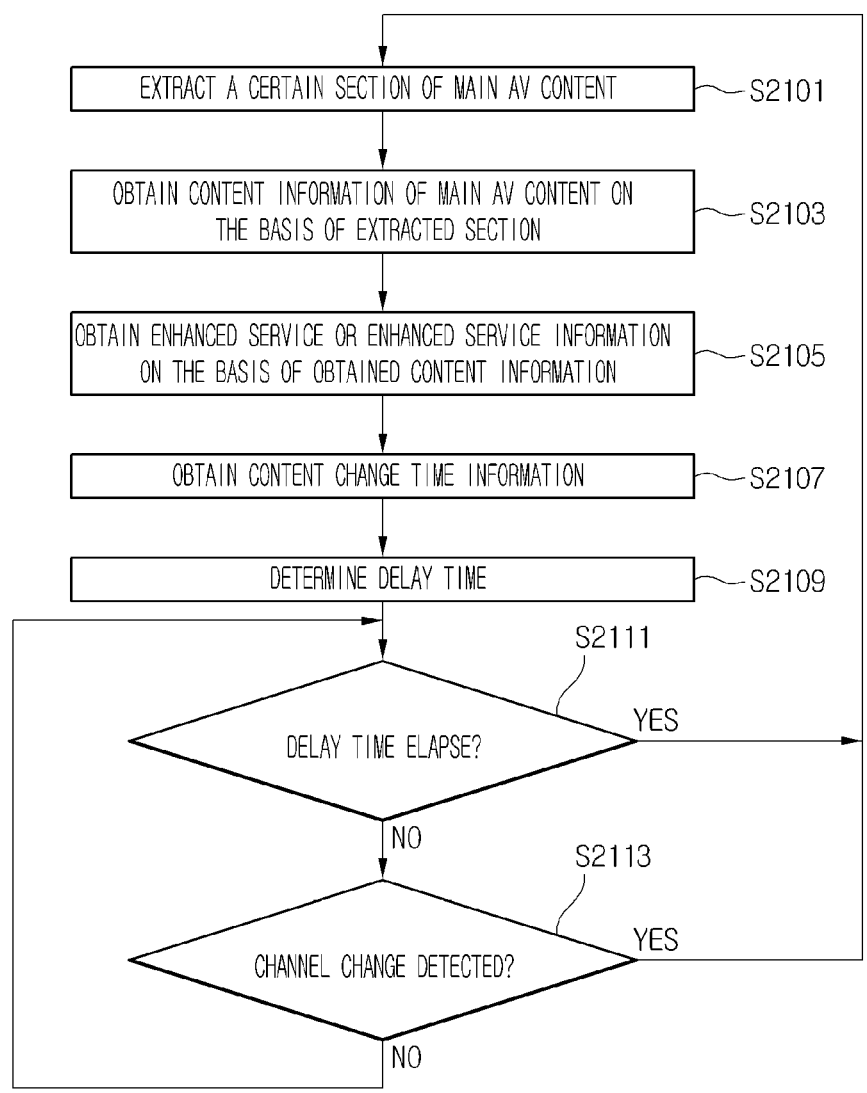
FIG. 54 is a flowchart illustrating a method of controlling a video display device according to another embodiment.

FIG. 54 is a flowchart illustrating a method of controlling a video display device according to another embodiment.

When the video display device 100 is turned on, the enhanced service management unit 130 extracts a certain section of a main AV content in operation S2101.

The enhanced service management unit 130 obtains content information of the main AV content on the basis of the extracted section in operation S2103. For example, the enhanced service management unit 130 extracts watermark information from the extracted section, and obtains content information from the extracted watermark information. Additionally, the enhanced service management unit 130 extracts feature information of the extracted section, and transmits a query including the extracted feature information to the fingerprint server 22, so that content information is obtained in response to the query.

The enhanced service management unit 130 obtains enhanced service information or enhanced service on the basis of the obtained content information in operation S2105. At this point, the enhanced service management unit 130 obtains ACR time information corresponding to content changing time information in addition to enhanced service information or enhanced service in operation S2107. Especially, the enhanced service information may include content changing time information.

Later, the enhanced service management unit 130 determines delay time (Tdelay) on the basis of the content changing time information in operation S2109. Especially, the enhanced service management unit 130 may delay an ACR operation until content change.

After the enhanced service information or enhanced service is obtained, even if the delay time (Tdelay) does not elapse in operation S2111, the enhanced service management unit 130 detects channel change in operation S2113. When receiving an uncompressed main AV content from the broadcast receiving device 60, the video display device (100) may not easily detect channel change. Accordingly, the video display device 100 may detect channel change by detecting that there is no video or audio signal in the external input port 111 for a predetermined time. Especially, operation S2113 for detecting channel change may be omitted.

When channel change is detected in operation S2113, the enhanced service management unit 130 may perform a process from operation S2001 again.

After the enhanced service information or enhanced service is obtained, when a delay time (Tdelay) elapses in operation S2111, the enhanced service management unit 130 performs a process from operation S2001 again.

Through the above process, the (N−1) number of requests for enhanced service information or enhanced service may not be necessary, so that system load may be reduced. Additionally, an average consumed time Tt from channel change timing to obtaining content information when content is changed in the same channel is Tmin.

Hereinafter, enhanced service obtaining timing will be described with reference to FIGS. 55 to 63.

Figure 55:
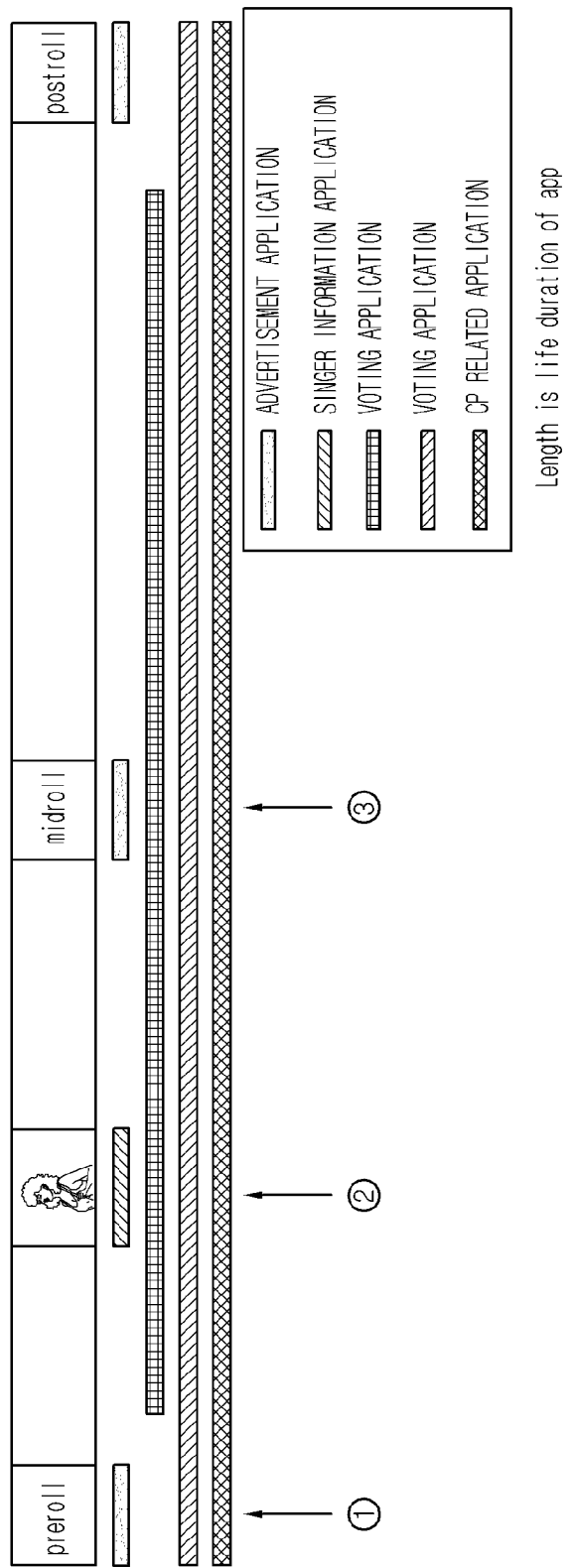
FIG. 55 is a timing diagram of an enhanced service according to an embodiment.

FIG. 55 is a timing diagram of an enhanced service according to an embodiment.

As shown in FIG. 55, advertisement application, program related application, and CP related application are available at the timing ①. Singer information application, voting application, program related application, and CP related application are available at the timing ②. Advertisement application, voting application, program related application, and CP related application are available at the timing ③.

Like this, since available applications are different at various timings, they are required to be identified before application start timing.

Figure 56:
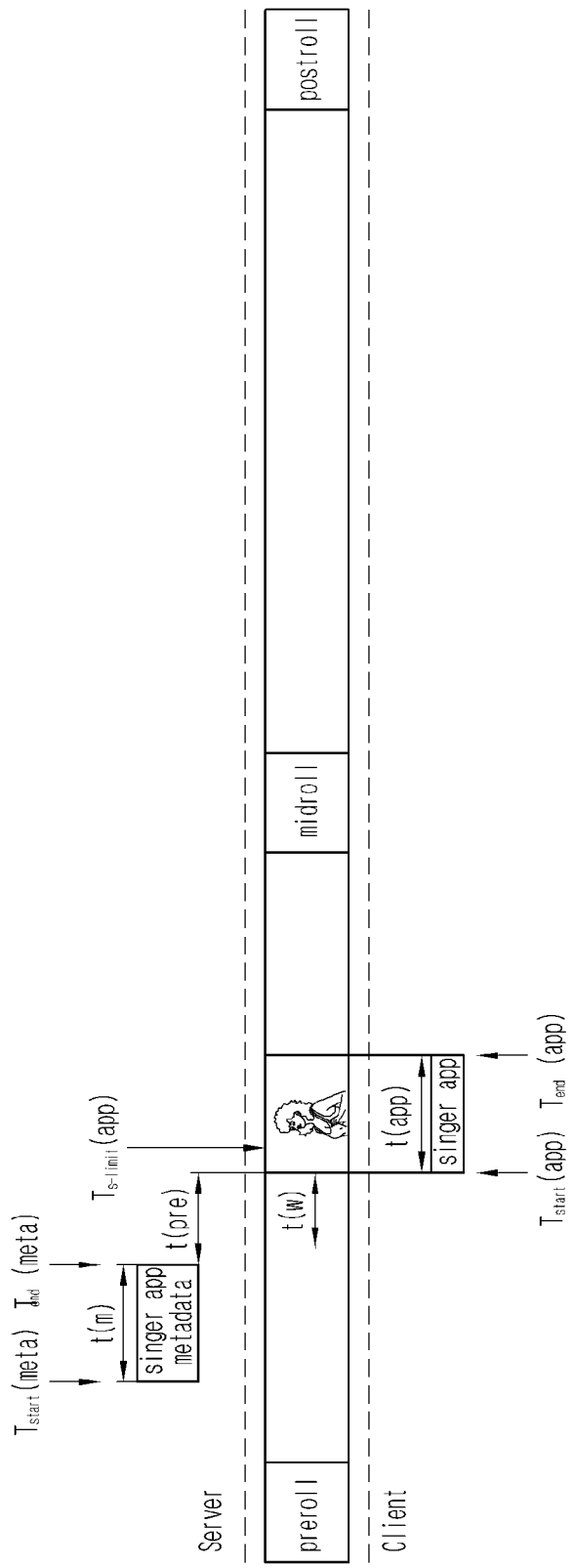
FIG. 56 is a timing diagram of an enhanced service according to another embodiment.

FIG. 56 is a timing diagram of an enhanced service according to another embodiment.

In FIG. 56, an enhanced service related to main AV content is a singer application.

A start time of the application is designated as Tstart(app). An end time of the application is designated as Tend(app). A last time that the application starts is designated as Ts-limit (app). T(app) represents the length of execution time of the singer application.

Additionally, metadata of the singer application corresponding to enhanced service information may range from Tstart(meta) to Tend(meta). t(m) is the length of available time of the metadata of the singer application.

t(pre) represents a time from Tend(meta) to Tstart(app).

t(w) represents a time from obtaining additional information to Tstart(app).

Figure 57:
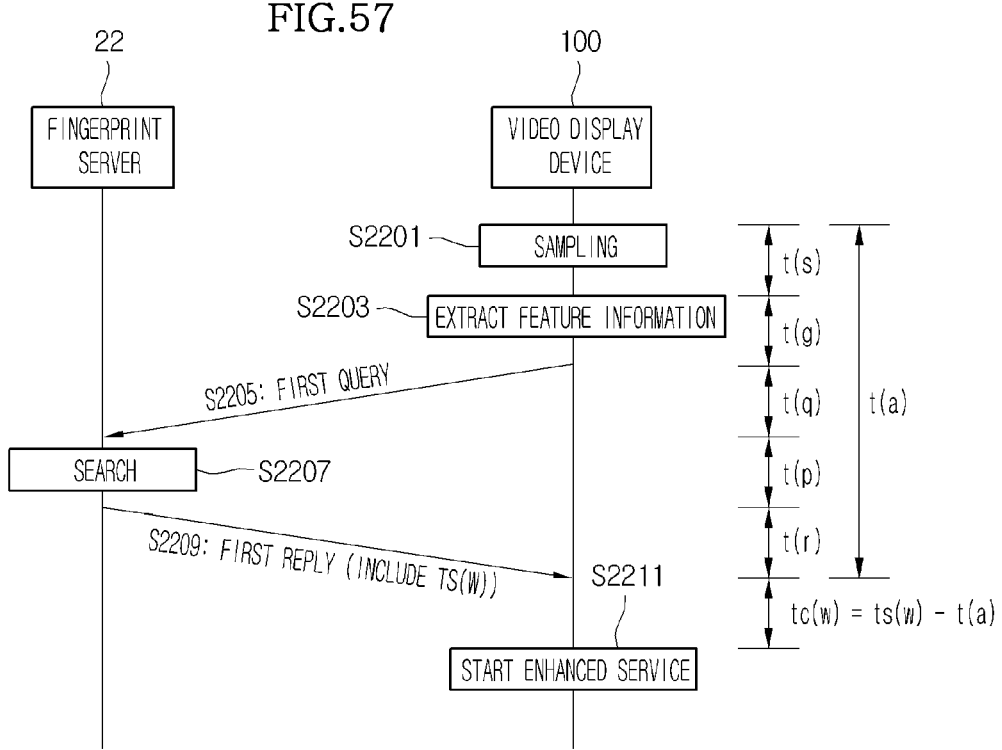
FIG. 57 is a ladder diagram illustrating a data flow in a fingerprint based network topology according to another embodiment.

FIG. 57 is a ladder diagram illustrating a data flow in a fingerprint based network topology according to another embodiment.

When the video display device 100 extracts a certain section of a main AV content by sampling the main AV content in operation S2201.

The video display device 100 extracts feature information of the extracted a certain section in operation S2203.

The video display device 100 transmits a first query including the extracted feature information to the fingerprint server 22 in operation S2205.

The fingerprint server 22 searches an internal database to obtain content information and enhanced service information corresponding to the feature information of the first query, and generates a first reply including content information and enhanced service information in operation S2207. At this point, the first reply or enhanced service information includes a server standby time (ts(w)) expressed in Equation 8.

$$ts(w)=(\text{start time of enhanced service})-(\text{start time of an section at which feature information is extracted}) \quad \text{[Equation 8]}$$

The fingerprint server 22 transmits the first reply to the video display device 100 in operation S2209.

The video display device 100 obtains a client standby time (tc(w)) on the basis of the server standby time (ts(w)) in the first reply or enhanced service information, and starts enhanced service obtained on the basis of the enhanced service information when the client standby time (tc(w)) elapses in operation S2211.

The client standby time (tc(w)) may be obtained by the following Equation 9.

$$tc(w)=ts(w)-t(a) \quad \text{[Equation 9]}$$

t(a) in Equation 9 is a time difference between sampling start time and first reply acquisition time. The video display device 100 may easily obtain a time difference between the sampling start time and the first reply acquisition time.

Theoretically, t(a) is expressed as the following Equation 10.

$$t(a)=t(s)+t(g)+t(q)+t(p)+t(r) \quad \text{[Equation 10]}$$

In Equation 10, t(s) represents a consumed time for sampling, t(g) represents a consumed time for extracting feature information from sampling data, t(q) represents a consumed time for transmitting a first query, t(p) represents a consumed time for the server 220 to search internal database, and t(r) represents a consumed time for transmitting a first reply.

Figure 58:
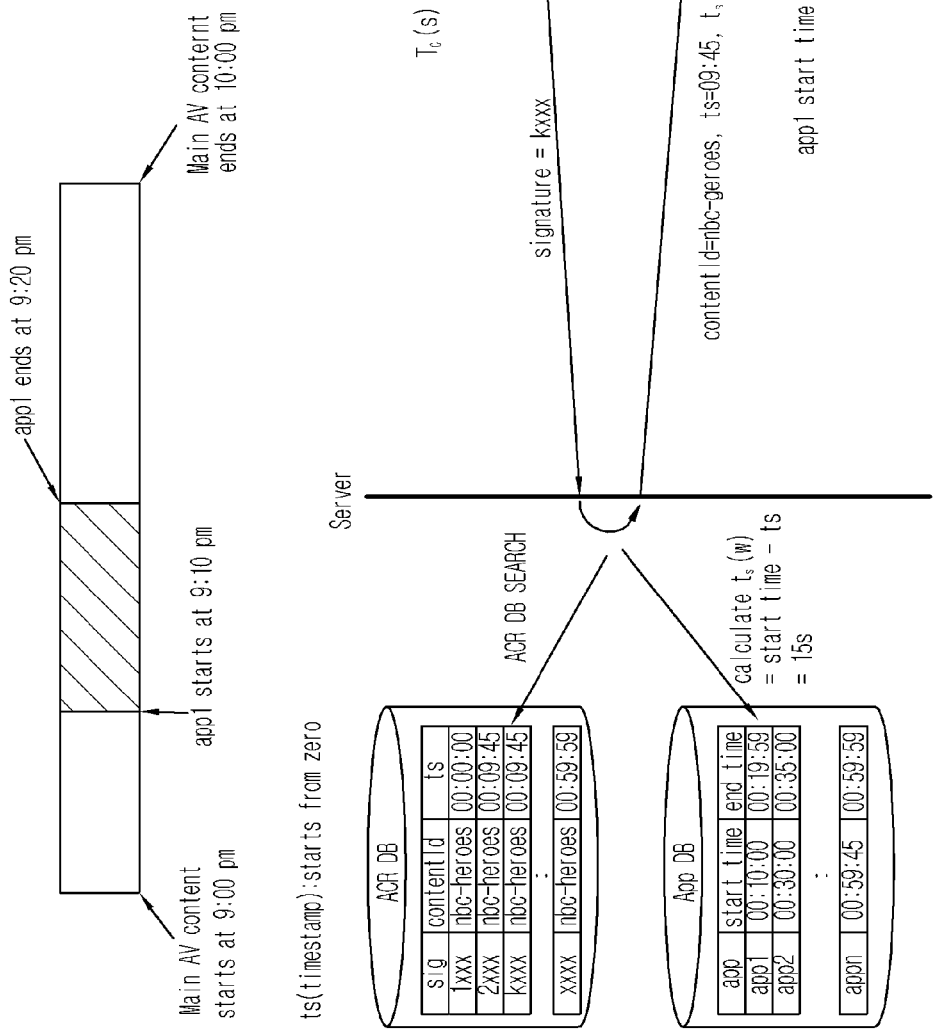
FIG. 58 is a ladder diagram illustrating a data flow in a fingerprint based network topology according to another embodiment.

FIG. 58 is a ladder diagram illustrating a data flow in a fingerprint based network topology according to another embodiment.

As shown in FIG. 58, a main AV content starts at 9 p.m. and ends at 10 p.m. In relation to the main AV content, an application appl starts at 9:10 p.m. and ends at 9:20 p.m.

Let's assume that the video display device 100 samples and extracts feature information (kxxx) at 9:09:45 p.m. and transmits a first query including the extracted feature information (kxxx) to the fingerprint server 22.

At this point, the fingerprint server 22 confirms that a time stamp of an section at which the extracted feature information is extracted is 9 min 45 sec. Additionally, the fingerprint server 22 confirms that a start time of the application appl is 10 min 0 sec. Accordingly, the fingerprint server 22 may obtain a server standby time (ts(w)) of 15 sec (10 min 0 sec-9 min 45 sec).

The fingerprint server 22 provides a first reply including content information, enhanced service information, and server standby time (15 sec) to the video display device 100.

If the video display device 100 receives the first reply at the timing of 9 hr 9 min 55 sec p.m., it may obtain t(a) of 10 sec (9 hr 9 min 55 sec-9 hr 9 min 45 sec).

Accordingly, the fingerprint server 100 may obtain a client standby time (tc(w)) of 5 sec (ts(w)-t(a)).

Figure 59:
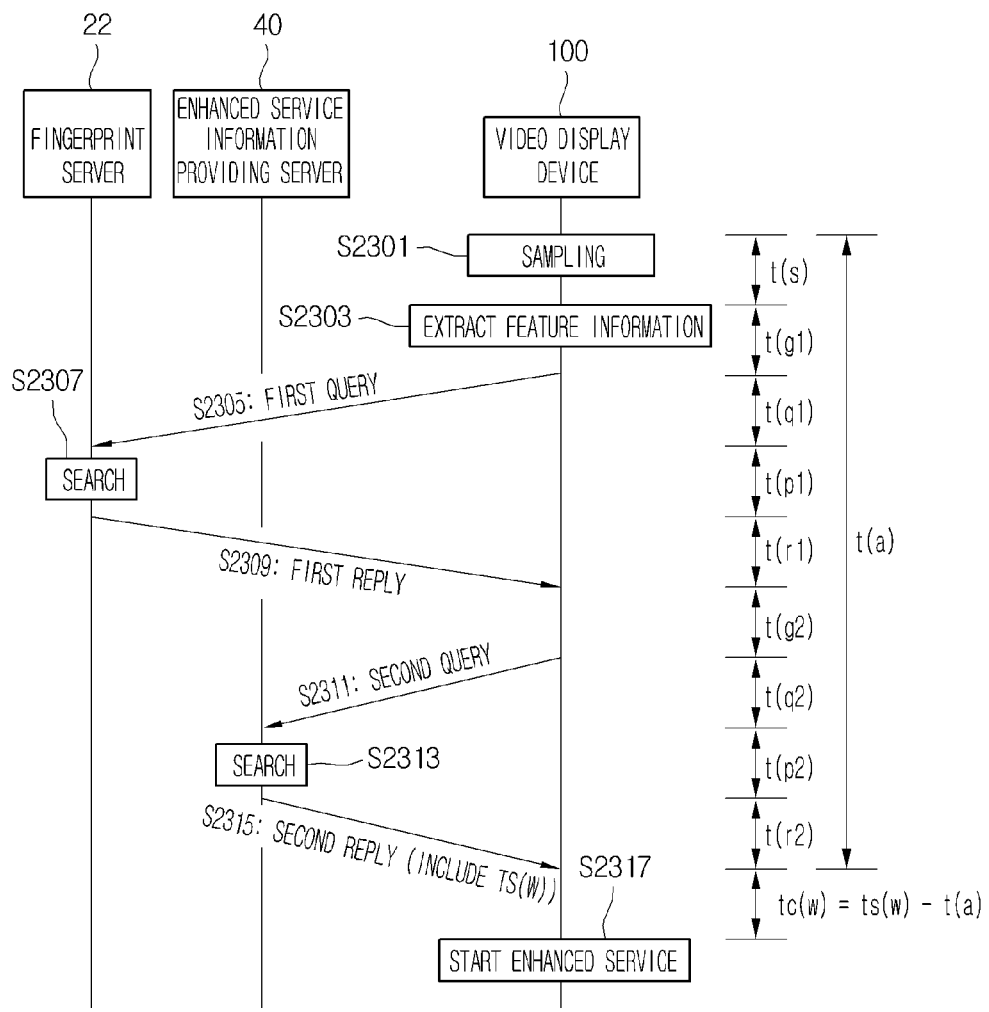
FIG. 59 is a ladder diagram illustrating a data flow in a fingerprint based network topology according to another embodiment.

FIG. 59 is a ladder diagram illustrating a data flow in a fingerprint based network topology according to another embodiment.

When the video display device 100 extracts a certain section of a main AV content by sampling the main AV content in operation S2301.

The video display device 100 extracts feature information of the extracted section in operation S2303.

The video display device 100 transmits a first query including the extracted feature information to the fingerprint server 22 in operation S2305.

The fingerprint server 22 searches an internal database to obtain content information corresponding to the feature information of the first query, and generates a first reply including content information in operation S2307.

The fingerprint server 22 transmits the first reply to the video display device 100 in operation S2309.

The video display device 100 transmits a second query including the content information of the first reply to the enhanced service information providing server 40 in operation S2311.

The enhanced service information providing server 40 searches an internal database to obtain enhanced service information corresponding to the content information of the second query, and generates a second reply including the content information and enhanced service information in operation S2313. At this point, since the enhanced service information providing server 40 may obtain a start time of the section, at which the feature information is extracted, from the content information of the second query and a start time of the enhanced service from the internal database, it obtains the server standby time (ts(w)). Accordingly, the second replay or enhanced service information may include the server standby time (ts(w)) in Equation 8.

The enhanced service providing server 40 transmits the second reply to the video display device 100 in operation S2315.

The video display device 100 obtains the client standby time (tc(w)) in Equation 11 on the basis of the server standby time (ts(w)) in the second reply or enhanced service information, and starts enhanced service obtained on the basis of the enhanced service information when the client standby time (tc(w)) elapses in operation S2317.

The client standby time (tc(w) is obtained by the following Equation 11.

$$tc(w)=ts(w)-t(a) \quad \text{[Equation 11]}$$

t(a) in Equation 11 is a time difference between sampling start time and second reply acquisition time. The video display device 100 may easily obtain a time difference between the sampling start time and the second reply acquisition time.

Figure 60:
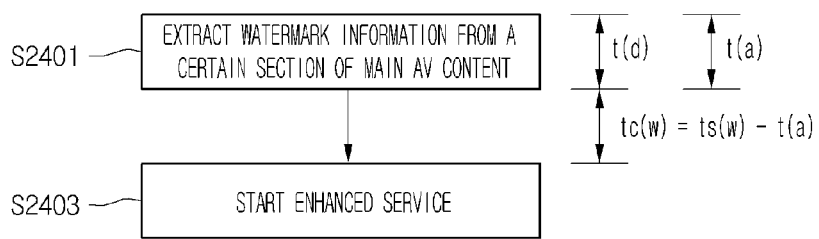
FIG. 60 is a flowchart illustrating a method of controlling a video display device according to another embodiment.

FIG. 60 is a flowchart illustrating a method of controlling a video display device according to another embodiment.

When the video display device 100 extracts watermark information from a certain section of a main AV content and obtains content information and enhanced service information from the extracted watermark information in operation S2401. At this point, the enhanced service information includes a first standby time (ts(w)), which is conceptually similar to the server standby time in Equation 8.

The video display device 100 obtains a second standby time (tc(w) on the basis of the first standby time (tc(w)), and starts enhanced service obtained on the basis of the enhanced service information when the second standby time (tc(w)) elapses in operation S2403. At this point, the second standby time (tc(w)) may be expressed as the following Equation 12.

$$tc(w)=ts(w)-t(a) \quad \text{[Equation 12]}$$

t(a) in Equation 12 is a time difference between a watermark information extraction start time and an enhanced service information acquisition time. The video display device 100 may easily obtain a time difference between the watermark information extraction start time and the enhanced service information acquisition time.

Figure 61:
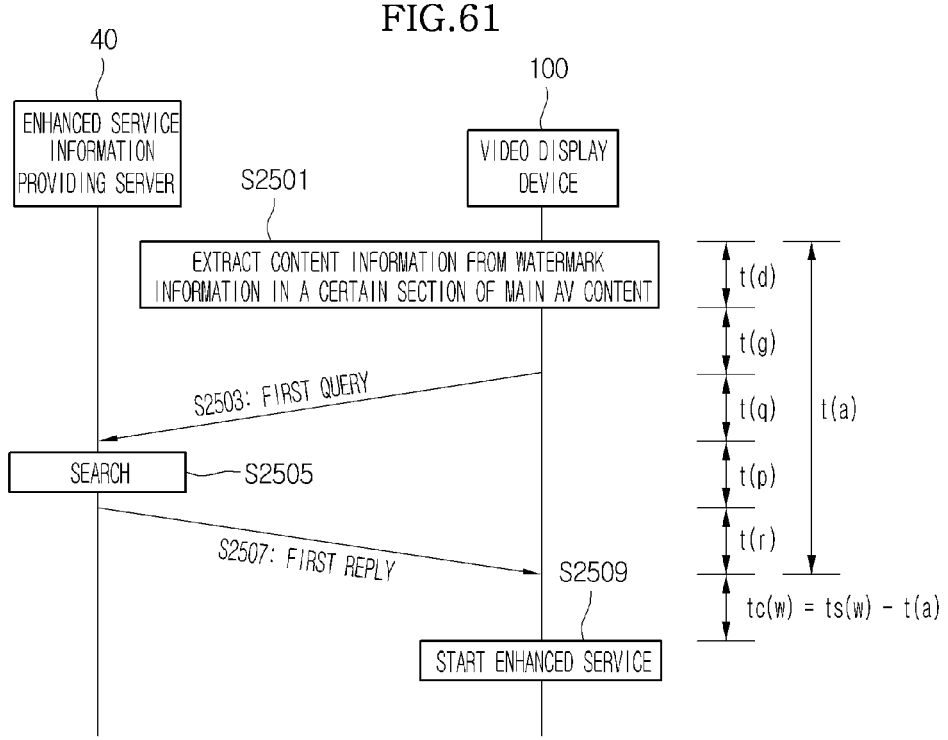
FIG. 61 is a ladder diagram illustrating a data flow in a watermark based network topology according to another embodiment.

FIG. 61 is a ladder diagram illustrating a data flow in a watermark based network topology according to another embodiment.

The video display device 100 extracts watermark information from a certain section of a main AV content and obtains content information from the extracted watermark information in operation S2501.

The video display device 100 transmits a first query including the obtained content information to the enhanced service information providing server 40 in operation S2503.

The enhanced service information providing server 40 searches an internal database to obtain enhanced service information corresponding to the content information of the second query, and generates a first reply including the content information and enhanced service information in operation S2505. At this point, since the enhanced service information providing server 40 may obtain a start time of the section, at which the watermark information is extracted, from the content information of the first query and a start time of the enhanced service from the internal database, it obtains the server standby time (ts(w)). Accordingly, the first replay or enhanced service information may include the server standby time (ts(w)) in Equation 8.

The enhanced service providing server 40 transmits the first reply to the video display device 100 in operation S2507.

The video display device 100 obtains the client standby time (tc(w)) in Equation 11 on the basis of the server standby time (ts(w)) in the first reply or enhanced service information, and starts enhanced service obtained on the basis of the enhanced service information when the client standby time (tc(w)) elapses in operation S2509.

The client standby time (tc(w)) may be expressed as the following Equation 13.

$$tc(w) = ts(w) - t(a)$$ [Equation 13]

t(a) in Equation 13 is a time difference between a watermark information extraction start time and a first reply acquisition time. The video display device 100 may easily obtain a time difference between the watermark information extraction start time and the first reply acquisition time.

FIG. 62 is a timing diagram of an enhanced service according to another embodiment. Especially, FIG. 62 illustrates a timing diagram when t(a) is greater than t(pre) and t(m).

In relation to a query timing 1 of FIG. 62, the video display device 100 may obtain enhanced service information through a query of t(m). However, since t(a) is greater than t(pre), the enhanced service may not start at its start time.

In relation to query timings 2 and 3 of FIG. 62, when the video display device 100 transmits a query right before t(m), since t(a) is greater than t(m), the video display device 100 may not obtain the enhanced service information. Therefore, the enhanced service may not be found.

Figure 63:
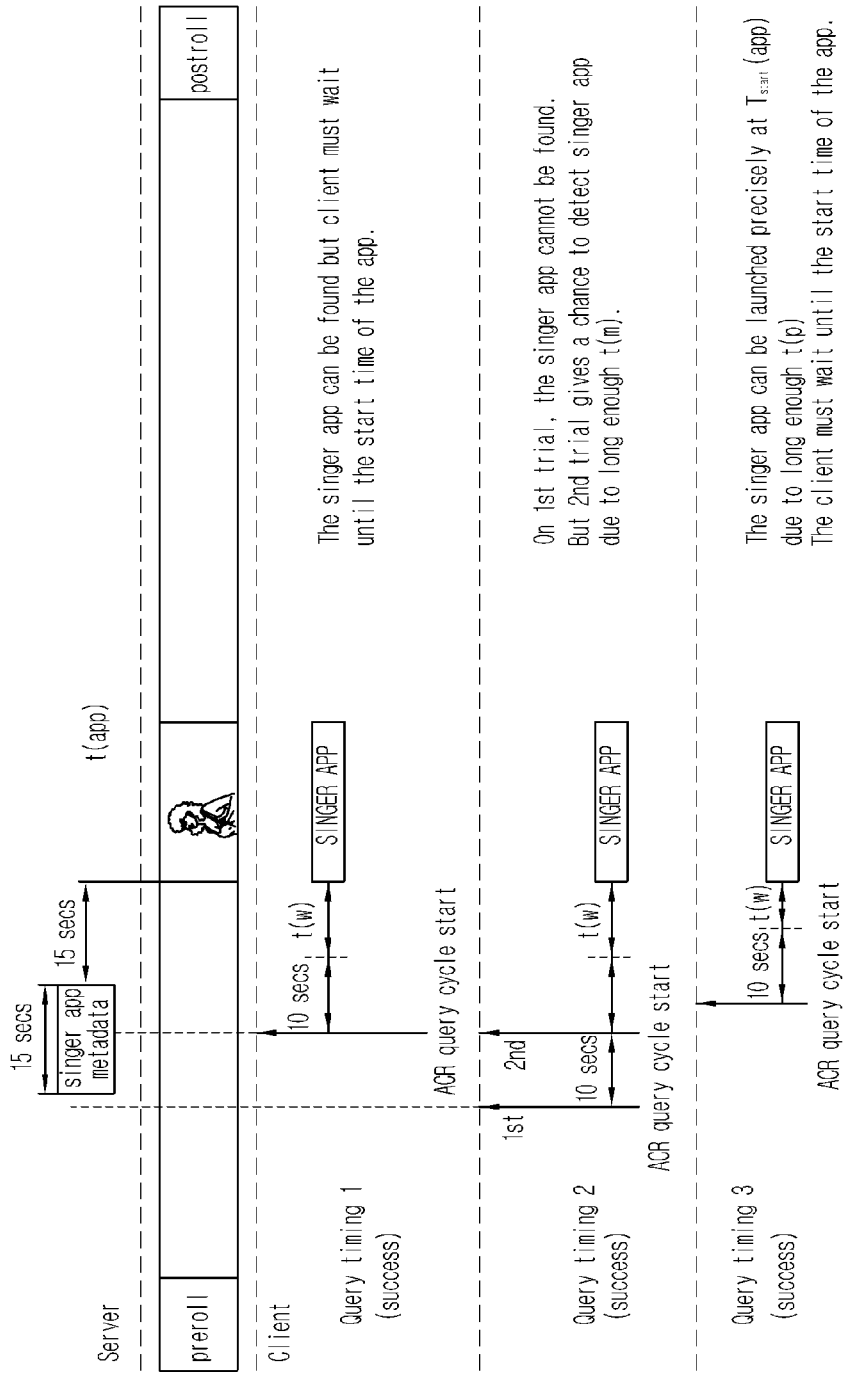
FIG. 63 is a timing diagram of an enhanced service according to another embodiment.

FIG. 63 is a timing diagram of an enhanced service according to another embodiment. Especially, FIG. 62 illustrates a timing diagram when t(a) is less than t(pre) and t(m).

In relation to query timings 1 and 2 of FIG. 63, when the video display device 100 transmits a first query right before t(m), since the video display device 100 may not obtain the enhanced service information, an enhanced service may not be found. However, since t(a) is less than t(m), the video display device 100 may obtain enhanced service information through the second query, and may find an enhanced service. At this point, the video display device 100 starts the enhanced service after tc(w) of standby.

In relation to the query timing 3 of FIG. 63, even when the video display device 100 transmits a query right before end time of t(m), since t(a) is less than t(pre), the video display device 100 may start the enhanced service at the accurate start time of the enhanced service. At this point, the video display device 100 starts the enhanced service after tc(w) of standby.

Hereinafter, a method of managing a life cycle will be described with reference to FIGS. 64 to 67 according to an embodiment.

Figure 64:
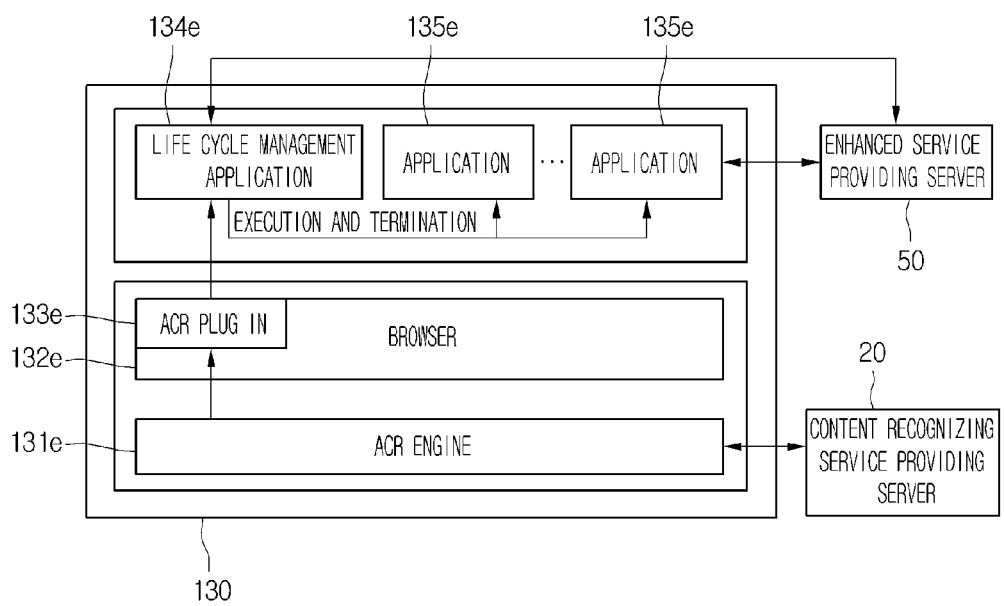
FIG. 64 is a hierarchy diagram of an enhanced service management unit according to another embodiment.

FIG. 64 is a hierarchy diagram of an enhanced service management unit according to another embodiment.

As shown in FIG. 64, the enhanced service management unit 130 includes an ACR engine 131e, a browser 132e, an ACR plug in 133e, a life cycle management application (LCM app) 134e, and at least one application 135e.

The ACR plug in 133e is plugged in the browser 132e.

The life cycle management application 134e manages download, execution, and termination of the application 135e.

Figure 65:
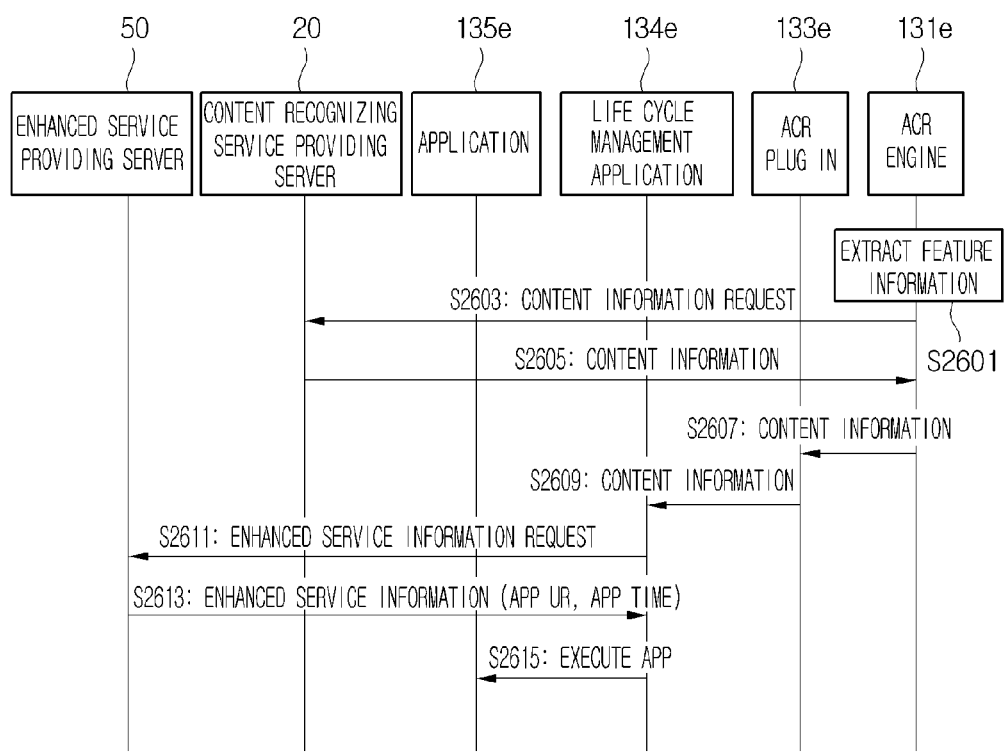
FIG. 65 is a ladder diagram illustrating a data flow in a fingerprint based network topology according to another embodiment.

FIG. 65 is a ladder diagram illustrating a data flow in a fingerprint based network topology according to another embodiment.

The life cycle management application 134e of FIG. 65 may use methods and events shown in Table 14.

TABLE 14

| | Name | description |
|---|---|---|
| property | readonly ACRMetadata metadata | |
| method | ACRMetadata getACRMetadata( ) | |
| Event | function onContentChanged(String contentId) | When this event is registered, this is called whenever content is changed. If it's not registered, nothing will be called. |
| | function onMediaTimeUpdated(Number mediaTime) | When this event is registered, this is called whenever media time is updated. Since media time is always changed, it will provide ACR app with up-to-date media time synchronized with AV stream. |

ACRMetadata class is shown in Table 15.

TABLE 15

| | Name | description |
|---|---|---|
| property | readonly String contentId | |
| | readonly Number mediaTime (relative time to the content, unit = sec) | mediaTime is adjusted in order to reflect network roundtrip delay. The formula is as follows. mediaTime = media time of from ACR query response + network delay |

The ACR engine 131e extracts feature information of a certain section of a main AV content in operation S2601.

The ACR engine 131e transmits a content information request message including the extracted feature information to the content recognizing service providing server 20 in operation S2603.

The content recognizing service providing server 20 searches an internal database to obtain content information corresponding to the feature information, and transmits the obtained content information to the ACR engine 131e in operation S2605.

The ACR engine 131e delivers the received content information to the ACR plug in 133e in operation S2607, and the ACR plug in 133e delivers the received content information to the life cycle management application 134e in operation S2609. Especially, the life cycle management application 134e may obtain content information through a getACRMetadata( )method, an on ContentChanged(String contentId) event, or an on MediaTimeUpdated(Number mediaTime) event.

The life cycle management application 134e transmits an enhanced service information request message including content information to the enhanced service providing server 50 or the enhanced service information providing server 40 in operation S2611.

The enhanced service providing server 50 or enhanced service information providing server 40 search an internal database to obtain enhanced service information corresponding to the content information, and transmits the obtained enhanced service information to the life cycle management application 134e in operation S2613.

The life cycle management application 134e manages the application 135e according to the received enhanced service information in operation S2615. As described above, the enhanced service information may include an enhanced service address, an enhanced service start time, and an enhanced service end time. The life cycle management application 134e accesses the enhanced service address to obtain the application 135e corresponding to the enhanced service, starts the obtained application 135e at the enhanced service start time, and ends the application 135e at the enhanced service end time.

Figure 66:
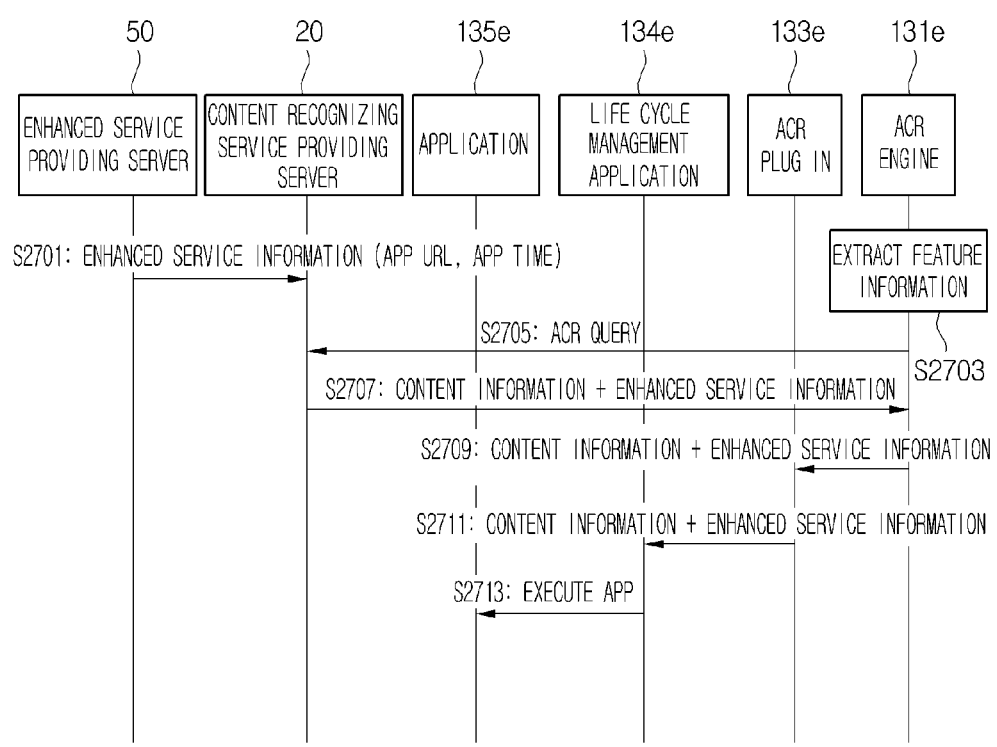
FIG. 66 is a ladder diagram illustrating a data flow in a fingerprint based network topology according to another embodiment.

FIG. 66 is a ladder diagram illustrating a data flow in a fingerprint based network topology according to another embodiment.

TABLE 16

|  | Name | description |
| --- | --- | --- |
| property | readonly ACRMetadata metadata | |
| method | ACRMetadata getACRMetadata( ) | |
| Event | function onContentChanged(String contentId) | When this event is registered, this is called whenever content is changed. If it's not registered, nothing will be called. |
|  | function onMediaTimeUpdated(Number mediaTime) | When this event is registered, this is called whenever media time is updated. Since media time is always changed, it will provide ACR app with up-to-date media time synchronized with AV stream. |

TABLE 17

|  | Name | description |
| --- | --- | --- |
| property | readonly String contentId readonly Number mediaTime (relative time to the content, unit = sec) readonly String appURL readonly Number | |

TABLE 17-continued

| Name | description |
| --- | --- |
| appLaunchTime readonly Number appExitTime | |

First, the enhanced service providing server 50 or enhanced service information providing server 40 provides enhanced service information to the content recognizing service providing server 20 in operation S2701.

The ACR engine 131e extracts feature information of a certain section of a main AV content in operation S2703.

The ACR engine 131e transmits an ACR query message including the extracted feature information to the content recognizing service providing server 20 in operation S2705.

The content recognizing service providing server 20 searches an internal database to obtain content information and enhanced service information corresponding to the feature information, and transmits the obtained content information and enhanced service information to the ACR engine 131e in operation S2707.

The ACR engine 131e delivers the received content information and enhanced service information to the ACR plug in 133e in operation S2709, and the ACR plug in 133e delivers the received content information and enhanced service information to the life cycle management application 134e in operation S2711.

Especially, the life cycle management application 134e may obtain content information and addition service information through an ACRMetadata getACRMetadata( )method, an on ContentChanged(String contentId) event, or an on MediaTimeUpdated(Number mediaTime) event.

The life cycle management application 134e manages the application 135e according to the received enhanced service information in operation S2713. As described above, the enhanced service information may include an enhanced service address, an enhanced service start time, and an enhanced service end time. The life cycle management application 134e accesses the enhanced service address to obtain the application 135e corresponding to the enhanced service, starts the obtained application 135e at the enhanced service start time, and ends the application 135e at the enhanced service end time.

FIG. 67 is a screen controlled by a life cycle management application according to an embodiment.

As shown in FIG. 67, when the application 135e reaches a start time, the life cycle management application 134e displays a trigger icon 610, which notifies that the application 135e is available, on the screen 600.

When a specific button such as a red button of a remote controller is selected, the life cycle management application 134e displays information on the application 135e on the additional information display area 620.

Figure 68:
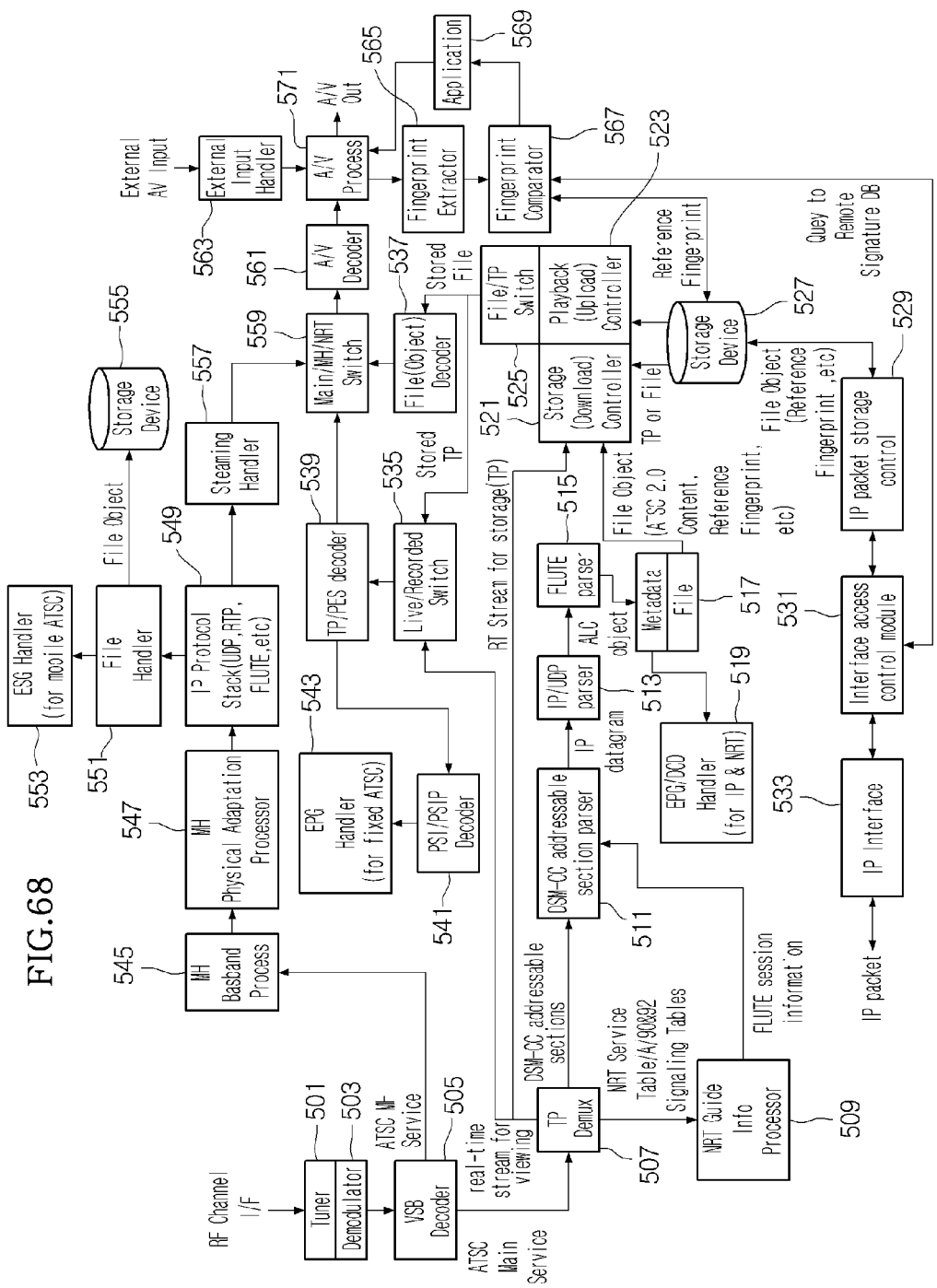
FIG. 68 is a block diagram illustrating a structure of a fingerprint based video display device according to another embodiment.

Next, a structure of a video display device according to an embodiment with reference to FIGS. 68 and 69.

FIG. 68 is a block diagram illustrating a structure of a fingerprint based video display device according to another embodiment.

As shown in FIG. 68, a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint feature information from an AV stream.

The Fingerprint Comparator 567 compares the feature information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

FIG. 69 is a block diagram illustrating a structure of a watermark based video display device according to another embodiment.

Although the watermark based video display device of FIG. 69 is similar to the fingerprint based video display device of FIG. 68, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

According to embodiments, services led by a broadcasting station are available. Especially, the embodiments provide alternative advertising services, scene associated information providing services, rating-based content services, and user attribute-based services.

In addition, loads of the server and video display device are reduced.

Additionally, according to embodiments, even when receiving AV contents having no time information or AV contents having a different reference time than enhanced service, a video display device may synchronize the time-sensitive enhanced service with the AV contents.

Moreover, according to embodiments, information search, chatting, news search, digital media download, product catalog download, and product purchase, which are related to main AV contents, are available without inconvenient text input using a remote controller.

Moreover, the above methods of the present invention can also be embodied as computer readable codes on a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The configurations and methods of the above-described embodiments are applied to the video display device without any restriction, and all or some of the embodiments may be selectively combined to have various modifications.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a video display device, the method comprising:
    obtaining an uncompressed audio-visual (AV) content;
    playing the uncompressed AV content through the display unit;
    extracting a characteristic information from a content section of the uncompressed AV content;
    transmitting a first query including the characteristic information to an ACR server;
    obtaining an address of an enhanced service information providing server on the basis of a first response for the first query;
    transmitting a second query to the enhanced service information providing server;
    obtaining an enhanced service information on the basis of a second response for the second query,
    wherein the enhanced service information includes a start time of an enhanced service; and
    playing the enhanced service in the start time of the enhanced service.

2. The method according to claim 1, further comprising:
    obtaining content change time information of the uncompressed AV content on the basis of the first response for the first query;
    determining a delay time for obtaining a next characteristic information on the basis of the content change time information;
    extracting the next characteristic information from a content section of the uncompressed AV content after the delay time elapses; and
    transmitting a third query including the characteristic information to an ACR server.

3. The method according to claim 2, further comprising:
    extracting the next characteristic information from a content section of the uncompressed AV content, if a channel change is detected even before the delay time elapses.

4. The method according to claim 3, wherein the extracting the next characteristic information when the channel change is detected further comprises:
    detecting a channel change when at least one of a video signal and an audio signal is not detected for a predetermined time.

5. A video display device comprising:
    a display unit;
    a receiving unit obtaining an uncompressed AV content;
    an enhanced service management unit extracting a characteristic information from a content section of the uncompressed AV content, transmitting a first query including the characteristic information to an ACR server, obtaining an address of an enhanced service information providing server on the basis of a first response for the first query, transmitting a second query to the enhanced service information providing server, and obtaining an enhanced service information on the basis of a second response for the second query,
    wherein the enhanced service information includes a start time of an enhanced service,
    playing the enhanced service in the start time of the enhanced service; and
    a play controlling unit playing the uncompressed AV content through the display unit.

6. The video display device according to claim 5, wherein the enhanced service management unit obtains content change time information of the uncompressed AV content on the basis of the first response for the first query, determines a delay time for obtaining a next characteristic information on the basis of the content change time information, extracts the next characteristic information from a content section of the uncompressed AV content after the delay time elapses, and transmits a third query including the characteristic information to an ACR server.

7. The video display device according to claim 6, wherein the enhanced service management unit extracts the next characteristic information from a content section of the uncompressed AV content, if a channel change is detected even before the delay time elapses.

8. The video display device according to claim 7, wherein the enhanced service management unit detects a channel change when at least one of a video signal and an audio signal is not detected for a predetermined time.

* * * * *